US011873206B2

(12) United States Patent
Burns

(10) Patent No.: US 11,873,206 B2
(45) Date of Patent: Jan. 16, 2024

(54) MANIFOLD AND FLUID DISPENSING SYSTEMS

(71) Applicant: Rooftop Research, LLC, New Wilmington, PA (US)

(72) Inventor: Robert S. Burns, New Wilmington, PA (US)

(73) Assignee: Rooftop Research, LLC, New Wilmington, PA (US)

( * ) Notice: Subject to any disclaimer, the term of this patent is extended or adjusted under 35 U.S.C. 154(b) by 0 days.

(21) Appl. No.: 17/748,465

(22) Filed: May 19, 2022

(65) Prior Publication Data

US 2022/0281735 A1 Sep. 8, 2022

Related U.S. Application Data

(63) Continuation of application No. 16/381,230, filed on Apr. 11, 2019, now Pat. No. 11,352,247, which is a continuation of application No. 16/111,490, filed on Aug. 24, 2018, now abandoned.

(51) Int. Cl.

| | |
|---|---|
| ***B67D 3/00*** | (2006.01) |
| ***B05C 5/02*** | (2006.01) |
| ***B05C 9/06*** | (2006.01) |
| ***E04D 15/07*** | (2006.01) |
| ***E04D 5/14*** | (2006.01) |
| ***B05C 17/005*** | (2006.01) |
| ***B01F 23/45*** | (2022.01) |

(52) U.S. Cl.

CPC ............ *B67D 3/0012* (2013.01); *B01F 23/45* (2022.01); *B05C 5/027* (2013.01); *B05C 9/06* (2013.01); *B05C 17/00503* (2013.01); *E04D 5/148* (2013.01); *E04D 15/07* (2013.01)

(58) Field of Classification Search

USPC ........................................ 118/300; 222/145.6

See application file for complete search history.

(56) References Cited

U.S. PATENT DOCUMENTS

| | | | |
|---|---|---|---|
| 2,112,160 | A | 3/1938 | Johnson |
| 2,125,542 | A | 8/1938 | Catterlin |
| 3,223,083 | A | 12/1965 | Cobey |
| 3,390,814 | A | 7/1968 | Creighton, Jr. et al. |
| 3,884,388 | A | 5/1975 | Holcomb |
| 4,121,739 | A | 10/1978 | Devaney et al. |
| 4,506,665 | A | 3/1985 | Andrews et al. |
| 4,557,261 | A | 12/1985 | Rugheimer |
| 4,852,387 | A | 8/1989 | Bingham |
| 4,852,563 | A | 8/1989 | Gross |
| 4,979,942 | A | 12/1990 | Wolf et al. |
| 5,104,375 | A | 4/1992 | Wolf et al. |
| 5,116,315 | A | 5/1992 | Capozzi et al. |

(Continued)

FOREIGN PATENT DOCUMENTS

WO WO2010/095047 A2 8/2010

*Primary Examiner* — Yewebdar T Tadesse

(74) *Attorney, Agent, or Firm* — Dority & Manning, P.A.

(57) ABSTRACT

A manifold that allows for increased flow performance, at a reduced pressure, and a flow path that is easily maintained, and fluid dispensing systems that allow for the precise, controlled spacing of beads of multiple component adhesives, and other liquids, and allow for multiple beads to be dispensed onto a substrate simultaneously are disclosed. A control portion for a manifold that solves the disadvantages relating to scaling an open channel and a carrier that provides a mechanism for applying an adhesive and/or a two-part adhesive easier are disclosed.

15 Claims, 47 Drawing Sheets

SECTION V-V

(56) References Cited

U.S. PATENT DOCUMENTS

| | | | |
|---|---|---|---|
| 5,309,906 | A | 5/1994 | LaBombard |
| 5,324,274 | A | 6/1994 | Martin |
| 5,344,074 | A | 9/1994 | Spriggs et al. |
| 5,443,183 | A | 8/1995 | Jacobsen et al. |
| 5,475,450 | A | 12/1995 | Miller et al. |
| 5,558,124 | A | 9/1996 | Randall |
| 5,575,767 | A | 11/1996 | Stevens |
| 5,582,596 | A | 12/1996 | Fukunaga et al. |
| 5,665,067 | A | 9/1997 | Linder et al. |
| 5,676,280 | A | 10/1997 | Robinson |
| 5,887,755 | A | 3/1999 | Hood, III |
| 6,047,729 | A | 4/2000 | Hollister et al. |
| 6,132,396 | A | 10/2000 | Antanavich et al. |
| 6,161,730 | A | 12/2000 | Heusser et al. |
| 6,202,698 | B1 | 3/2001 | Stearns |
| 6,527,749 | B1 | 3/2003 | Roby et al. |
| 6,764,026 | B2 | 7/2004 | Hunter et al. |
| 6,811,096 | B2 | 11/2004 | Frazier et al. |
| 6,832,621 | B1 | 12/2004 | Williams |
| 6,936,033 | B2 | 8/2005 | McIntosh et al. |
| 6,994,686 | B2 | 2/2006 | Cruise et al. |
| 7,037,694 | B2 | 5/2006 | Aksenov et al. |
| 7,290,541 | B2 | 11/2007 | Irvi et al. |
| 7,641,075 | B2 | 1/2010 | Crews |
| 8,088,099 | B2 | 1/2012 | McIntosh et al. |
| 8,152,777 | B2 | 4/2012 | Campbell et al. |
| 9,242,846 | B2 | 1/2016 | Burns |
| 9,622,731 | B2 | 4/2017 | Peindl et al. |
| 2003/0209612 | A1 | 11/2003 | Hahnen |
| 2007/0187434 | A1 | 8/2007 | Schrafel |
| 2008/0144426 | A1 | 6/2008 | Janssen et al. |
| 2009/0038701 | A1 | 2/2009 | Delmotte |
| 2009/0108091 | A1 | 4/2009 | Steffen |
| 2009/0266918 | A1 | 10/2009 | Fortier et al. |
| 2011/0268845 | A1 | 11/2011 | Fantappie |
| 2012/0035335 | A1 | 2/2012 | Ladet et al. |
| 2012/0292343 | A1 | 11/2012 | Zimmerman et al. |
| 2013/0206137 | A1 | 8/2013 | Greter |

SECTION A-A

FIG. 9
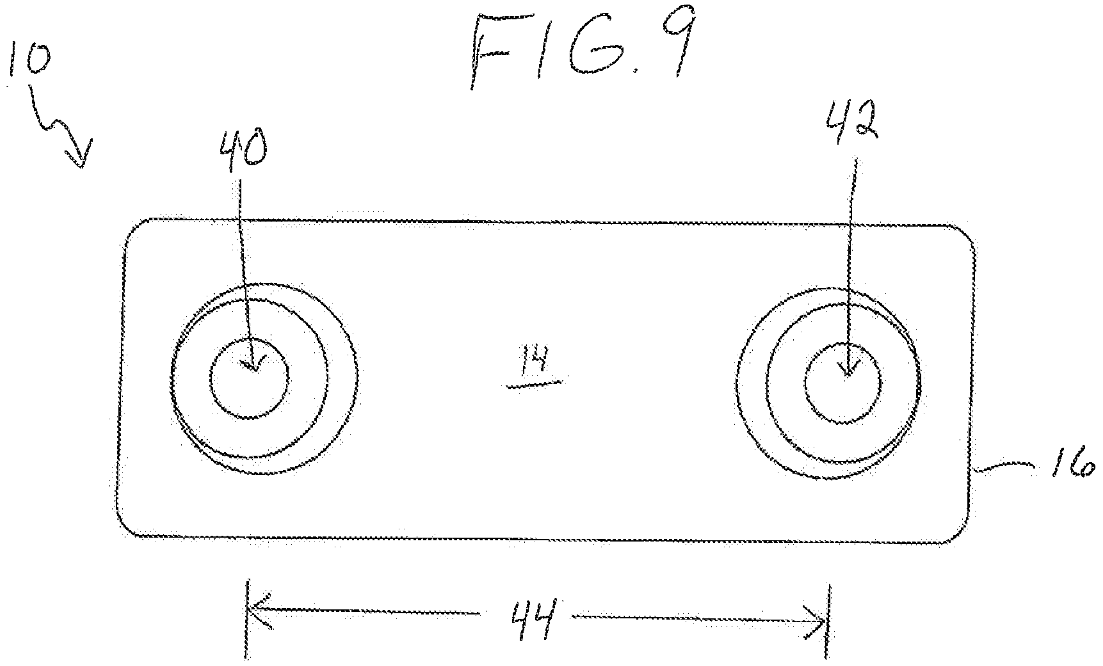
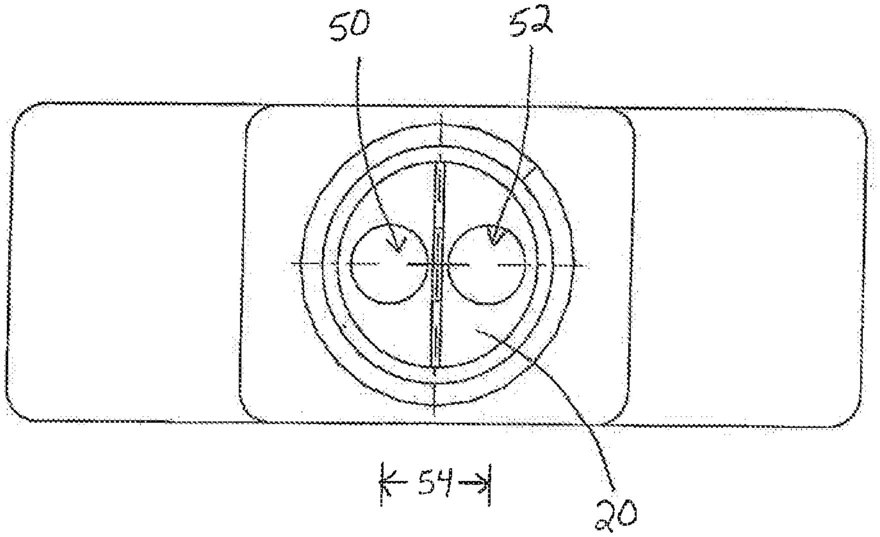
FIG. 10

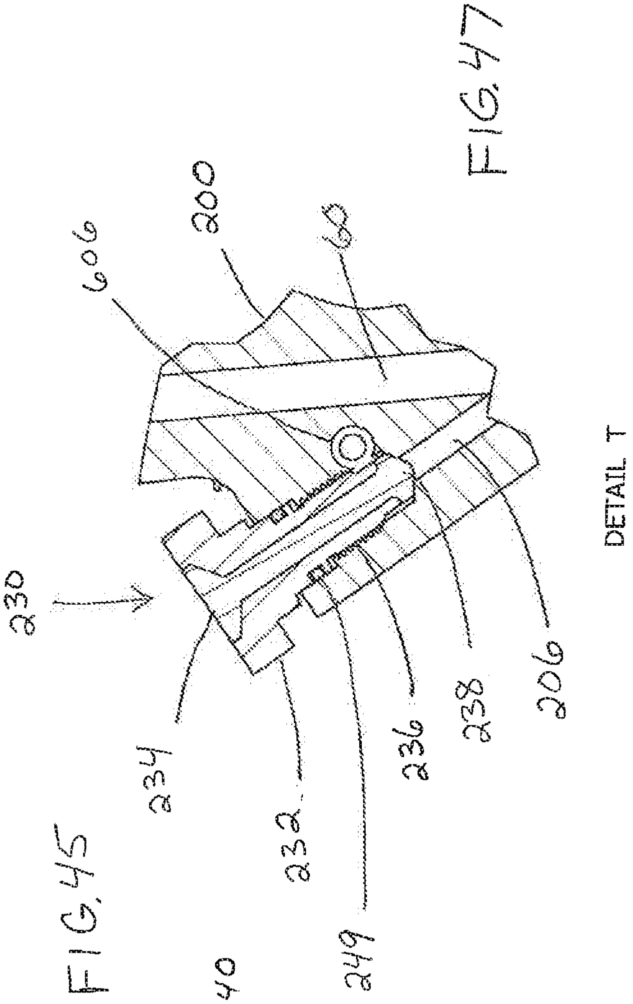
FIG. 47
FIG. 45
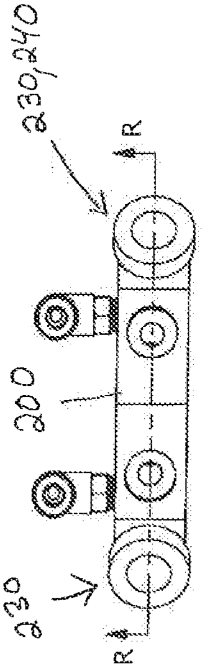
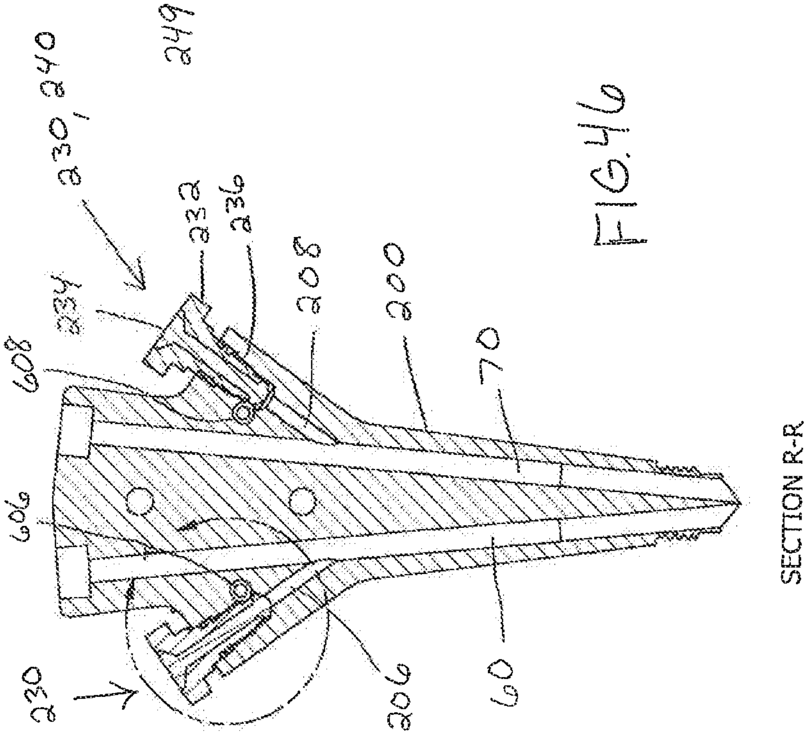
FIG. 46

MANIFOLD AND FLUID DISPENSING SYSTEMS

CROSS-REFERENCE TO RELATED APPLICATIONS

The present application is a continuation of and claims priority to U.S. application Ser. No. 16/381,230 entitled "Manifold and Fluid Dispensing Systems", filed Apr. 11, 2019, which claims priority to U.S. application Ser. No. 16/111,490 entitled "Manifold and Fluid Dispensing Systems", filed Aug. 24, 2018, the entire disclosures of which are hereby expressly incorporated by reference herein.

BACKGROUND OF THE INVENTION

1. Field of the Disclosure

The present disclosure relates to manifolds, fluid dispensing systems, a control portion for manifolds, and a carrier for a manifold. More particularly, the present disclosure relates to manifolds that allow for increased flow performance, at a reduced pressure, and a flow path that is easily maintained, fluid dispensing systems that allow for the precise, controlled spacing of beads of multiple component adhesives, and other liquids, and allow for multiple beads to be dispensed onto a substrate simultaneously, a control portion for a manifold that solves the disadvantages relating to sealing an open channel, and a carrier that provides a mechanism for applying an adhesive and/or a two-part adhesive easier.

2. Description of the Related Art

The delivery of liquid materials through tubing, hoses, or pipes is simple and well known. Differing materials traveling concurrently through separate tubes are also common. It is frequently desirable for differing materials traveling through multiple tubes to converge into one tube. As liquids flow towards this point of convergence, the contour of the tube path will impact the flow performance of the liquid, increase or decrease the frictional resistance of the liquid, and affect the ease with which the tubes can be maintained, cleaned or unclogged.

The joining of multiple liquids requires a special tubing manifold such as a wye manifold. The design of the adapter is critical to liquid delivery performance. This apparatus is particularly important when used by an operator to apply a multiple component liquid such as a coating or an adhesive to a surface.

The wye manifold derives its name from the fact that it has a generally Y-shaped body or housing when it is configured to interconnect two upper tubular strings ("chemical feed tubes") to a single lower tubular string ("discharge tube"). As used herein, the term "wye manifold" includes configurations in which two or more chemical hoses are interconnected to another discharge tube by the wye manifold body or housing.

A prior art dual manifold, as illustrated in FIG. 5 of U.S. patent application publication 2012/0012054 A1 is used to apply two-part adhesives utilizing a wye manifold wherein the shape of an internal path is constructed with 90 degree angles as parallel first paths. The 90 degree angled paths are created from partially drilling faces of the wye manifold and connecting with a perpendicular path. Such prior art wye manifolds have flow paths with angles which require increased pressure for use.

In addition, when wye manifolds clog due to chemical reaction or physical change of the materials within, cleaning is not readily accomplished by applying pressure or by drilling due to the configuration of the internal pathways and the angles at which they are disposed within the manifold. Wye manifolds are often utilized for the purpose of merging the flow path of liquids. The merging of liquids frequently causes a chemical reaction with many multiple component coatings and adhesives. When the stream of materials is stopped or slowed, the chemicals begin to react right at this merge point. Often the curing of these liquids begins at the merge point and then progresses upstream past the angle change and up into the inlets of the wye manifold. The curing process results in clogging as the physical state changes from that of a liquid to a solid or gel. The resulting hardened mass takes on the shape of the wye. The inside walls of the wye manifold act like a mold while the materials set up and cure. This hardened mass could be forcibly moved downstream and out of the wye manifold if the shape of the tubing were straight. But the change in the angle of the flow path molds this mass into a shape with an elbow. This elbow of the mass is now locked into place by the angled elbow of the wye manifolds. If pressure is applied in an attempt to dislodge this clog, the hardened mass cannot flow past the corner and the wye manifold is clogged. It is not possible to eject this hardened mass by increasing the pressure of the fluids.

Restoring this wye manifold into a usable part is normally accomplished with mechanical means. A drill bit can be inserted into the outlet of wye. The spinning drill bit will remove the clogged mass from the lower part of the wye outlet. In order to access this opening, the downstream plumbing must be removed. Examples of downstream plumbing are spray nozzles and static mixing tips. In order to access the inlets of the wye manifolds, the liquid supply lines must also be removed. Cleaning out the manifold requires not only drilling up from the outlet and down through the inlet, but also a side plug must be removed to allow the drill to be inserted to clean out the horizontal portion of the clogged path. At that point, the drill bit can be inserted into each opening to clear out the hardened mass clog. This process is not only time consuming but extremely messy, expensive, and wasteful as the liquid in the supply lines usually flows out and cannot be recovered.

For overnight storage, the flow path of the wye manifold must be purged to prevent hardening of the materials. Additionally, it is often recommended that the outlets be filled with grease to prevent hardening. This shut down procedure at the end of each use is quite time consuming and the grease has to be purged prior to the next start up.

In view of the foregoing, it will be appreciated that a need exists for an improved manifold in which multiple chemical feed tubes are interconnected.

SUMMARY OF THE INVENTION

The present disclosure provides a manifold that allows for increased flow performance, at a reduced pressure, and a flow path that is easily maintained, and fluid dispensing systems that allow for the precise, controlled spacing of beads of multiple component adhesives, and other liquids, and allow for multiple beads to be dispensed onto a substrate simultaneously. The present disclosure provides a control portion for a manifold that solves the disadvantages relating to sealing an open channel. The present disclosure includes a carrier that provides a mechanism for applying an adhesive and/or a two-part adhesive easier.

The present disclosure provides a manifold having a first side, a second side, a first channel extending from the first side to the second side, and a second channel extending from the first side to the second side. The first channel and the second channel each define a linear longitudinal axis. In one embodiment, the first channel longitudinal axis and the second channel longitudinal axis are oblique to the first side and the second side of the manifold. The manifold of the present disclosure provides channels that can be easily cleaned. For example, the channels can be cleaned by increasing a pressure of a substance traveling through the manifold. Also, the channels can be cleaned using a tool having a linear longitudinal axis, wherein the tool only needs to be inserted into each channel one time.

The manifold of the present disclosure is compatible with the limited spaces provided by plumbing components, such as a static mixing tip, which are attachable to an end of the manifold. For example, when multiple paths of dissimilar materials travel through hoses and arrive at a manifold, the purpose of the manifold is to direct the material flows toward each other so that they can be mixed together. The connecting apparatuses, such as a spray nozzles or static mixing tips, are commercially established in limited sizes.

In accordance with an embodiment of the present disclosure, a manifold, for a first substance and a second substance to travel therethrough, includes a block having a first side and a second side, the first side of the block defining a first side first aperture and a first side second aperture, the first side second aperture spaced a first distance from the first side first aperture, the second side of the block defining a second side first aperture and a second side second aperture. The manifold includes a first channel extending from the first side first aperture to the second side first aperture, the first channel defining a first channel longitudinal axis, the first channel longitudinal axis being linear, and a second channel extending from the first side second aperture to the second side second aperture, the second channel defining a second channel longitudinal axis, the second channel longitudinal axis being linear, wherein the first substance is movable through the first channel and the second substance is movable through the second channel.

In one configuration, the first channel longitudinal axis is oblique to the first side and the second side of the block. In another configuration, the second channel longitudinal axis is oblique to the first side and the second side of the block. In yet another configuration, the second side second aperture is spaced a second distance from the second side first aperture. In one configuration, the first distance is greater than the second distance. In another configuration, the first substance and the second substance are different. In yet another configuration, the manifold is attachable to a static mixing tip. In another configuration, the manifold is attachable to a spray nozzle.

A first aspect in accordance with another embodiment of the present disclosure is a vee manifold for delivering a plurality of materials. The vee manifold comprises a block having a plurality of inlets on a first side, each inlet comprises a first attachment means. The block also has an outlet portion on a second side opposite the first side. The outlet portion comprises a second attachment means. The block further comprises a plurality of generally straight, generally cylindrical channels between the plurality of inlets and the outlet portion forming a flow path from the inlets to the outlet portion.

In preferred embodiments, the first attachment means are female attachment means and the second attachment means is a male attachment means. In preferred embodiments, the second attachment means are quick connect fittings. In more preferred embodiments, the first attachment means is threading. In still more preferred embodiments, the second attachment means is threading.

A second aspect in accordance with another embodiment of the present disclosure is a vee manifold for delivering a plurality of materials comprising a block having a male attachment means having an outer end surface and screw threads on a side surface, the block having a plurality of female screw attachment means each having a recessed end surface and screw threads on a female side surface; and the block defining individual, open cylindrical channels between each of the plurality of recessed end surfaces and the outer end surface. In preferred embodiments, the axes of the cylindrical channels intersect outside the block and outside the male attachment means. The outlets of the cylindrical channels are contained within the male attachment means. In other preferred embodiments, axes of the cylindrical channels intersect at the outer end surface.

Both aspects share some preferred embodiments. Preferred embodiments are comprised of a polymer. More preferred embodiments are comprised of ultra-high-molecular weight polyethylene. Preferred embodiments of either aspect comprise two cylindrical channels. More preferred embodiments are where the cylindrical channels are non-intersecting. Yet more preferred embodiments are where axes of the cylindrical channels intersect at the surface of the vee manifold. Yet more preferred embodiments are where axes of the cylindrical channels intersect outside the vee manifold. In still other preferred embodiments, the cylindrical channels have similar cross sectional areas. In some preferred embodiments of either aspect, the vee manifold has heating means.

In accordance with another embodiment of the present disclosure, a manifold for a first substance and a second substance to travel therethrough includes a block having a first side and a second side, the block having a vee-shape; a first channel extending from the first side to the second side, the first channel defining a first channel longitudinal axis, the first channel longitudinal axis being linear; and a second channel extending from the first side to the second side, the second channel defining a second channel longitudinal axis, the second channel longitudinal axis being linear, wherein the first channel and the second channel are inclined toward each other as the first channel and the second channel extend from the first side of the block to the second side of the block, and wherein the first channel and the second channel together form a vee-shape.

In one configuration, the block has a stepped surface adjacent the second side. In another configuration, the first side of the block has a first width and the second side of the block has a second width, the first width greater than the second width. In yet another configuration, the first channel has a uniform diameter. In one configuration, the second channel has a uniform diameter. In another configuration, the first channel and the second channel intersect at a point outside of the block. In yet another configuration, the manifold includes a first connection portion disposed at a first portion of the first side of the block; a second connection portion disposed at a second portion of the first side of the block; and a third connection portion disposed at a third portion of the second side of the block.

In accordance with another embodiment of the present disclosure, a manifold for a first substance and a second substance to travel therethrough includes a block having a first side and a second side, the block having a vee-shape; a first channel extending from the first side to the second side, the first channel defining a first channel longitudinal axis, the first channel longitudinal axis being linear; and a second channel extending from the first side to the second side, the second channel defining a second channel longitudinal axis, the second channel longitudinal axis being linear, wherein the first channel and the second channel are inclined toward each other as the first channel and the second channel extend from the first side of the block to the second side of the block, wherein the first channel and the second channel together form a vee-shape, and wherein the block has a stepped surface adjacent the second side.

In one configuration, the first side of the block has a first width and the second side of the block has a second width, the first width greater than the second width. In another configuration, the first channel has a uniform diameter. In yet another configuration, the second channel has a uniform diameter. In one configuration, the first channel and the second channel intersect at a point outside of the block. In another configuration, the manifold includes a first connection portion disposed at a first portion of the first side of the block; a second connection portion disposed at a second portion of the first side of the block; and a third connection portion disposed at a third portion of the second side of the block.

In accordance with another embodiment of the present disclosure, a manifold for a first substance and a second substance to travel therethrough includes a block having a first side and a second side, the block having a vee-shape; a first channel extending from the first side to the second side, the first channel defining a first channel longitudinal axis, the first channel longitudinal axis being linear, the first channel having a uniform diameter; and a second channel extending from the first side to the second side, the second channel defining a second channel longitudinal axis, the second channel longitudinal axis being linear, the second channel having a uniform diameter, wherein the first channel and the second channel are inclined toward each other as the first channel and the second channel extend from the first side of the block to the second side of the block, wherein the first channel and the second channel together form a vee-shape, and wherein the block has a stepped surface adjacent the second side.

In accordance with another embodiment of the present disclosure, a manifold for a first substance and a second substance to travel therethrough includes a block having an inlet side, an outlet side, a first air channel at a first side, and a second air channel at a second side; a first channel extending from the inlet side to the outlet side, the first channel defining a first channel longitudinal axis; a second channel extending from the inlet side to the outlet side, the second channel defining a second channel longitudinal axis, wherein the first channel and the second channel together form a vee-shape; a first control portion transitionable between a first position in which the first air channel is closed and a second position in which the first air channel is open; and a second control portion transitionable between a first position in which the second air channel is closed and a second position in which the second air channel is open.

In one configuration, with the first control portion in the second position, an air source is connectable to the first air channel. In another configuration, with the second control portion in the second position, an air source is connectable to the second air channel. In yet another configuration, a first boss extends from the first side, the first boss defines a portion of the first air channel. In one configuration, a second boss extends from the second side, the second boss defines a portion of the second air channel. In another configuration, the first channel longitudinal axis is linear. In yet another configuration, the second channel longitudinal axis is linear.

In accordance with another embodiment of the present disclosure, a fluid dispensing system for applying a fluid having a first part and a second part includes a carrier; a first receiving portion removably attachable to the carrier, wherein the first receiving portion receives the first part of the fluid and the second part of the fluid separately and mixes the first part and the second part there together to create a first mixed fluid; and a second receiving portion removably attachable to the carrier, wherein the second receiving portion receives the first part of the fluid and the second part of the fluid separately and mixes the first part and the second part there together to create a second mixed fluid.

In one configuration, the fluid dispensing system includes a first holder containing the first part of the fluid, the first holder removably attachable to the carrier; and a second holder containing the second part of the fluid, the second holder removably attachable to the carrier. In another configuration, the fluid dispensing system includes a first line connecting the first holder to the first receiving portion, wherein the first receiving portion receives the first part of the fluid via the first line; a second line connecting the first holder to the second receiving portion, wherein the second receiving portion receives the first part of the fluid via the second line; a third line connecting the second holder to the first receiving portion, wherein the first receiving portion receives the second part of the fluid via the third line; and a fourth line connecting the second holder to the second receiving portion, wherein the second receiving portion receives the second part of the fluid via the fourth line. In yet another configuration, the second receiving portion is attached to the carrier a first distance apart from the first receiving portion. In one configuration, the first receiving portion is a vee manifold. In another configuration, the second receiving portion is a vee manifold. In yet another configuration, the first receiving portion includes a first channel defining a first channel longitudinal axis that is linear and a second channel defining a second channel longitudinal axis that is linear. In one configuration, the second receiving portion includes a first channel defining a first channel longitudinal axis that is linear and a second channel defining a second channel longitudinal axis that is linear.

In accordance with another embodiment of the present disclosure, a fluid dispensing system for applying a fluid having a first part and a second part includes a carrier; a first receiving portion removably attachable to the carrier, wherein the first receiving portion receives the first part of the fluid and the second part of the fluid separately and mixes the first part and the second part there together to create a first mixed fluid; a second receiving portion removably attachable to the carrier, wherein the second receiving portion receives the first part of the fluid and the second part of the fluid separately and mixes the first part and the second part there together to create a second mixed fluid; and a third receiving portion removably attachable to the carrier, wherein the third receiving portion receives the first part of the fluid and the second part of the fluid separately and mixes the first part and the second part there together to create a third mixed fluid.

In one configuration, the second receiving portion is attached to the carrier a first distance apart from the first receiving portion. In another configuration, the third receiving portion is attached to the carrier a second distance apart from the second receiving portion. In yet another configuration, the first distance and the second distance are equal. In one configuration, the first distance and the second distance are different. In another configuration, the first receiving portion is a vee manifold. In yet another configuration, the second receiving portion is a vee manifold. In one configuration, the third receiving portion is a vee manifold. In another configuration, the first receiving portion includes a first channel defining a first channel longitudinal axis that is linear and a second channel defining a second channel longitudinal axis that is linear. In yet another configuration, the second receiving portion includes a first channel defining a first channel longitudinal axis that is linear and a second channel defining a second channel longitudinal axis that is linear. In one configuration, the third receiving portion includes a first channel defining a first channel longitudinal axis that is linear and a second channel defining a second channel longitudinal axis that is linear.

In accordance with another embodiment of the present disclosure, a manifold for a first substance and a second substance to travel therethrough includes a block having an inlet side, an outlet side, and a first air channel at a first side; and a first control portion transitionable between a first position in which the first air channel is closed and a second position in which the first air channel is open, the first control portion having an outer portion formed of a first material and an inner portion formed of a second material, the outer portion rotatable relative to the inner portion.

In one configuration, with the first control portion in the first position, the inner portion provides a mechanical seal with the first air channel. In another configuration, with the first control portion in the first position, only a portion of the inner portion is in contact with the first air channel. In yet another configuration, the first material is bronze. In one configuration, the first material is steel. In another configuration, the first material is aluminum. In yet another configuration, the second material is molded urethane. In one configuration, the block includes a second air channel at a second side, and the manifold includes a second control portion transitionable between a first position in which the second air channel is closed and a second position in which the second air channel is open, the second control portion having a second control outer portion formed of a second control first material and a second control inner portion formed of a second control second material, the second control outer portion rotatable relative to the second control inner portion. In another configuration, with the second control portion in the first position, the second control inner portion provides a mechanical seal with the second air channel. In yet another configuration, with the second control portion in the first position, only a portion of the second control inner portion is in contact with the second air channel. In one configuration, the manifold further includes a first channel extending from the inlet side to the outlet side, the first channel defining a first channel longitudinal axis. In another configuration, the manifold further includes a second channel extending from the inlet side to the outlet side, the second channel defining a second channel longitudinal axis, wherein the first channel and the second channel together form a vee-shape. In yet another configuration, with the first control portion in the second position, an air source is connectable to the first air channel. In one configuration, with the second control portion in the second position, an air source is connectable to the second air channel. In another configuration, the first channel longitudinal axis is linear. In yet another configuration, the second channel longitudinal axis is linear.

In accordance with another embodiment of the present disclosure, a dispensing system includes a manifold for a first substance and a second substance to travel therethrough, the manifold comprising: a block having an inlet side and an outlet side; and a carrier connected to the manifold, the carrier including a linear portion and an angled portion.

In one configuration, the linear portion of the carrier includes an attachment portion, wherein the attachment portion secures the manifold to the carrier. In another configuration, the angled portion of the carrier includes a grip portion and a cuff portion. In one configuration, the carrier is hand-held. In another configuration, the carrier includes a cuff portion. In yet another configuration, the block includes a first air channel at a first side and a second air channel at a second side. In one configuration, the manifold includes a first channel extending from the inlet side to the outlet side, the first channel defining a first channel longitudinal axis; and a second channel extending from the inlet side to the outlet side, the second channel defining a second channel longitudinal axis, wherein the first channel and the second channel together form a vee-shape.

These and other advantages of the invention will be appreciated by reference to the detailed description of the preferred embodiment(s) that follow.

BRIEF DESCRIPTION OF THE DRAWINGS

The above-mentioned and other features and advantages of this disclosure, and the manner of attaining them, will become more apparent and the disclosure itself will be better understood by reference to the following descriptions of embodiments of the disclosure taken in conjunction with the accompanying drawings, wherein:

FIG. 9 is a first end view of an embodiment of the vee manifold.

FIG. 10 is a second end view of an embodiment of the vee manifold.

FIG. 45 is a top view of a manifold and control portion in accordance with an embodiment of the present invention.

FIG. 46 is a cross-sectional view of a manifold and control portion in accordance with an embodiment of the present invention.

FIG. 47 is a cross-sectional partial view of a manifold and control portion in accordance with an embodiment of the present invention.

Corresponding reference characters indicate corresponding parts throughout the several views. The exemplifications set out herein illustrate exemplary embodiments of the disclosure, and such exemplifications are not to be construed as limiting the scope of the disclosure in any manner.

DETAILED DESCRIPTION

In the following detailed description, reference is made to the accompanying examples and figures that form a part hereof, and in which is shown, by way of illustration, specific embodiments in which the inventive subject matter may be practiced. These embodiments are described in sufficient detail to enable those skilled in the art to practice them, and it is to be understood that other embodiments may be utilized and that structural or logical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed. The following description is, therefore, not to be taken in a limited sense, and the scope of the inventive subject matter is defined by the appended claims and their equivalents.

In the following description of the apparatus and methods described herein, directional terms, such as "top", "bottom", "upstream", "downstream", etc., are used for convenience in referring to the accompanying drawings. Additionally, it is to be understood that the various embodiments of the present invention described herein may be utilized in various orientations, such as inclined, inverted, horizontal, vertical, etc., without departing from the principles of the present invention. Typical material flow is from upstream to downstream.

Representatively illustrated in FIGS. 1-6 is an apparatus of a vee manifold 10 which apparatus embodies principles of the present invention. The vee manifold 10 offers a uniquely designed apparatus that provides for increased flow performance, at a reduced pressure, and a flow path that is easily maintained as compared to prior art wye manifolds.

Figure 6:
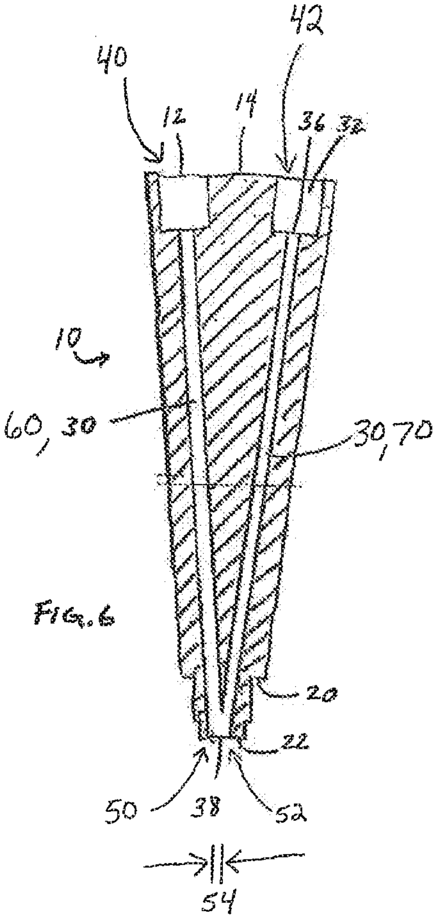
FIG. 6 is a cross-sectional view of another embodiment of the vee manifold.

Vee manifold 10 has a plurality of inlets or apertures 12 on a top or first side 14 of a block 16. For example, first side 14 of block 16 includes a first side first aperture 40 and a first side second aperture 42. Referring to FIG. 9, first side second aperture 42 is spaced a first distance 44 from first side first aperture 40. Each of the inlets 12 may be independently configured as first connection means. The block 16 has a bottom or second side 20 opposite top side 14. Bottom side 20 has an outlet portion or apertures 22. For example, second side 20 of block 16 includes a second side first aperture 50 and a second side second aperture 52. Referring to FIG. 10, second side second aperture 52 is spaced a second distance 54 from second side first aperture 50. In one embodiment, referring to FIG. 6, second side second aperture 52 and second side first aperture 50 merge but are still spaced a second distance 54 from one another as shown in FIG. 6. In one embodiment, first distance 44 is greater than second distance 54 as shown in FIGS. 9 and 10. The outlet portion 22 may be configured as second connection means. The block 16 between each of the plurality of inlets 12 and the outlet portion 22 defines straight, cylindrical channels 30. For example, a first channel 60 defining a first channel longitudinal axis 62 extends from first side first aperture 40 to second side first aperture 50. In one embodiment, the first channel longitudinal axis 62 is linear. Additionally, a second channel 70 defining a second channel longitudinal axis 72 extends from first side second aperture 42 to second side second aperture 52. In one embodiment, the second channel longitudinal axis 72 is linear.

In the embodiment illustrated in FIGS. 1-10, first side 14 and second side 20 of block 16 are generally parallel to one another and the first channel longitudinal axis 62 and the second channel longitudinal axis 72 are not perpendicular to first side 14 or second side 20 of block 16. In one embodiment, the first channel longitudinal axis 62 and the second channel longitudinal axis 72 are oblique to first side 14 and second side 20, i.e., the first channel longitudinal axis 62 and the second channel longitudinal axis 72 are neither parallel nor perpendicular to first side 14 and second side 20.

The inlets 12 may be first connection means to attach hoses, tubing, piping, nipples, valves, or other apparatus, such as hoses 90 (FIG. 7), by any fluid connection means known in the industry. Connection means include, but are not limited to, tapered walls for a friction fit, threads, quick connects, compression fittings, flare fittings, flange fittings, mechanical fittings, Luer locks, welding, soldering, and/or brazing. Each of the inlets may utilize the same or different connection means. Preferably, the connection means for inlets 12 are threads 24. A preferred embodiment has two inlets 12. In other embodiments, the vee manifold 10 has three, four, five or more inlets 12. If one or more inlets 12 are not being utilized, they may be capped by any capping means, such as a plug.

Block 16 may be made of any suitable material for the fluids. Materials for construction of block 16 may comprise, but not limited to, carbon steel, low temperature service carbon steel, stainless steel, non-ferrous metal alloys such as Inconel, Incoloy, and Cupro-nickel, non-metallic materials such as acrylonitrile butadiene styrene (ABS) polymer, glass fiber reinforced epoxy (GRE), polyvinyl chloride (PVC), chlorinated polyvinyl chloride (CPVC), ultra-high-molecular-weight polypropylene (UHMW), high density polyethylene (HDPE), tempered glass, perfluorinated polymers such as Teflon, chrome-molybdenum steel, aluminum, bronze, brass and copper. However, any other material may be used that is compatible with the materials to be used in the system. Preferably, block 16 is made of a polymer. More preferably, block 16 is made of UHMW. In some embodiments, means for heating vee manifold 10 are provided. Heating means include any means known in the industry for heating parts, including, but not limited to, electrical resistance or a fluid jacket.

The outlet portion 22 has second connection means to attach an outlet hose, spray nozzle, static mixing tip, such as static mixing tip 92 or spray nozzle 94 (FIGS. 7-8B), or other tubing, piping, nipples, valves, or other apparatus by any fluid connection means known in the industry. Connection means include, but are not limited to, tapered walls for a friction fit, threads, quick connects, compression fittings, flare fittings, flange fittings, mechanical fittings, Luer locks, welding, soldering, and/or brazing. Preferably, the connection means for the outlet portion 22 are threads 24 for connecting hoses and mixing tips (see FIG. 3).

Figure 1:
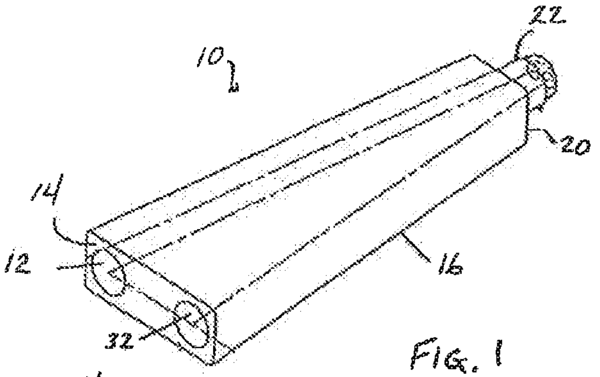
FIG. 1 is a perspective view of a first embodiment of the vee manifold of the present invention.
Figure 2:
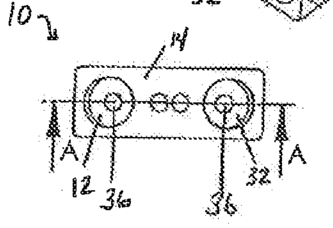
FIG. 2 is a first end view of the embodiment of the vee manifold of FIG. 1.
Figure 3:
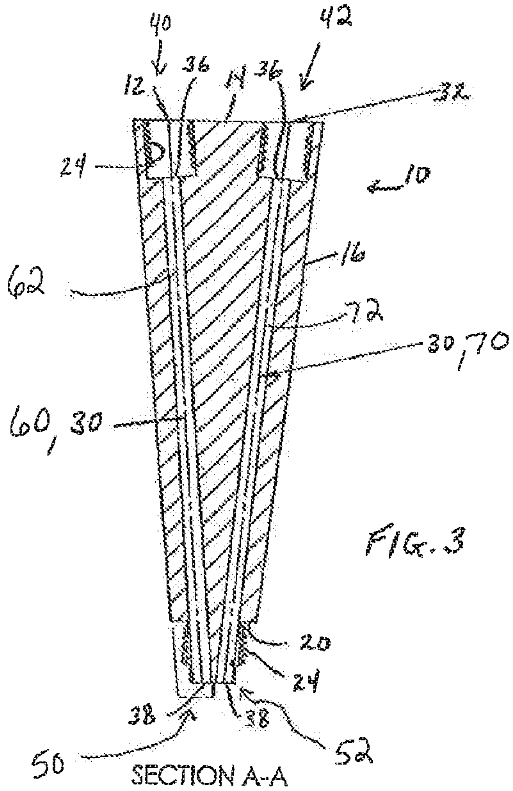
FIG. 3 is a cross-sectional view of an embodiment of the vee manifold.
Figure 4:
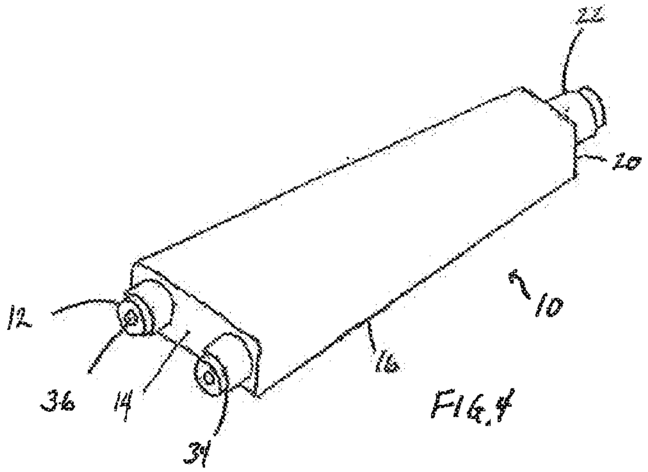
FIG. 4 is a perspective view of an embodiment of the vee manifold of the present invention.
Figure 5:
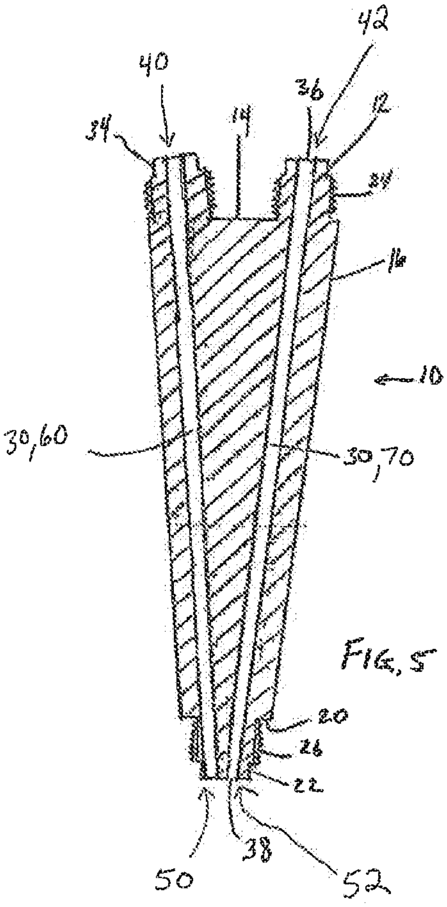
FIG. 5 is a cross-sectional view of an embodiment of the vee manifold.

The straight, cylindrical channels 30 in the block 16 are generally straight, have a generally circular cross-section, of a generally constant diameter. The cylindrical channels 30 have an inlet opening 36 and an outlet opening 38. Preferably, inlet openings 36 open into female inlets 32 as shown in FIG. 3. In other preferred embodiments, the inlet openings 36 open into male inlets 34. The cylindrical channels 30 in a block 16 may have the same diameter, or vary individually in diameter as needed by the application governed by the material characteristics of the fluids. Each of the outlet openings 38 open into the outlet portion 22. Preferably, as illustrated in FIGS. 1-3, the outlet openings 38 of each of the cylindrical channels 30 are distinct, the orifices are separate and do not communicate with each other. In other embodiments, FIG. 6, the outlet openings 38 of two or more cylindrical channels 30 may merge as a single outlet opening 38.

In use, a plurality of fluid materials enter the vee manifold 10 through inlets 12, the materials pass through the vee manifold 10. For example, referring to FIG. 7, a first substance 80 is movable through first channel 60 and a second substance 82 is movable through second channel 70. In some embodiments, first substance 80 and second substance 82 are different substances. When fluid material flow is stopped, a chemical reaction or physical change of the fluid materials may cause hardening to form a solid mass as in the prior art wye manifolds. The solid mass may form in the cylindrical channels 30 to form a cylindrical shaped clog. The cylindrical shaped clog may typically be extruded by increasing pressure through the inlets 12 restoring normal flow. As an alternative to increasing pressure, a straight drill bit may be introduced into the cylindrical channels 30 for the length of the block 16 to remove the cylindrical shaped clog.

A feature of the vee manifold 10 is that each cylindrical channel 30 is generally straight, and preferably at an angle relative to other channels 30 from the inlet openings 36 to the outlet openings 38. This straight pathway is simple and effective. If the flowable liquids used in the vee manifold 10 harden through chemical or physical changes, the solids formed have the straight sides of the straight cylindrical channels 30 act as a mold to form a hardened clog with a shape that is cylindrical. The cylindrical shaped clog can often be extruded by increasing the pressure on the upstream liquid. Once the clog is extruded normal flow is restored. The hardened mass can often be extruded out through the outlet openings 38 without resorting to other mechanical means.

If increased pressure will not extrude the hardened material out the outlet openings 38 then the clogs can be removed by mechanical means. As the flow path through the cylindrical channels 30 is straight, mechanical means such as a standard straight drill bit can be inserted into the outlet opening 38 and run all the way up through the clogged material in the cylindrical channels 30 to restore the functionality of the vee manifold 10. Ordinarily, the supply hoses do not need to be disconnected and an expensive mess is avoided.

Figure 7:
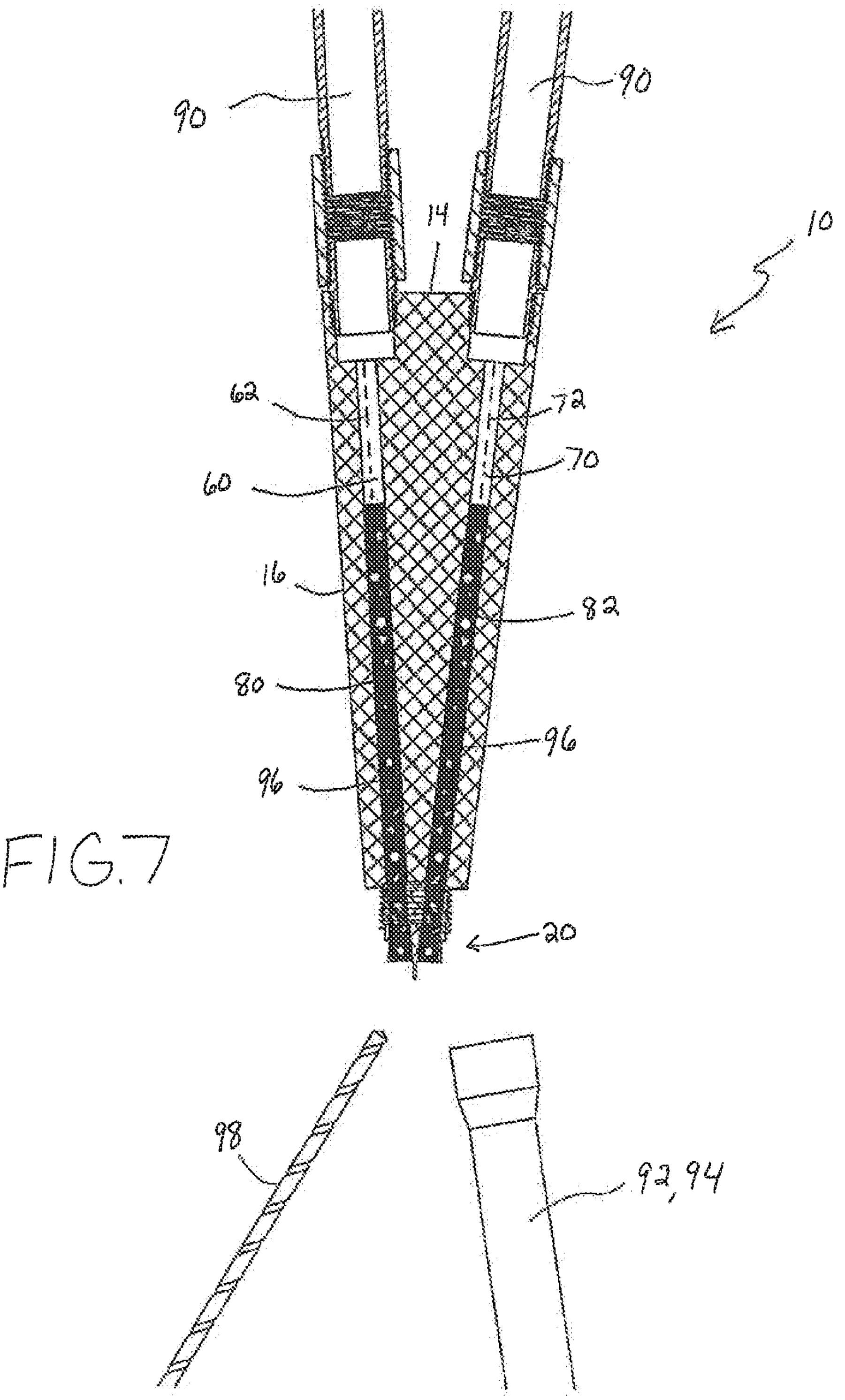
FIG. 7 is another cross-sectional view of another embodiment of the vee manifold.
Figure 8A:
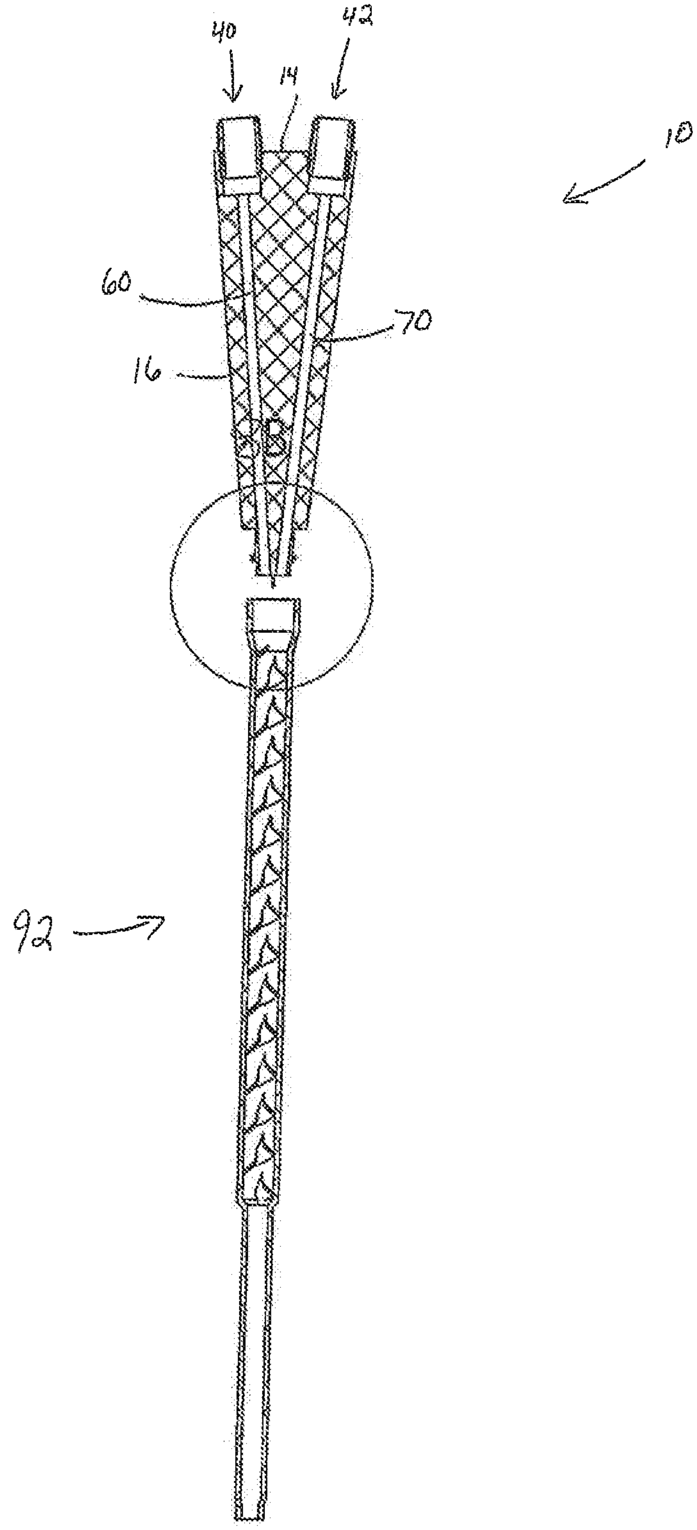
FIG. 8A is another cross-sectional view of another embodiment of the vee manifold with a static mixing tip.
Figure 8B:
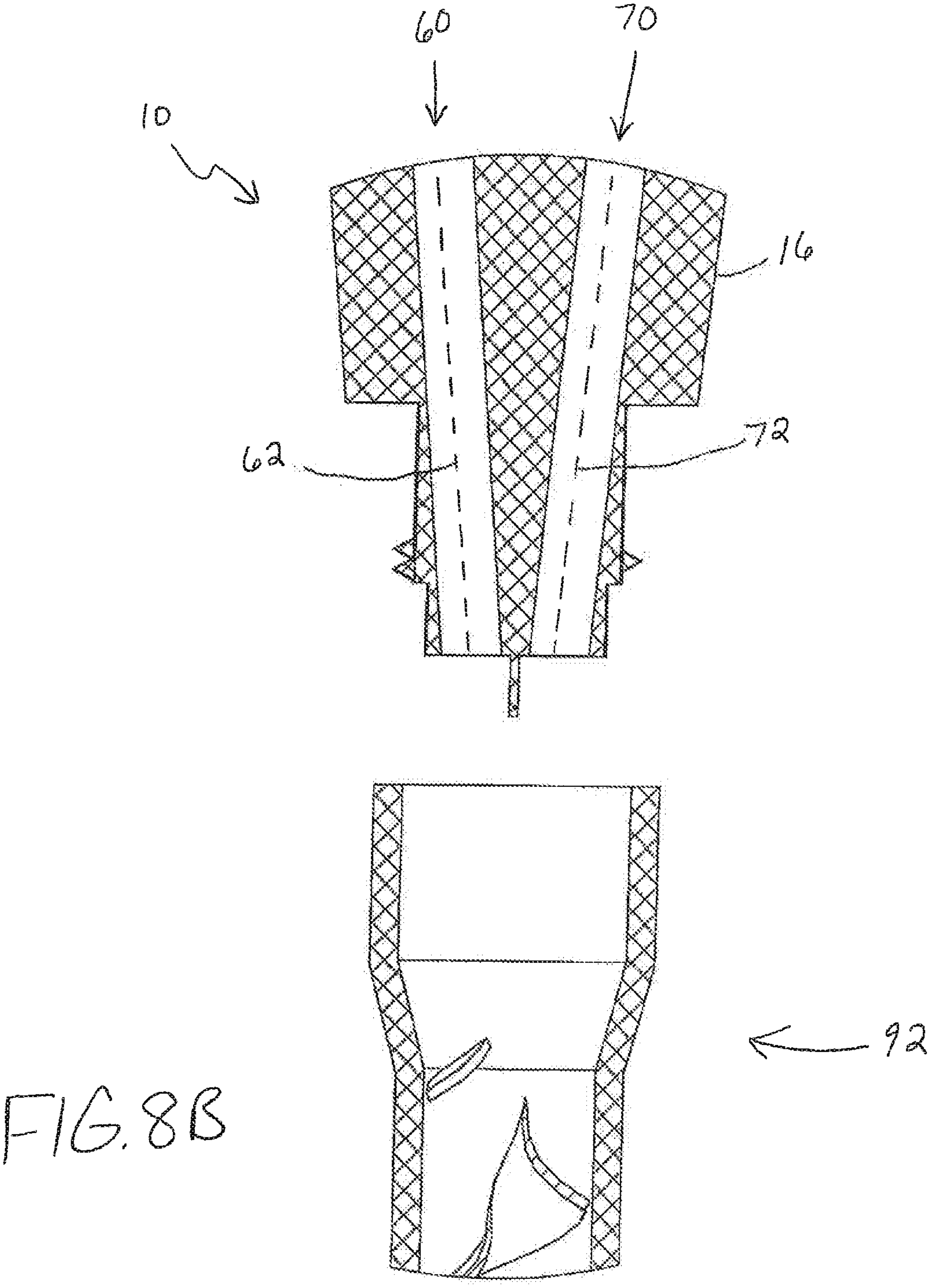
FIG. 8B is an enlarged, partial cross-sectional view of the vee manifold and the static mixing tip of FIG. 8A taken along section 8B.

For example, referring to FIG. 7, a clog 96 formed within a vee manifold 10 of the present disclosure can be easily cleaned. To clean a clog 96, a user only needs to remove static mixing tip 92 from second side 20 of vee manifold 10. With static mixing tip 92 removed, a tool such as drill bit 98 can be inserted into first channel 60 and/or second channel 70 to quickly and easily clean the channels 60 and 70. Because first channel longitudinal axis 62 and second channel longitudinal axis 72 are linear as shown in FIG. 7, the drill bit 98 only needs to enter each channel 60 and 70 a single time to completely and efficiently clear out any clogs 96. Once the channels 60 and 70 are cleaned, static mixing tip 92 is secured to second side 20 of vee manifold 10.

Figure 11:
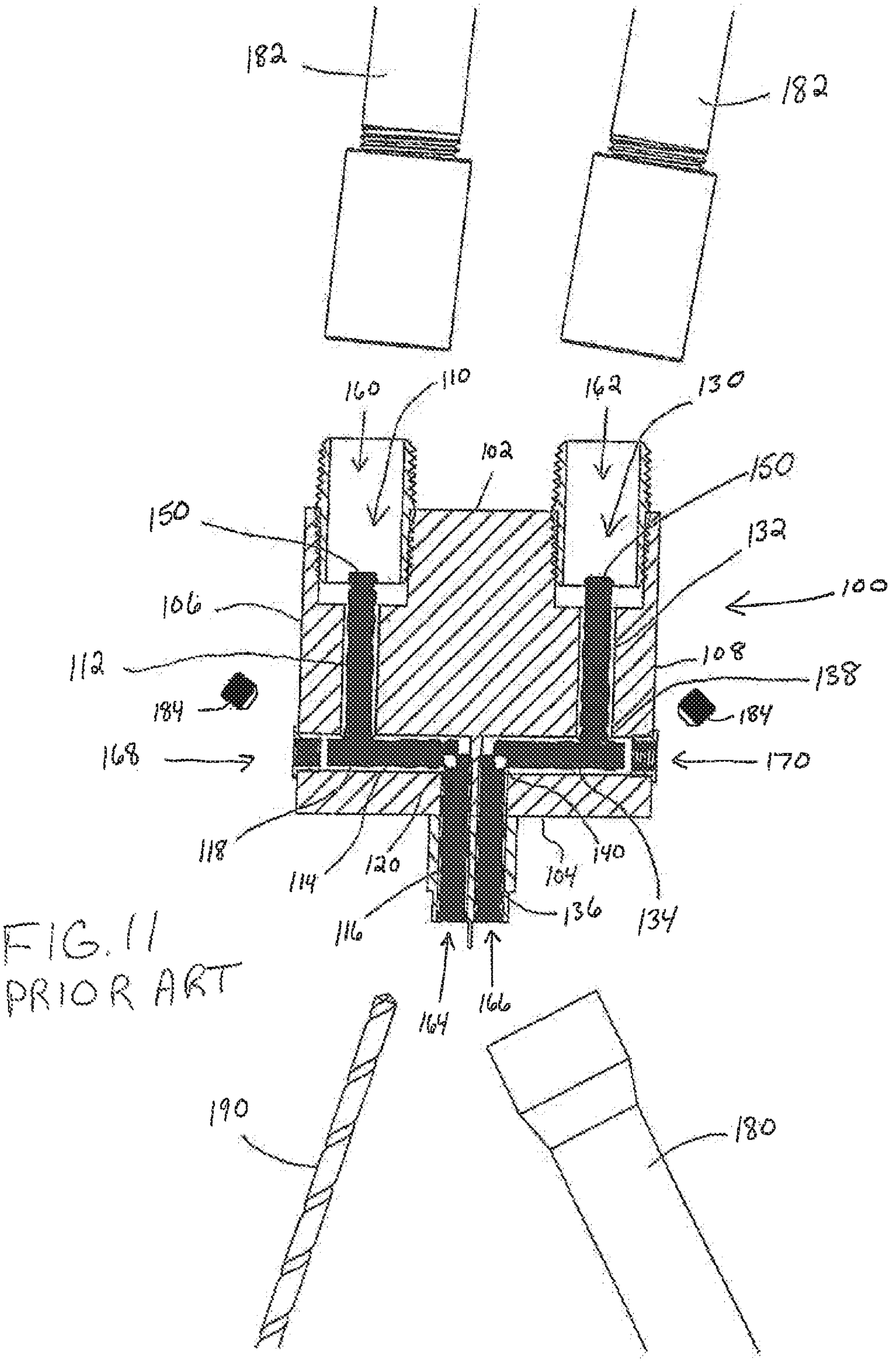
FIG. 11 PRIOR ART
FIG. 11 is a cross-sectional view of a prior art manifold.
Figure 13:
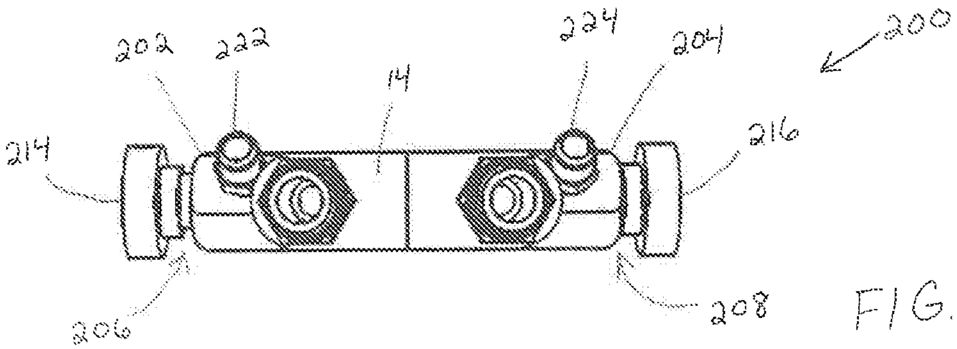
FIG. 13 is a top elevation view of a manifold in accordance with an embodiment of the present invention.
Figure 12:
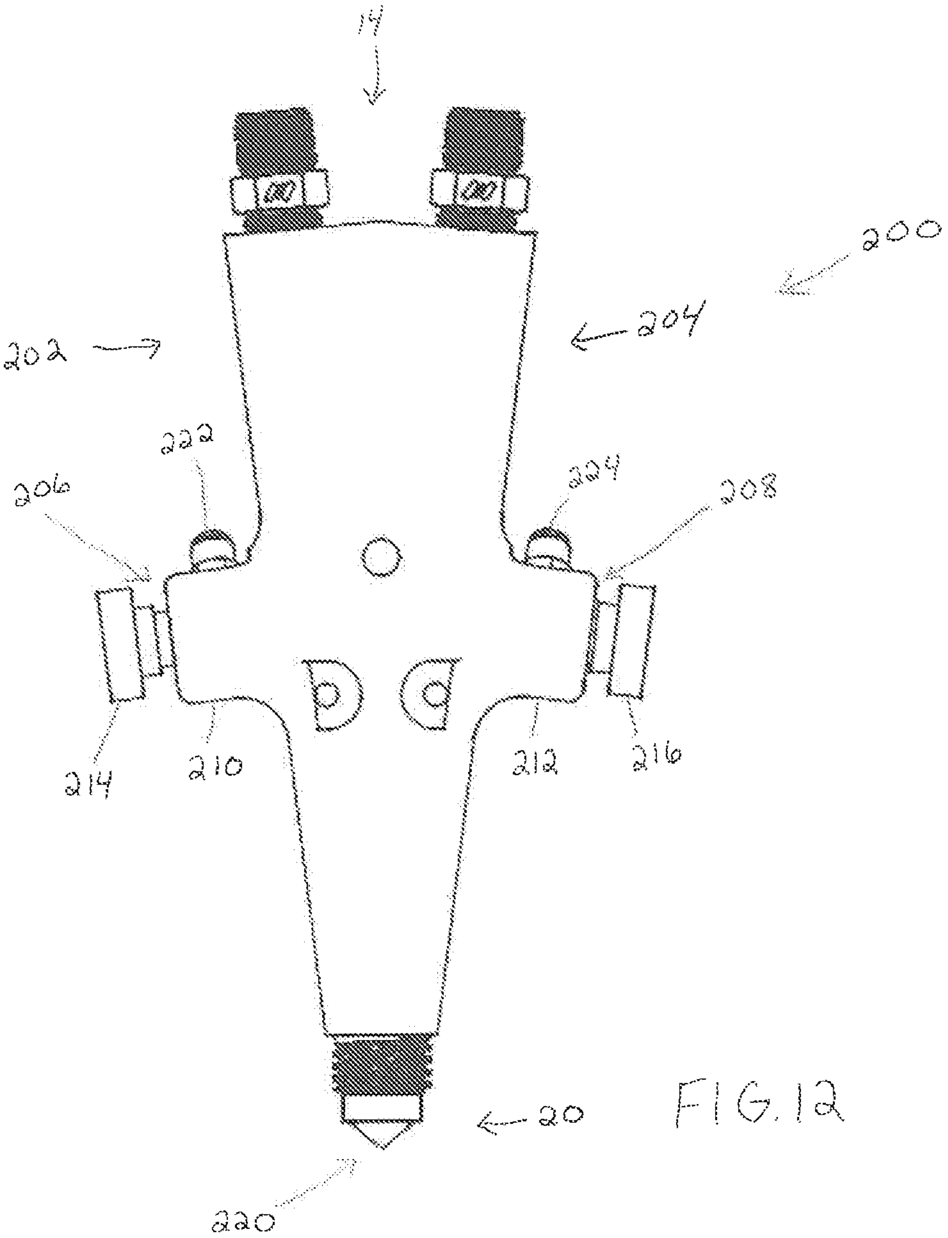
FIG. 12 is a first side perspective view of a manifold in accordance with an embodiment of the present invention.
Figure 14:
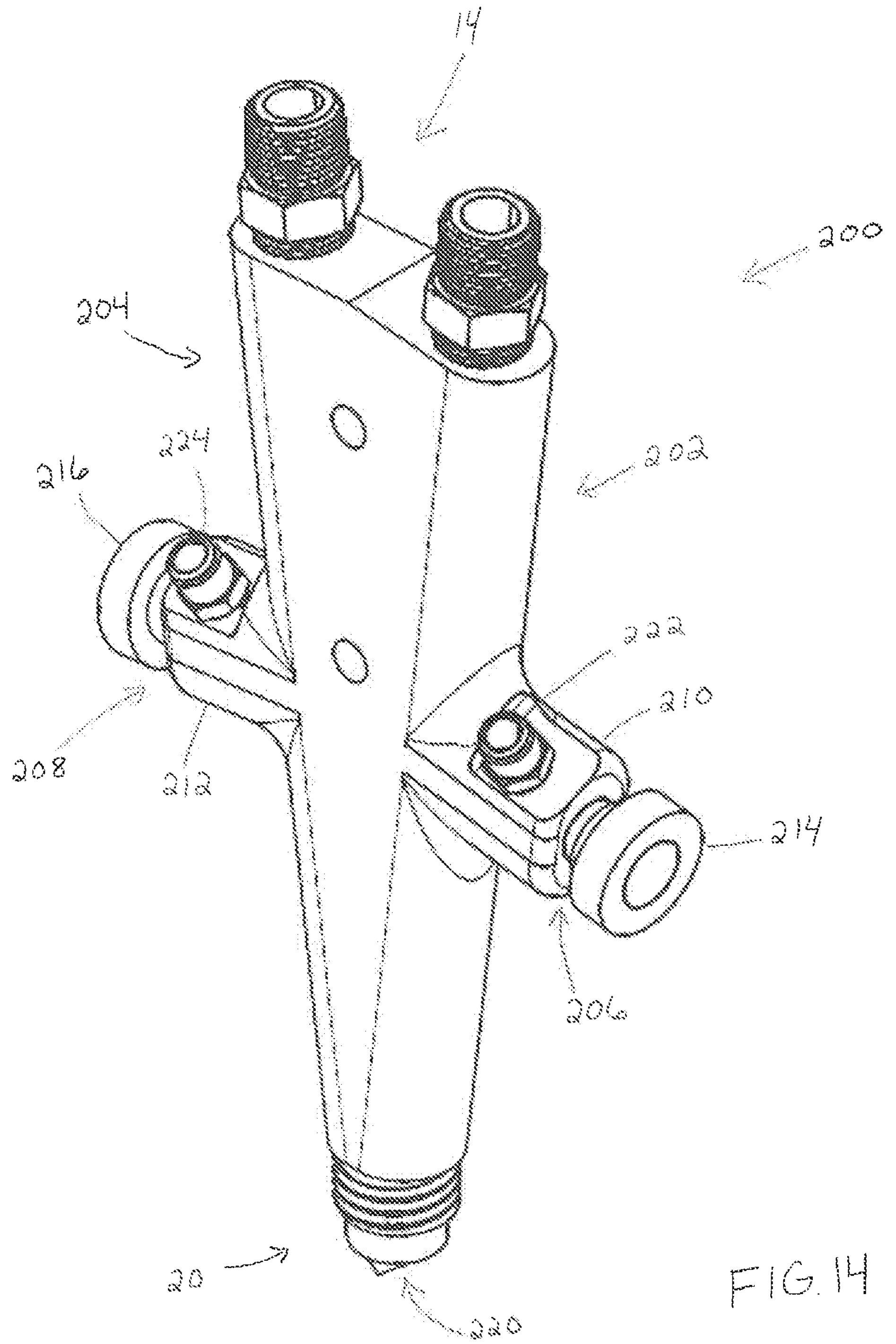
FIG. 14 is a second side perspective view of a manifold in accordance with an embodiment of the present invention.
Figure 15:
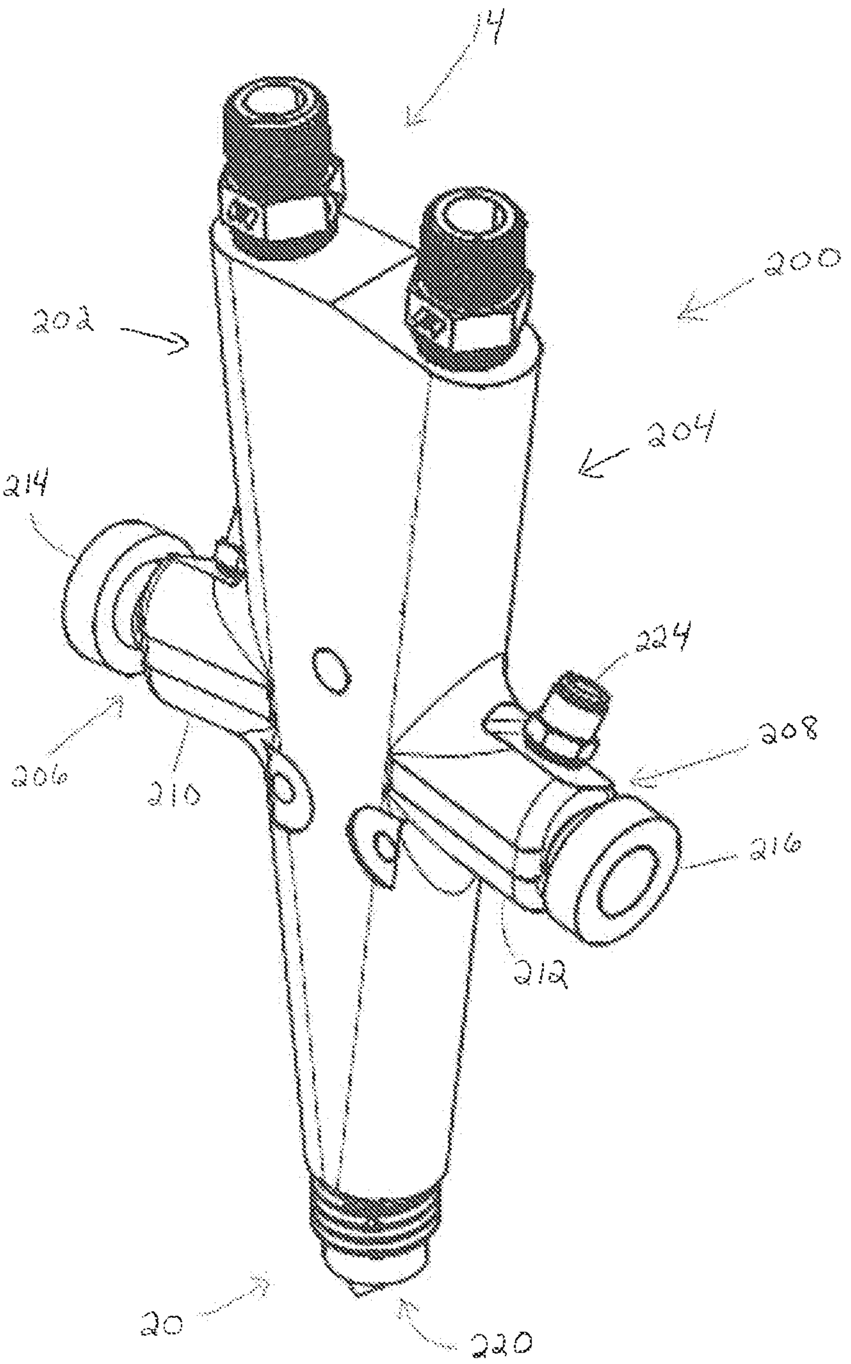
FIG. 15 is another first side perspective view of a manifold in accordance with an embodiment of the present invention.
Figure 16:
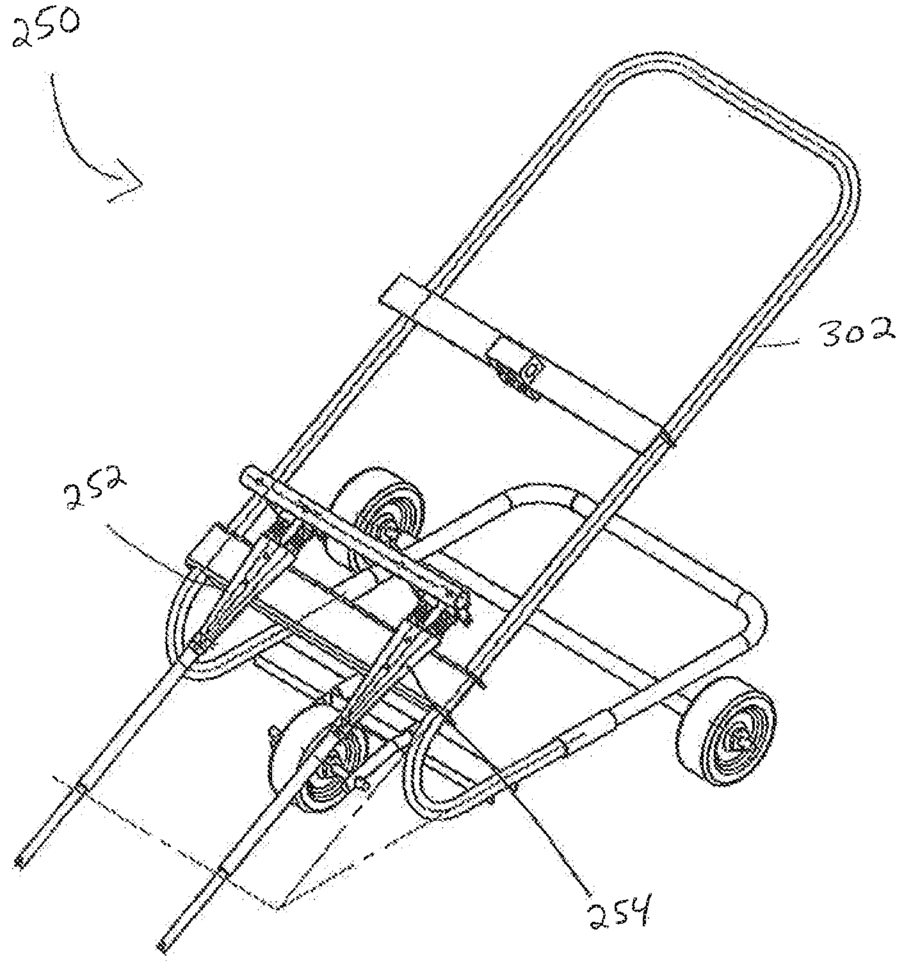
FIG. 16 is a perspective view of a fluid dispensing system in accordance with an embodiment of the present invention.
Figure 17:
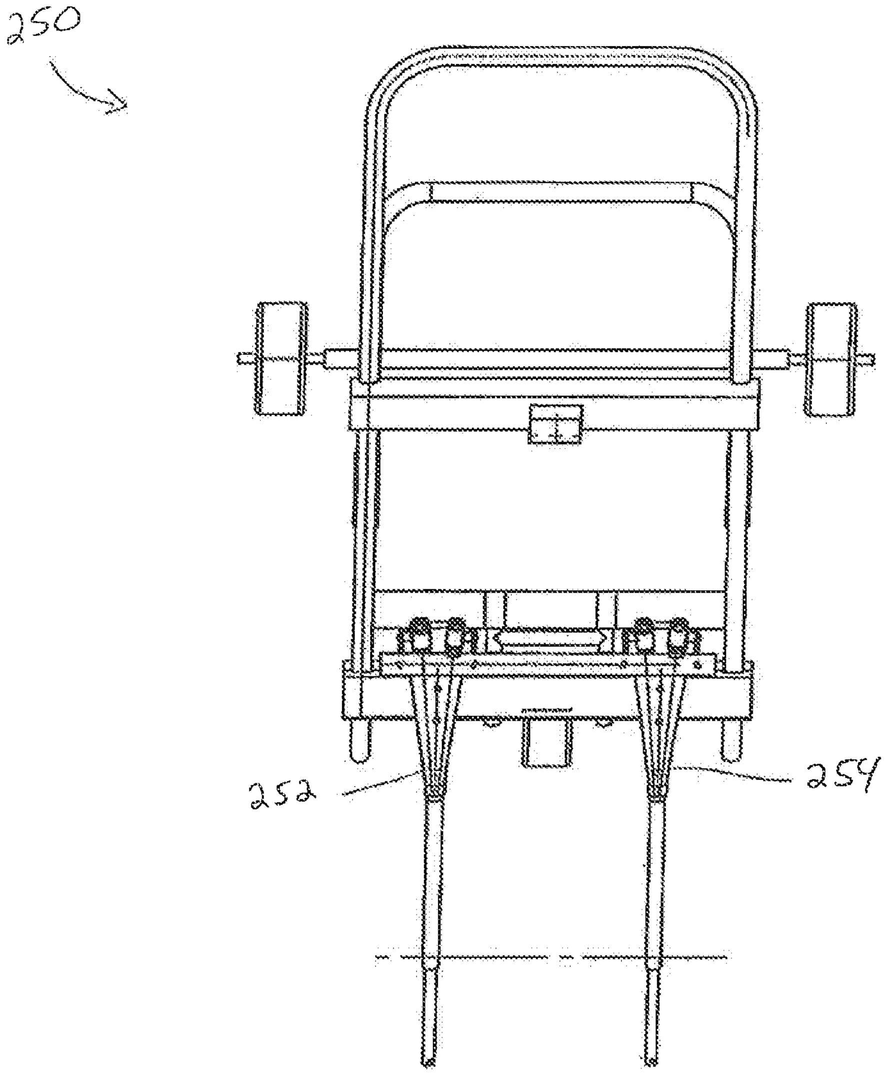
FIG. 17 is a top perspective view of a fluid dispensing system in accordance with an embodiment of the present invention.
Figure 18:
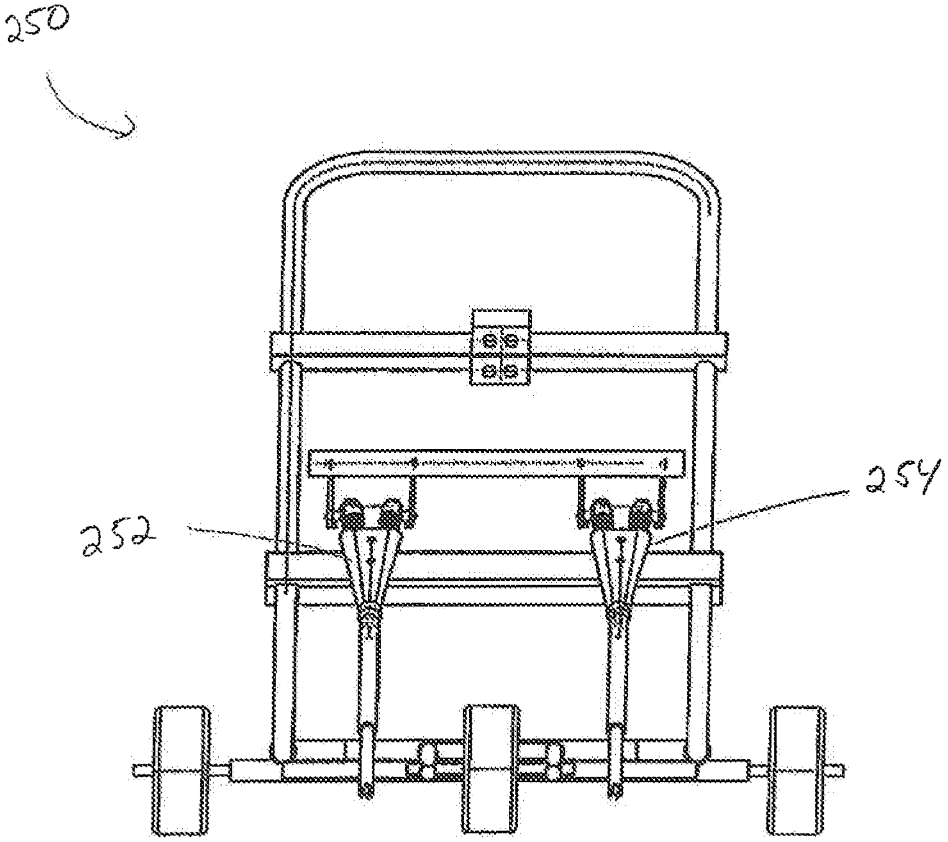
FIG. 18 is a front perspective view of a fluid dispensing system in accordance with an embodiment of the present invention.
Figure 19:
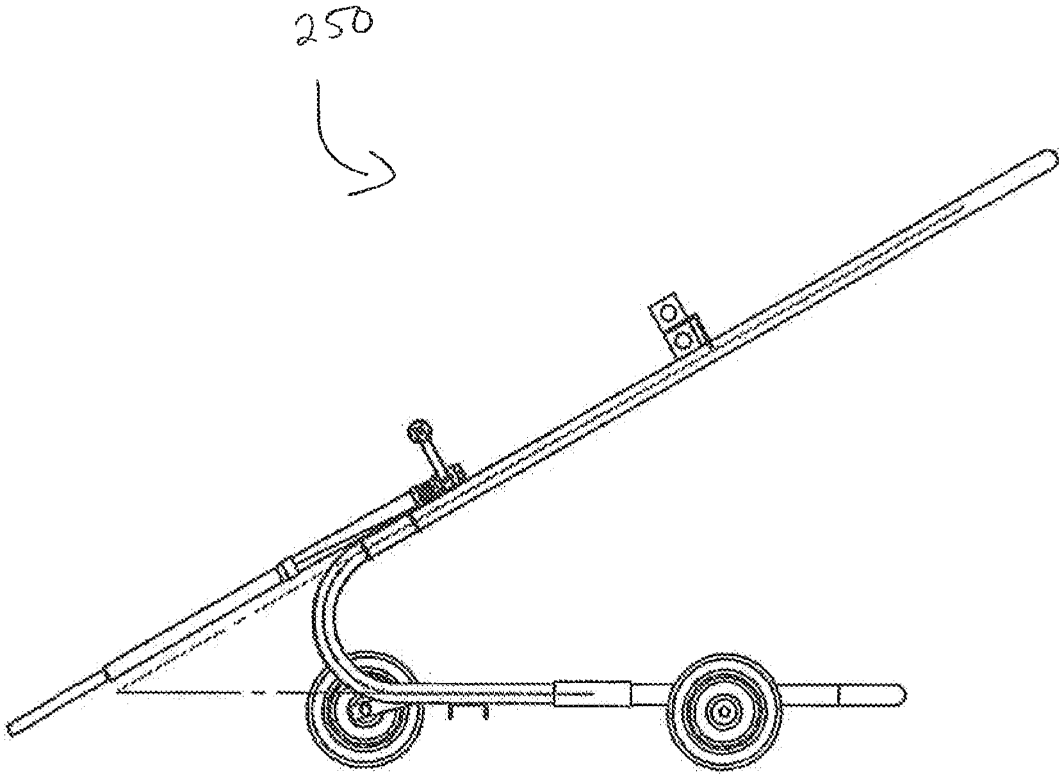
FIG. 19 is a side perspective view of a fluid dispensing system in accordance with an embodiment of the present invention.

Disadvantageously, referring to FIG. 11, a clog 150 formed within a prior art manifold 100 is difficult to clean. Prior art manifold 100 includes first side 102 defining first input 160 and second input 162, second side 104 defining third input 164 and fourth input 166, third side 106 defining fifth input 168, and fourth side 108 defining sixth input 170. A first angled channel 110 includes a first channel portion 112, a second channel portion 114 located perpendicular to first channel portion 112, and a third channel portion 116 located perpendicular to second channel portion 114. First and second channel portions 112 and 114 are connected by a first elbow or first ninety-degree turn 118 and second and third channel portions 114 and 116 are connected by a second elbow or second-ninety degree turn 120 as shown in FIG. 11. A second angled channel 130 includes a first channel portion 132, a second channel portion 134 located perpendicular to first channel portion 132, and a third channel portion 136 located perpendicular to second channel portion 134. First and second channel portions 132 and 134 are connected by a first elbow or first ninety-degree turn 138 and second and third channel portions 134 and 136 are connected by a second elbow or second-ninety degree turn 140 as shown in FIG. 11. As discussed previously, to clean a clog 150 from a prior art manifold 100, a user needs to remove, a downstream plumbing component 180, liquid supply lines 182, and side set screws 184 as shown in FIG. 11. Next, a user must plug liquid supply lines 182 to prevent undesired drainage. Only after all these components are removed and plugged may a tool such as drill bit 190 be inserted. However, to clean first angled channel 110, a user must insert the drill bit 190 into first input 160 to clear out the clog 150 in first channel portion 112. Next, the user must insert the drill bit 190 into third input 164 to clear out the clog 150 in third channel portion 116. Next, the user must insert the drill bit 190 into fifth input 168 to clear out the clog 150 in second channel portion 114. To clean second angled channel 130, a user must insert the drill bit 190 into second input 162 to clear out the clog 150 in first channel portion 132. Next, the user must insert the drill bit 190 into fourth input 166 to clear out the clog 150 in third channel portion 136. Next, the user must insert the drill bit 190 into sixth input 170 to clear out the clog 150 in second channel portion 134. After all six of these inputs are cleaned, then a user must reinstall side set screws 184, remove the plugs in liquid supply lines 182, reconnect the liquid supply lines 182, and reconnect downstream plumbing component 180. The process to clean a prior art manifold 100 is very time consuming and complicated.

Where mixing occurs downstream of the vee manifold 10, an efficient method of preventing overnight hardening in the vee manifold 10 is to do nothing as material downstream acts as a seal of the vee manifold 10.

Comparative Example: A white lap adhesive is commonly used in the roofing industry to seal membranes. The white lap adhesive involves the mixing of a first material comprising of polyurethane polymer and an isocyanate, and a second material comprising a polyol and polypropylene glycol. Common industry practice utilizes conventional manifolds, as shown in U.S. patent application publication 2012/0012054 A1 FIG. 5, for this application. Chemical reaction within conventional manifolds can create a solid clog requiring one hour of down time to restore the wye manifolds to production. A preferred embodiment of the vee manifold 10 made of UHMW, having two inlets 12, two cylindrical channels 30, individual outlet openings 38 and a mixing tip, was used with the white lap adhesive (FIGS. 1-3) and similar clogs cleared in about 15 seconds upon applying upstream pressure from the fluids.

FIGS. 12-15 and 33-39 illustrate other exemplary embodiments of a vee manifold 200 of the present disclosure. The embodiment illustrated in FIGS. 12-15 and 33-39 includes similar components to the embodiment illustrated in FIGS. 1-10, and the similar components are denoted by similar reference numbers. For the sake of brevity, these similar components and the similar steps of using vee manifold 200 (FIGS. 12-15 and 33-39) will not all be discussed in conjunction with the embodiments illustrated in FIGS. 12-15 and 33-39.

Referring to FIGS. 12-15 and 33-39, the vee manifold 200 offers a uniquely designed device that provides for increased flow performance, at a reduced pressure, and a flow path that is easily maintained as compared to prior art wye manifolds.

Additionally, vee manifold 200 includes air channels that allow for further easy cleaning and maintenance of the vee manifold 200.

Referring to FIGS. 12-15 and 33-39, the vee manifold 200 includes an inlet or top side 14, an outlet or bottom side 20, a first side 202, and a second side 204. The vee manifold 200 includes a first air channel 206 at the first side 202 and a second air channel 208 at the second side 204. Referring to FIGS. 12-15 and 33-39, the vee manifold 200 includes a first boss 210 extending outward from the first side 202. In one embodiment, the first boss 210 defines a portion of the first air channel 206. Referring to FIGS. 12-15 and 33-39, the vee manifold 200 includes a second boss 212 extending outward from the second side 204. In one embodiment, the second boss 212 defines a portion of the second air channel 208. In one embodiment, the first channel 60 (FIGS. 3 and 36) and the second channel 70 (FIGS. 3 and 36) of the vee manifold 200 flow into, and are mixed within, a static mixing tip 220 that is attachable at the outlet or bottom side 20. As described above, referring to FIGS. 3 and 36, the first channel longitudinal axis 62 is linear and the second channel longitudinal axis 72 is linear.

In one exemplary embodiment, referring to FIGS. 12-15 and 33-39, the vee manifold 200 includes a first control portion 214 that is engageable with a portion of the first air channel 206. For example, the first control portion 214 is transitionable between a first position in which the first air channel 206 is closed and a second position in which the first air channel 206 is open.

In one exemplary embodiment, referring to FIGS. 12-15 and 33-39, the vee manifold 200 includes a second control portion 216 that is engageable with a portion of the second air channel 208. For example, the second control portion 216 is transitionable between a first position in which the second air channel 208 is closed and a second position in which the second air channel 208 is open.

In one embodiment, the first control portion 214 and the second control portion 216 are valves. In other embodiments, the first control portion 214 and the second control portion 216 are other control portions such as fasteners.

Figure 36:
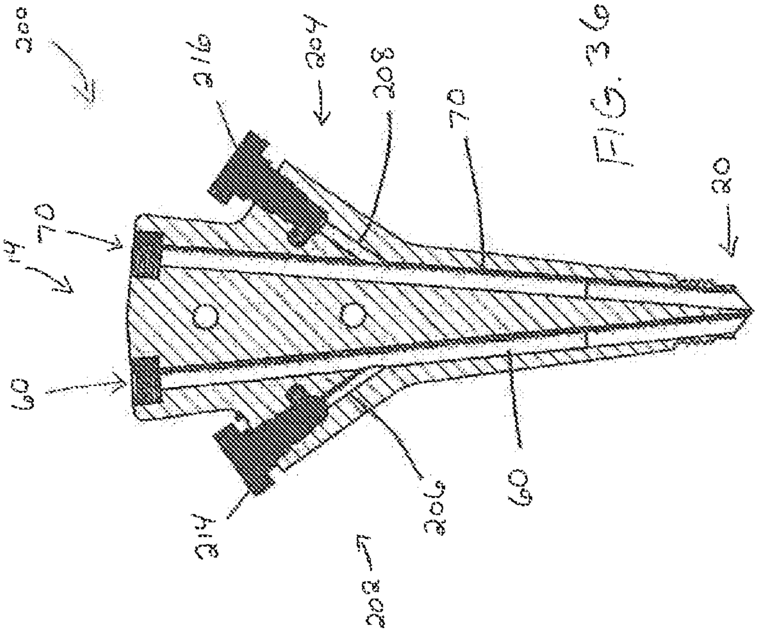
FIG. 36 is a cross-sectional view of a manifold in accordance with another embodiment of the present invention.

With the first control portion 214 in the second position, an air source is connectable to the first air channel 206. With the air source connectable to the first air channel 206, air is used to blow out and clean the interior portions of the vee manifold 200, a static mixing tip 220, and the first channel 60 (FIGS. 3 and 36). In this manner, the first air channel 206 allows for easy cleaning and maintenance of the vee manifold 200. With the first control portion 214 in the first position, the first control portion 214 closes the first air channel 206.

With the second control portion 216 in the second position, an air source is connectable to the second air channel 208. With the air source connectable to the second air channel 208, air is used to blow out and clean the interior portions of the vee manifold 200, a static mixing tip 220, and the second channel 70 (FIGS. 3 and 36). In this manner, the second air channel 208 allows for easy cleaning and maintenance of the vee manifold 200. With the second control portion 216 in the first position, the second control portion 216 closes the second air channel 208. Utilizing air to clean out a static mixing tip reduces the number of mixing tips needed to complete an application. Pausing for a few minutes often causes the mixed materials to begin to harden thus requiring the tip to be replaced. This also reduces the time required to replace each mixing tip.

In one exemplary embodiment, referring to FIGS. 12-15, the vee manifold 200 includes a first grease fitting 222 and a second grease fitting 224. The first grease fitting 222 and the second grease fitting 224 can be used to attach a grease gun and fill portions of the vee manifold 200 with grease to seal such portions from air.

Referring to FIGS. 12-15 and 33-39, the vee manifold 200 offers a uniquely designed device that provides for increased flow performance, at a reduced pressure, and a flow path that is easily maintained as compared to prior art wye manifolds. Additionally, vee manifold 200 includes air channels 206, 208 that allow for further easy cleaning and maintenance of the vee manifold 200. For example, the air channels 206, 208 of a vee manifold 200 of the present disclosure allow for a user to use air to purge the manifold 200 or a system in a multiple receiving portion configuration. In an exemplary embodiment, opening the valves, e.g., the control portions 214, 216 of the vee manifold 200, to allow pressurized air to push out substance components A and B simultaneously can be used not only in the cleaning phase, but also in the application phase. The rushing air causes the mixed material stream to behave differently from an uninterrupted stream. The air causes the mixed material to exit the mixing tip in smaller bits and pieces landing on a substrate as globules. These small mixed material portions can be used to create a spatter pattern. Such a pattern can be advantageous over a bead pattern in certain applications. It is often advantageous to have a substrate coated entirely by a liquid such as a coating or adhesive. The action necessary to accomplish a specified mill thickness involves two steps: (1) placing the material in close proximity to and in an adequate quantity of the final application location; and (2) moving the material from the close proximity to the final location of application. The most common application procedure involves the dip and roll method. This method involves dipping an applicator such as a paint roller into a container of a liquid substance. When the roller is withdrawn from the container the outside of the roller has excess liquid. The roller is then used to dab the substrate leaving large puddles of liquid. The second step of placing this liquid in its final location can be time consuming and require a great effort as the roller pushes and flattens the liquid from puddles to an even coverage as specified. The process of pushing these puddles is especially difficult when the material is a multicomponent material which becomes more viscous with each passing moment. In the case of a multicomponent liquid being extruded out the opening of a static mixing tip, the liquid is placed on a substrate in a bead. The location of these heads are arranged in a manner that will provide sufficient liquid to adequately cover the area local to the bead. Beads are generally ¼" to 1" wide and are necessarily located in a liner pattern. The bead pattern is accomplished by a combination of the stream of liquid and the movement of the mixing tip over the substrate. The subsequent procedure to move this liquid bead from its' local placement to its' final location can be difficult and require a great deal of effort. Additionally, multicomponent materials that have exited a static mixing tip are changing viscosities. The longer the time delay between the dispensing of the stream of mixed liquid and the time of the push to the final location by an application device such as a roller, the more difficult this mechanical push becomes. By interrupting this stream of mixed liquid with pressurized air and thereby causing the mixed liquid to disperse further from the exit opening of a static mixing tip the resulting spatter pattern is significantly advantageous. The location of each globule of liquid is closer to its' final location so that the distance to push the liquid is less thereby reducing the energy required for the application. The amount of material of each globule is less, about 1/16" to ⅜", thereby requiring less energy to push to the final location as the mixed liquid cures in an even coverage as specified. The spatter pattern is also advantageous for the application of adhesives to a substrate. The smaller globules am closer together than beads which enhances uplift resistance. The thicker bead can cause the layer of material it is adhering to be further away from the substrate to which it is being adhered. In the case of adhering fleeceback flexible roofing materials, the location of the beads can be seen on the upper surface of the roofing membrane. This is an esthetically unpleasant application. The smaller globules created by the spatter pattern eliminate this detrimental characteristic of the application.

FIGS. 42-47 illustrate an exemplary embodiment of a control portion of the present disclosure.

Importantly, a control portion 230 of the present disclosure solves many disadvantages relating to scaling an open channel. For example, sealing an open channel between adhesive flow and pressurized air can be difficult. Even more difficult is the breaking of this mechanical seal if it becomes unintentionally and undesirably bonded into place. The seal must be tight when the moving pats are in the closed position to prevent flow of adhesive into the air channel and conversely the seal must be tight enough to prevent pressurized air from leaking into the adhesive channel. Adding to this problem is the potential of adhesive to cure at the seal. When this happens, the moving parts can be adhesively bonded thus preventing the seal from being reopened. Valves such as ball valves can be permanently ruined by caustic adhesives and coatings.

Advantageously, a control portion 230 of the present disclosure eliminates these problems and detrimental occurrences.

Referring to FIGS. 42-47, a control portion 230 of the present disclosure includes an outer portion 232 formed of a first material and an inner portion 234 formed of a second material that is different than the first material. In one embodiment, the outer portion 232 is formed of a first material such as bronze, steel, or aluminum. It is envisioned that other materials may be used to form the outer portion 232. In one embodiment, the inner portion 234 is formed of a second material such as urethane. In one exemplary embodiment, the inner portion 234 is formed of a molded urethane. It is envisioned that other materials may be used to form the inner portion 234.

Referring to FIGS. 42-47, the outer portion 232 of the control portion 230 is rotatable relative to the inner portion 234 of the control portion 230. The control portion 230 is transitionable between a first position in which an air channel 206, 208 is closed and a second position in which an air channel 206, 208 is open. In one embodiment, with the control portion 230 in the second position, an air source is connectable to the air channel 206, 208.

In one embodiment, the outer portion 232 includes a threaded portion 236. In this manner, the outer portion 232 can be threadingly connected to an air channel 206, 208 of the manifold 200. In an exemplary embodiment, the control portion 230 is transitionable between a first position in which an air channel 206, 208 is closed, i.e., the control portion 230 is received and connected within the air channel 206, 208, and a second position in which an air channel 206, 208 is open, i.e., the control portion 230 is removed from the air channel 206, 208.

The outer portion 232 and the inner portion 234 of the control portion 230 are free to rotate relative to each other because the inner portion 234 of the control portion 230 is formed of a second material that is different than the first material of the outer portion 232. For example, an inner portion 234 formed of an inner urethane core is not bonded to an outer portion 232 formed of a metal and the inner portion 234 and the outer portion 232 are therefore free to rotate.

In one exemplary embodiment, an inner portion 234 formed of urethane is molded to a shape to match the angled aperture of an air channel 206, 208 of the manifold 200 so as to provide a positive mechanical seal. The rotation of the control portion 230 utilizes mechanical leverage to force the inner portion 234 formed of urethane sealably against the receiving portion of the manifold 200 thereby creating a barrier between the substance being dispensed and the pressurized air.

In one exemplary embodiment, with the control portion 230 in the first position, the inner portion 234 provides a mechanical seal with the air channel 206, 208. In one exemplary embodiment, with the control portion 230 in the first position, only a portion of the inner portion 234 is in contact with the air channel 206, 208.

Advantageously, a control portion 230 of the present disclosure eliminates the above-described problems and detrimental occurrences, and also provides a mechanism to overcome an adhesive bond that may be formed with the control portion 230.

For example, if an adhesive accidently cures inside the air channel 206, 208 of the manifold 200 and to a portion of the control portion 230 it can cause a tip portion 238 of the inner portion 234 to be adhesively attached to the inside of the manifold 200 in the air channel 206, 208.

In one exemplary embodiment, the control portion 230 includes an external air seal portion or O-ring 249.

In such a situation, the control portion 230 of the present disclosure is not prevented from turning, but rather the outer portion 232 of the control portion 230 remains free of adhesive. For example the threaded portion 236 of the outer portion 232 remains free of adhesive. As the control portion 230 is rotated to remove the control portion 230 from the air channel 206, 208 of the manifold 200, the inner portion 234 formed of urethane will not turn but will remain stationary inside the rotating outer portion 232. In other words, although the inner portion 234 may not move, the outer portion 232 is still free to rotate. As the rotating outer portion 232 is being retracted from the air channel 206, 208 of the manifold 200, the rotating outer portion 232 pulls the inner portion 234 formed of urethane axially away from the cured adhesive portion. The mechanical advantage of the rotating outer portion 232, e.g., turning metal threads, provides sufficient force to overcome the adhesive bond and remove the control portion 230 from the air channel 206, 208 of the manifold 200.

The freedom to turn the outer portion 232 of the control portion 230 even if the inner portion 234 is adhesively attached to and temporarily stationary inside of the manifold 200 in the air channel 206, 208 provides a mechanism to easily remedy the problems associated with such cured adhesive bonds.

Additionally, if the cure of the adhesive in the air channel 206, 208 is significant, the control portion 230 of the present disclosure can easily be retracted from the air channel 206, 208 of the manifold 200 and the air channel 206, 208 can then be cleared out with a standard drill bit.

Referring to FIG. 46, in one embodiment, the manifold or block 200 includes a first air channel 206 at a first side 202 and a second air channel 208 at a second side 204. The vee manifold 200 of the present disclosure may include a first control portion 230 and a second control portion 240. The second control portion 240 is transitionable between a first position in which the second air channel 208 is closed and a second position in which the second air channel 208 is open.

Referring to FIGS. 42-47, the second control portion 240 of the present disclosure includes an outer portion 242 formed of a first material and an inner portion 244 formed of a second material that is different than the first material. In one embodiment, the outer portion 242 is formed of a first material such as bronze, steel, or aluminum. It is envisioned that other materials may be used to form the outer portion 242. In one embodiment, the inner portion 244 is formed of a second material such as urethane. In one exemplary embodiment, the inner portion 244 is formed of a molded urethane. It is envisioned that other materials may be used to form the inner portion 244.

Referring to FIGS. 42-47, the outer portion 242 of the second control portion 240 is rotatable relative to the inner portion 244 of the second control portion 240. The second control portion 240 is transitionable between a first position in which an air channel 206, 208 is closed and a second position in which an air channel 206, 208 is open. In one embodiment, with the second control portion 240 in the second position, an air source is connectable to the air channel 206, 208.

In one embodiment, the outer portion 242 includes a threaded portion 246. In this manner, the outer portion 242 can be threadingly connected to an air channel 206, 208 of the manifold 200. In an exemplary embodiment, the second control portion 240 is transitionable between a first position in which an air channel 206, 208 is closed, i.e., the second control portion 240 is received and connected within the air channel 206, 208, and a second position in which an air channel 206, 208 is open, i.e., the second control portion 240 is removed from the air channel 206, 208.

The outer portion 242 and the inner portion 244 of the second control portion 240 are free to rotate relative to each other because the inner portion 244 of the second control portion 240 is formed of a second material that is different than the first material of the outer portion 242. For example, an inner portion 244 formed of an inner urethane core is not bonded to an outer portion 242 formed of a metal and the inner portion 244 and the outer portion 242 are therefore free to rotate.

In one exemplary embodiment, an inner portion 244 formed of urethane is molded to a shape to match the angled aperture of an air channel 206, 208 of the manifold 200 so as to provide a positive mechanical seal. The rotation of the second control portion 240 utilizes mechanical leverage to force the inner portion 244 formed of urethane scalably against the receiving portion of the manifold 200 thereby creating a barrier between the substance being dispensed and the pressurized air.

In one exemplary embodiment, with the second control portion 240 in the first position, the inner portion 244 provides a mechanical seal with the air channel 206, 208. In one exemplary embodiment, with the second control portion 240 in the first position, only a portion of the inner portion 244 is in contact with the air channel 206, 208.

Advantageously, a second control portion 240 of the present disclosure eliminates the above-described problems and detrimental occurrences, and also provides a mechanism to overcome an adhesive bond that may be formed with the second control portion 240 in the same manner as described in detail above with respect to the first control portion 230.

For example, as described above, if an adhesive accidently cures inside the air channel 206, 208 of the manifold 200 and to a portion of the control portion 240 it can cause a tip portion 248 of the inner portion 244 to be adhesively attached to the inside of the manifold 200 in the air channel 206, 208.

In such a situation, the control portion 240 of the present disclosure is not prevented from turning, but rather the outer portion 242 of the control portion 240 remains free of adhesive. For example the threaded portion 246 of the outer portion 242 remains free of adhesive. As the control portion 240 is rotated to remove the control portion 240 from the air channel 206, 208 of the manifold 200, the inner portion 244 formed of urethane will not turn but will remain stationary inside the rotating outer portion 242. In other words, although the inner portion 244 may not move, the outer portion 242 is still free to rotate. As the rotating outer portion 242 is being retracting from the air channel 206, 208 of the manifold 200, the rotating outer portion 242 pulls the inner portion 244 formed of urethane axially away from the cured adhesive portion. The mechanical advantage of the rotating outer portion 242, e.g., turning metal threads, provides sufficient force to overcome the adhesive bond and remove the control portion 240 from the air channel 206, 208 of the manifold 200.

The freedom to turn the outer portion 242 of the control portion 240 even if the inner portion 244 is adhesively attached to and temporarily stationary inside of the manifold 200 in the air channel 206, 208 provides a mechanism to easily remedy the problems associated with such cured adhesive bonds.

Additionally, if the cure of the adhesive in the air channel 206, 208 is significant, the control portion 240 of the present disclosure can easily be retracted from the air channel 206, 208 of the manifold 200 and the air channel 206, 208 can then be cleared out with a standard drill bit.

Figure 58:
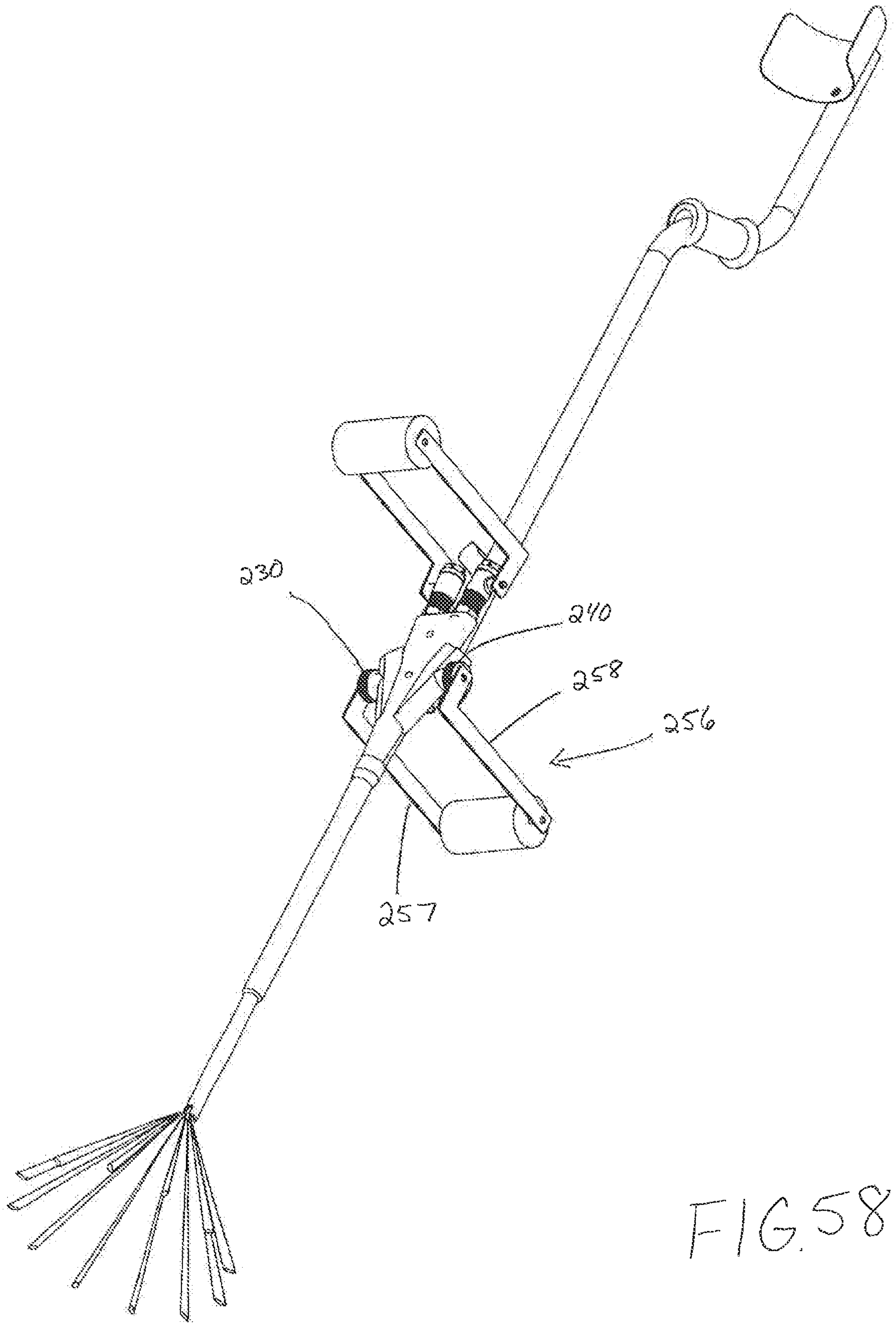
FIG. 58 is a perspective view of a manifold and carrier with a yoke assembly in accordance with another embodiment of the present invention.

Referring to FIG. 58, in another exemplary embodiment, the first control portion 230 and the second control portion 240 include a yoke assembly 256 having a first yoke handle 257 and a second yoke handle 258. In one embodiment, the first yoke handle 257 is engaged with the first control portion 230 and the second yoke handle 258 is engaged with the second control portion 240. In this manner, an operator or user of the system of the present disclosure is able to simultaneously open both control portions 230, 240 at the same time in the manner described above. Opening both valves, i.e., control portions 230, 240, at the same time allows both “A” component and “B” component, e.g., a first component A flowing through a first channel 60 and a second component B flowing through a second channel 70 of the manifold 200, to be flushed simultaneously. In one embodiment, a first control portion 230 would be engageable with the first air channel 206 with right hand threads and a second control portion 240 would be engageable with the second air channel 208 with left hand threads. In this manner, both the first control portion 230 and the second control portion 240 are able to be opened and closed via the yoke assembly 256 simultaneously.

Referring to FIGS. 37-39 and 45-47, an air clean out procedure using control portions 230, 240 will now be discussed.

Figure 37:
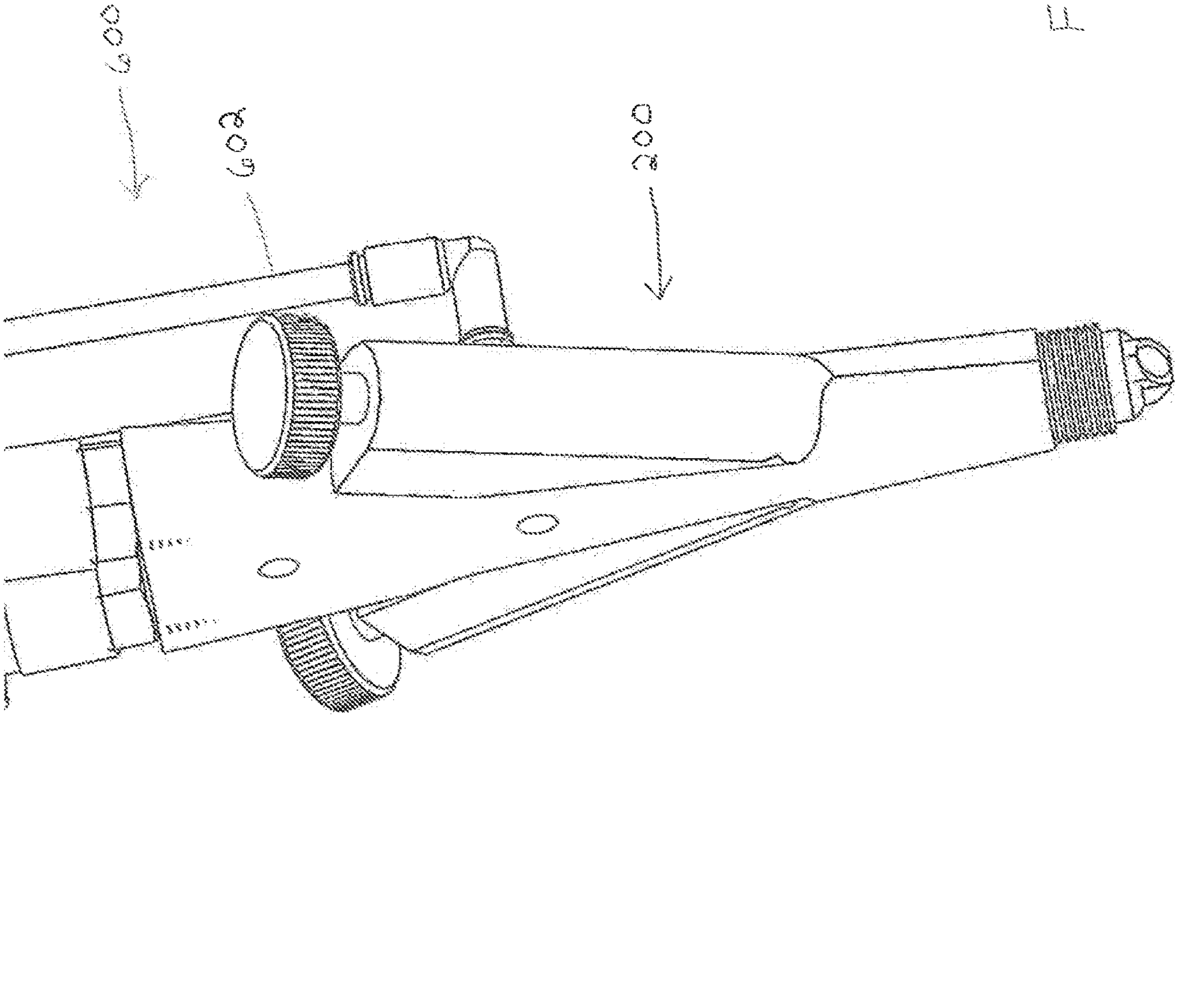
FIG. 37 is a perspective view of a manifold in accordance with another embodiment of the present invention.
Figure 38:
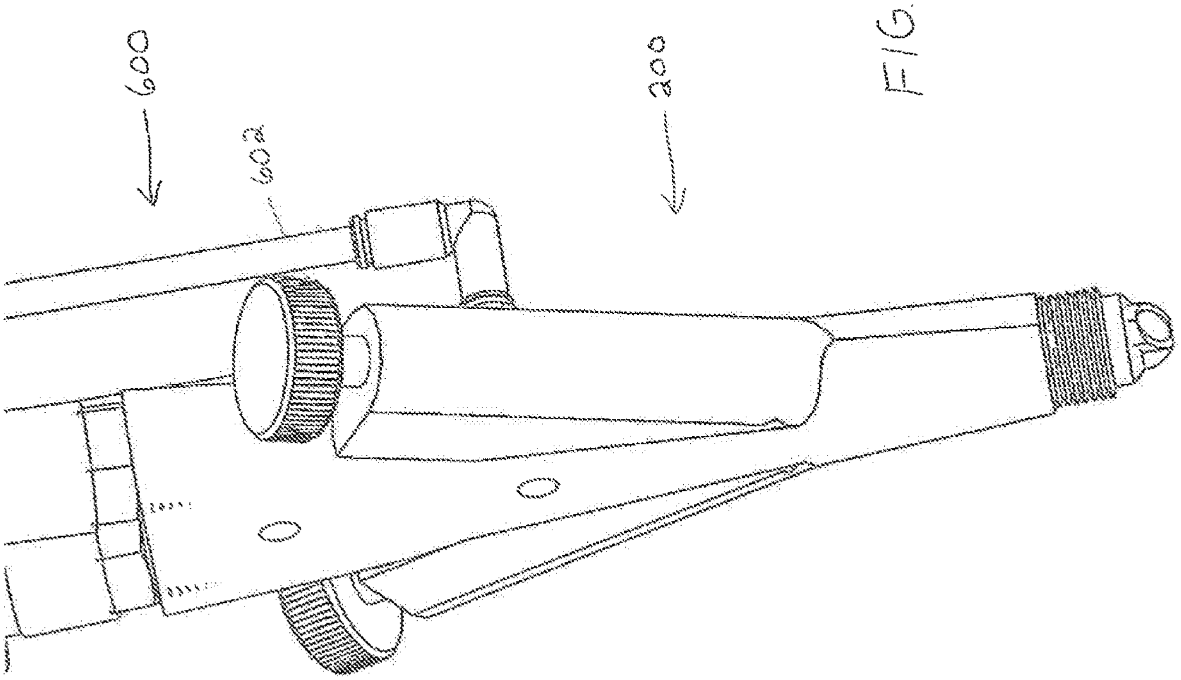
FIG. 38 is a perspective view of a manifold in accordance with another embodiment of the present invention.
Figure 39:
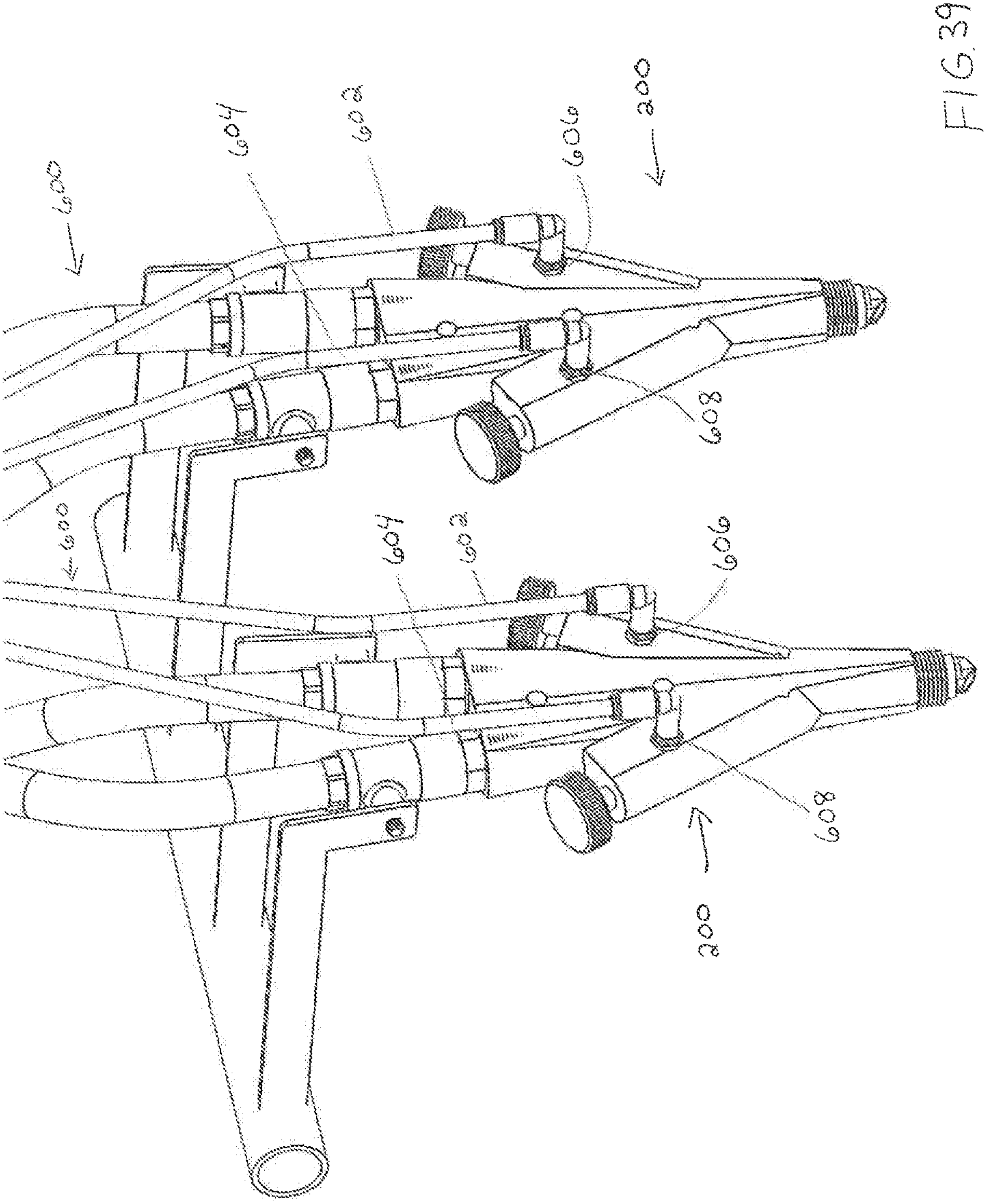
FIG. 39 is a perspective view of a fluid dispensing system in accordance with another embodiment of the present invention.
Figure 40:
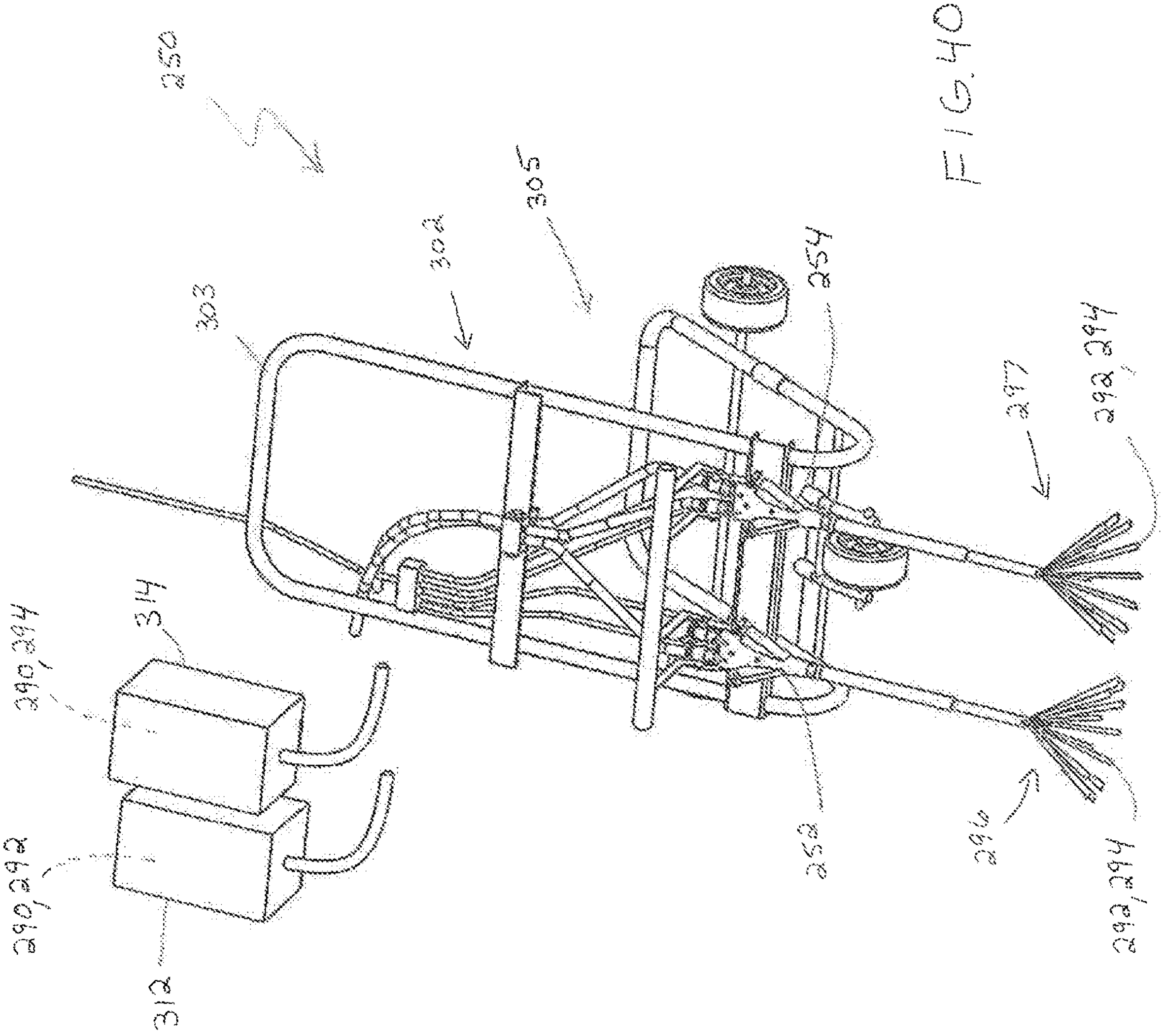
FIG. 40 is a perspective view of a fluid dispensing system in accordance with another embodiment of the present invention.

Referring to FIGS. 37-39 and 45-47, a system of the present disclosure includes an air source 600 having a first air hose 602 and a second air hose 604. In one embodiment, the manifold 200 of the present disclosure includes a first air inlet 606 and a second air inlet 608. Importantly, the first air inlet 606 and the second air inlet 608 are in communication with the first air channel 206 and the second air channel 208, respectively. Furthermore, the first air inlet 606 and the second air inlet 608 are also spaced from the first air channel 206 and the second air channel 208, respectively, to ensure that any clogging does not affect the performance of the first air inlet 606 and the second air inlet 608. Referring to FIGS. 37-39, a first air hose 602 is connected to a first air inlet 606 and a second air hose 604 is connected to a second air inlet 608. Referring to FIG. 46, with the control portions 230, 240 connected to the air channels 206, 208, respectively, a portion of the first control portion 230 blocks the first air inlet 606 and a portion of the second control portion 240 blocks the second air inlet 608. In this manner, no air is able to flow from the air inlet 606, 608 to the air channels 206, 208. When an operator wishes to clean any clogged portions of the air channels 206, 208, the operator removes the control portions 230, 240 from the air channels 206, 208, respectively. With the control portions 230, 240 removed, a source of pressurized air is able to flow via the air hoses 602, 604 through the air inlets 606, 608 and to the air channels 206, 208 to efficiently remove any debris or clogging contained therein.

In one embodiment, a first air hose 602 is directly connected to a first air inlet 606 and a second air hose 604 is directly connected to a second air inlet 608. In other exemplary embodiments, a first air hose 602 is connected to a first air inlet 606 via a fitting, e.g., a 90 degree fitting, and a second air hose 604 is connected to a second air inlet 608 via a fitting, e.g., a 90 degree fitting.

FIGS. 48-57 illustrate an exemplary embodiment of a carrier 260 of the present disclosure for a manifold 200 of the present disclosure.

Importantly, a carrier 260 of the present disclosure provides a mechanism for applying an adhesive and/or a two-part adhesive easier.

Referring to FIGS. 48-57, a dispensing system 262 of the present disclosure includes a manifold 200 and a carrier 260. The carrier 260 is connectable to the manifold 200. In one embodiment, the carrier 260 generally includes a linear portion 264, an angle portion 266, a threaded portion 270 of the manifold 200, a valve 272, a yoke handle 274, a connecting handle 275, mounting portions 276 of the manifold 200, a grip portion 278, a cuff portion 280 having a cuff wall 282, and a locking cam 284.

Advantageously, the carrier 260 of the present disclosure allows a user to hold and maneuver the carrier 260 and the manifold 200 in a variety of ways and with a variety of different hand grip orientations.

Figure 20:
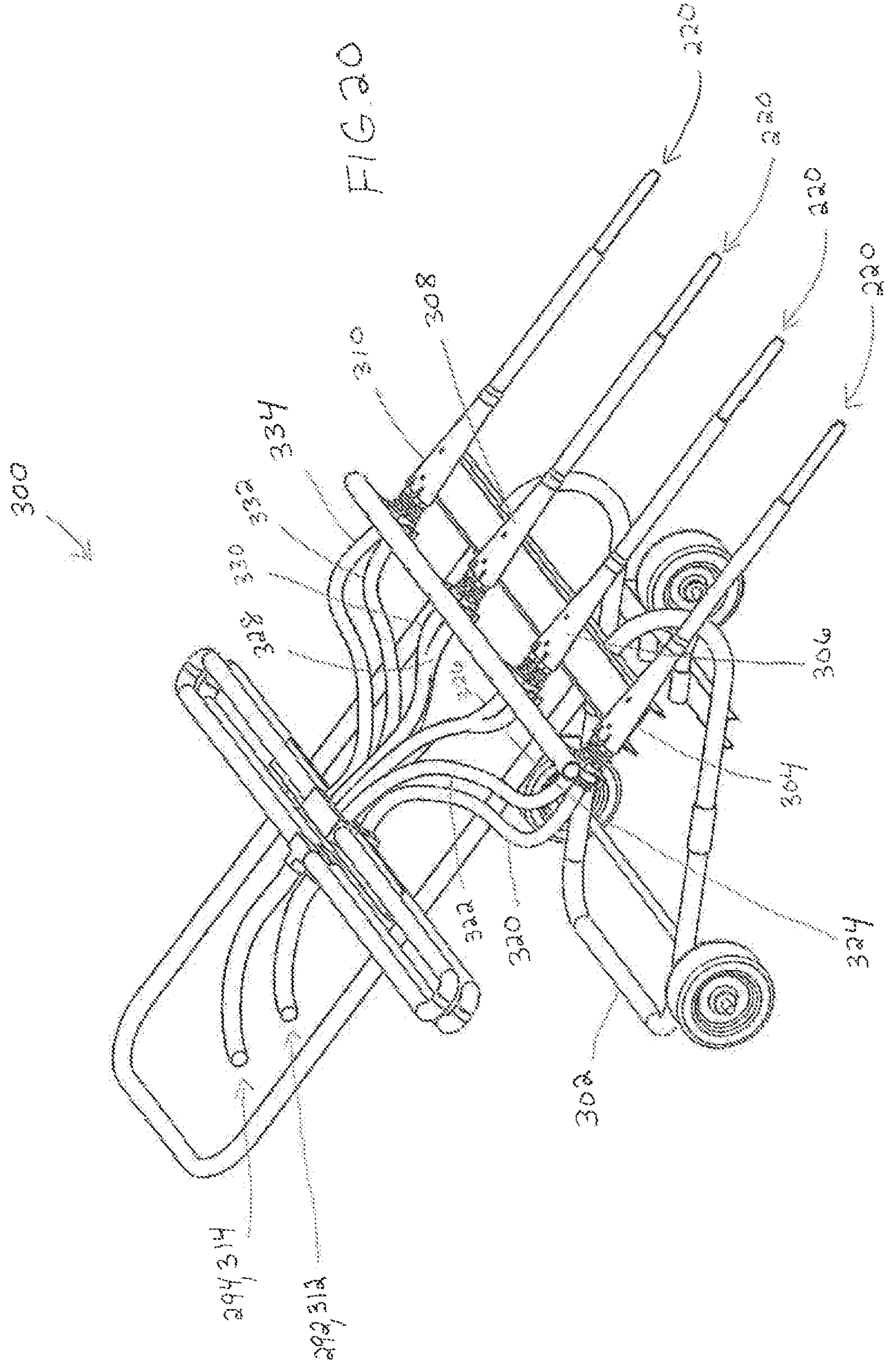
FIG. 20 is a perspective view of a fluid dispensing system in accordance with another embodiment of the present invention.
Figure 21:
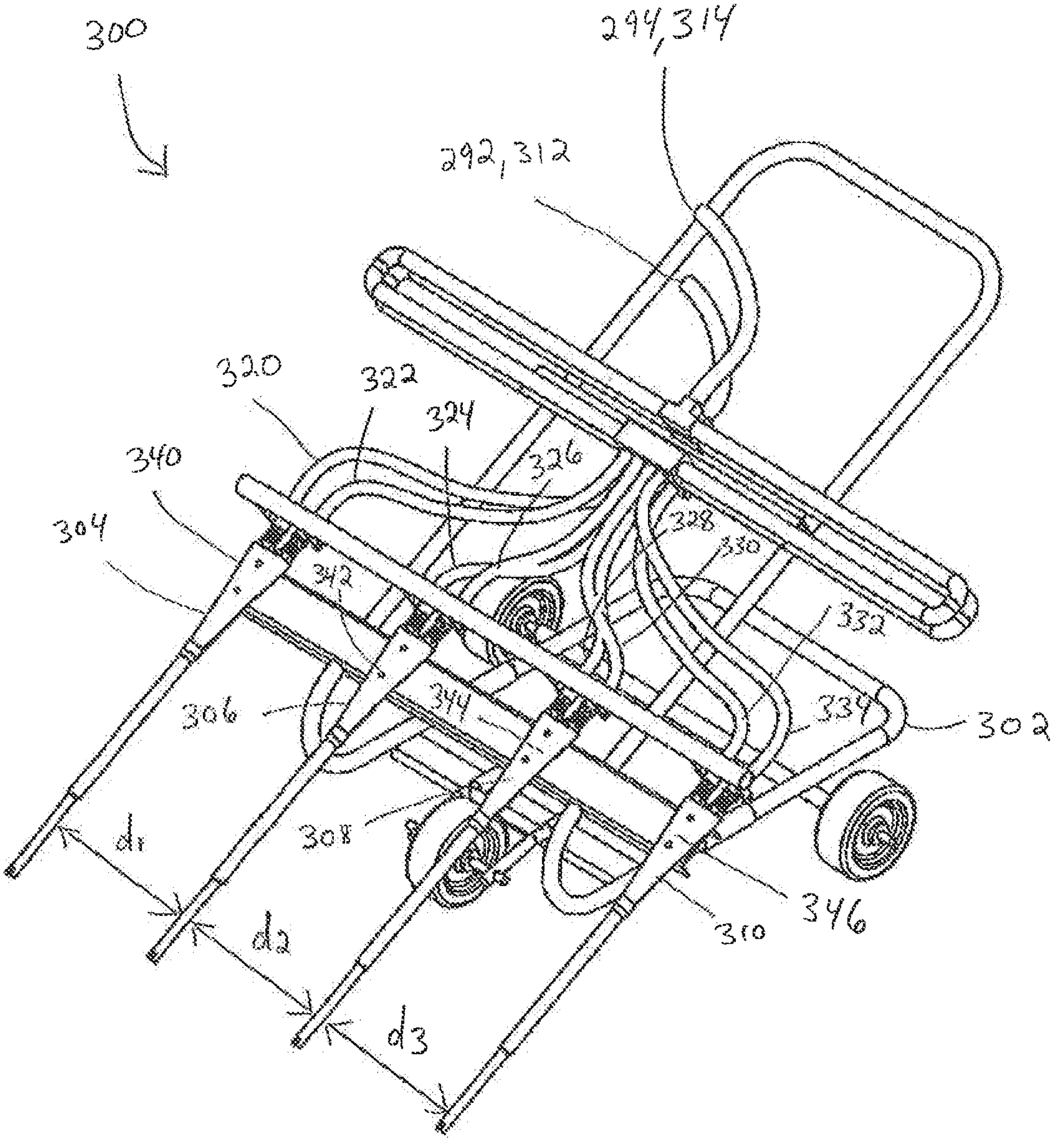
FIG. 21 is a perspective view of a fluid dispensing system in accordance with another embodiment of the present invention.
Figure 22:
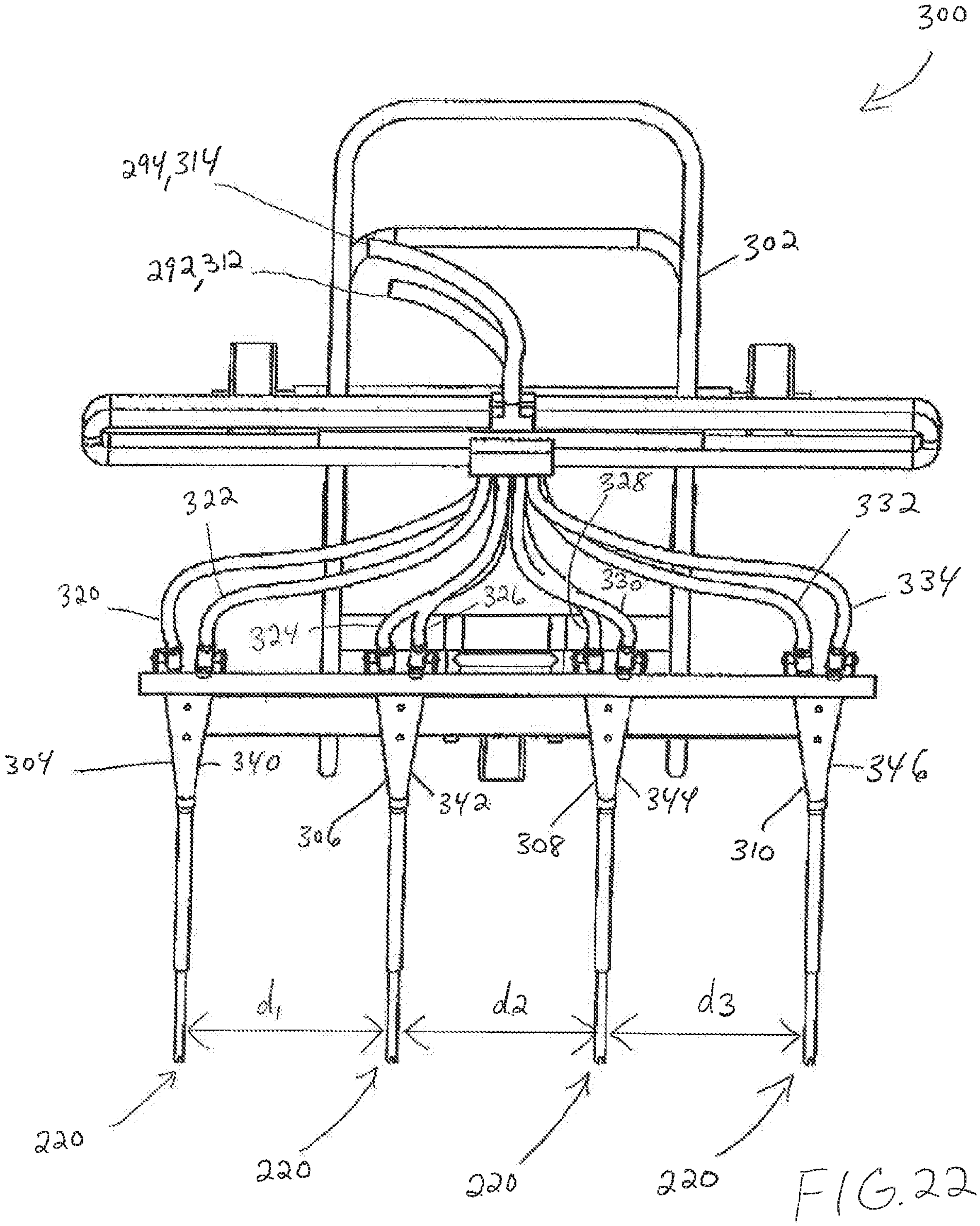
FIG. 22 is a top perspective view of a fluid dispensing system in accordance with another embodiment of the present invention.
Figure 23:
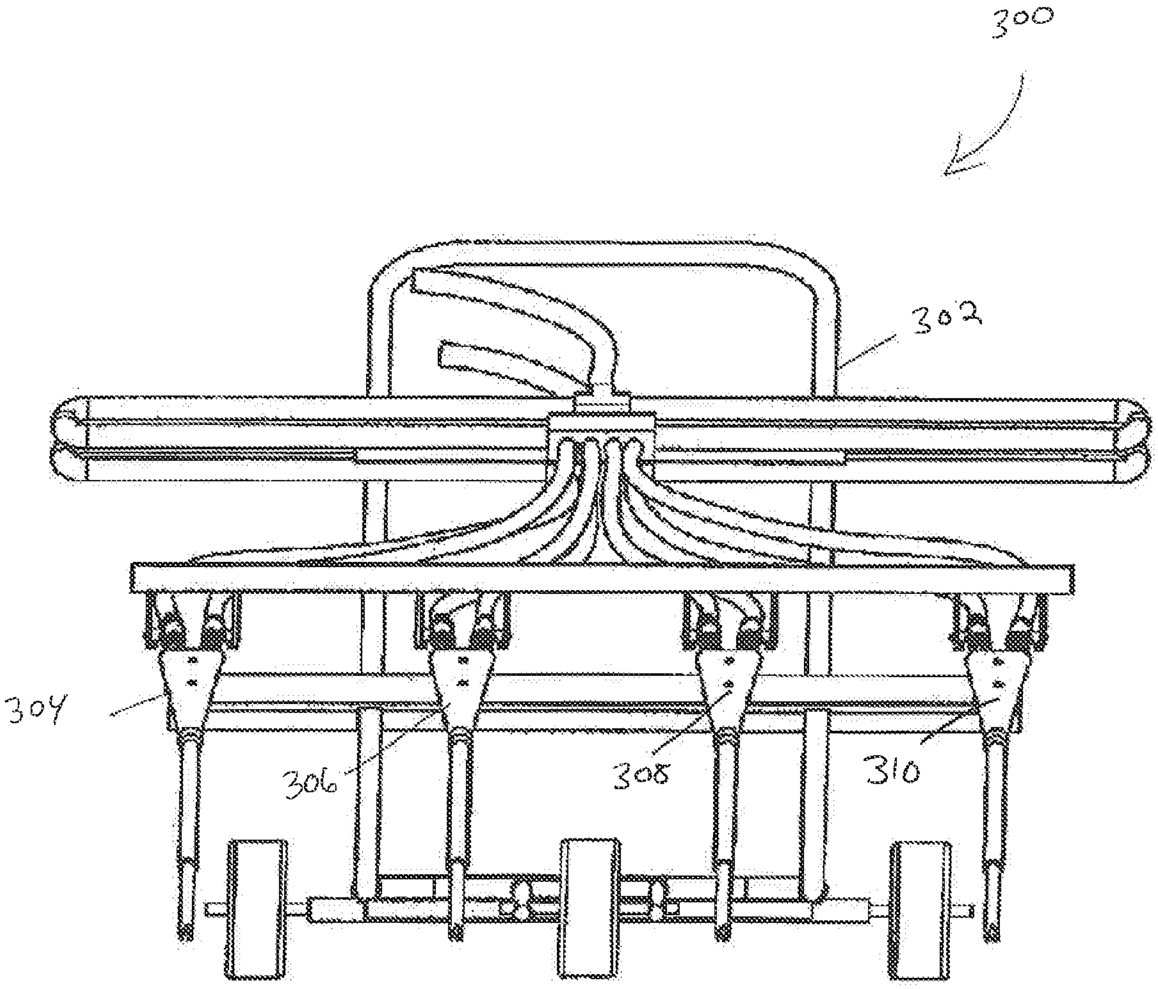
FIG. 23 is a front perspective view of a fluid dispensing system in accordance with another embodiment of the present invention.
Figure 24:
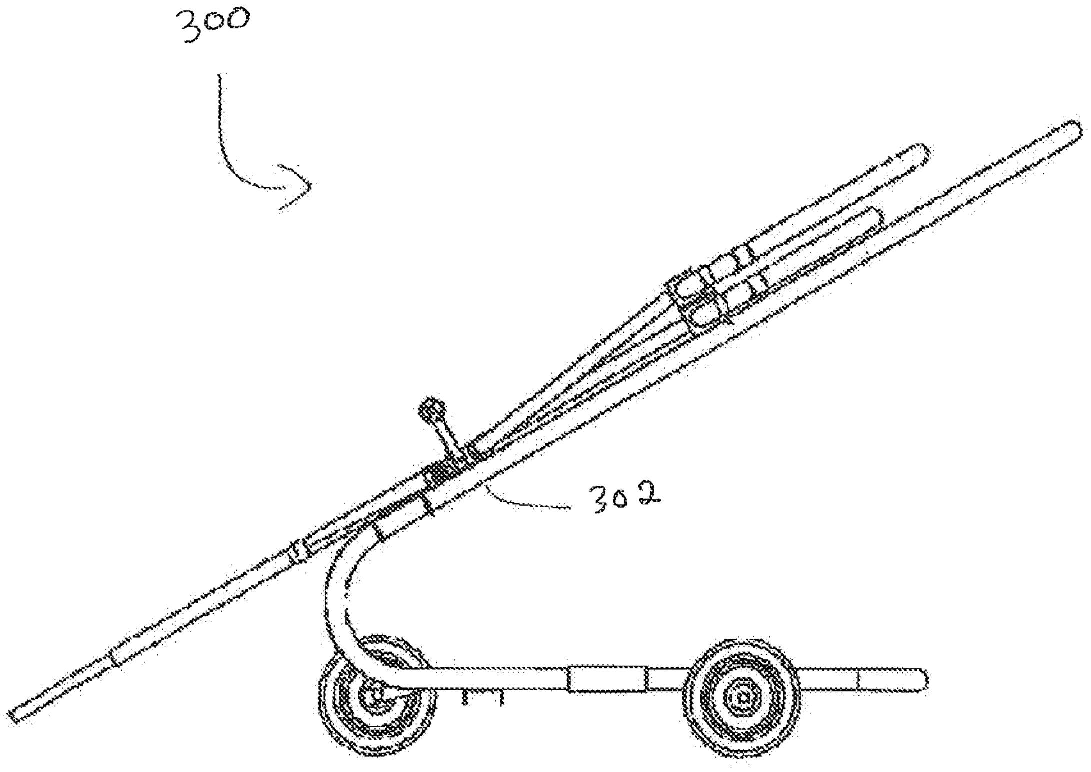
FIG. 24 is a side perspective view of a fluid dispensing system in accordance with another embodiment of the present invention.
Figure 25:
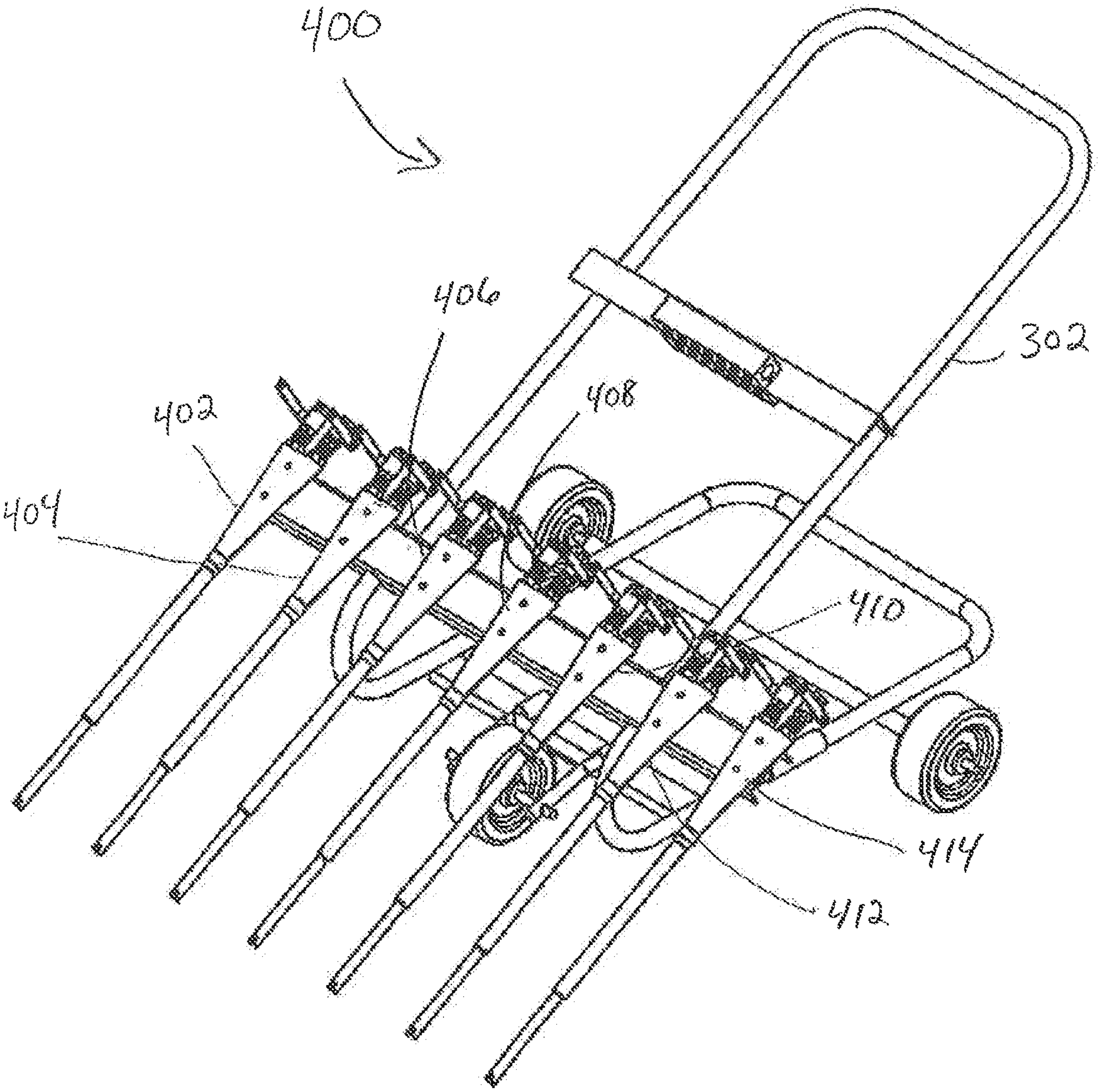
FIG. 25 is a perspective view of a fluid dispensing system in accordance with another embodiment of the present invention.
Figure 26:
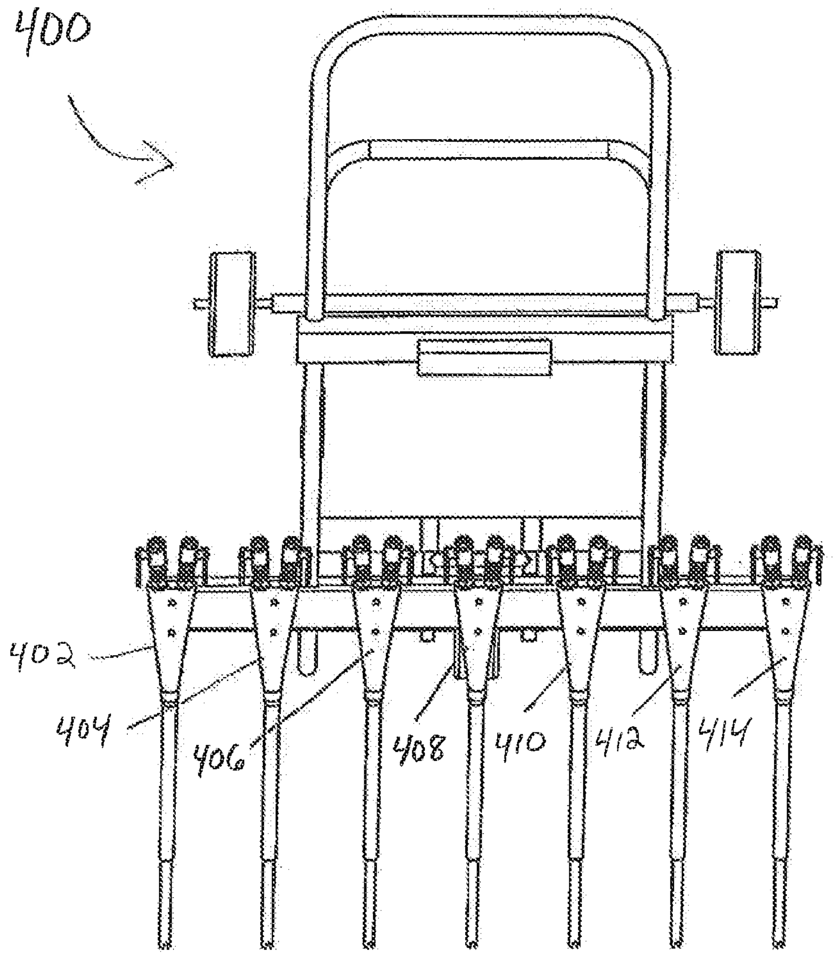
FIG. 26 is atop perspective view of a fluid dispensing system in accordance with another embodiment of the present invention.
Figure 27:
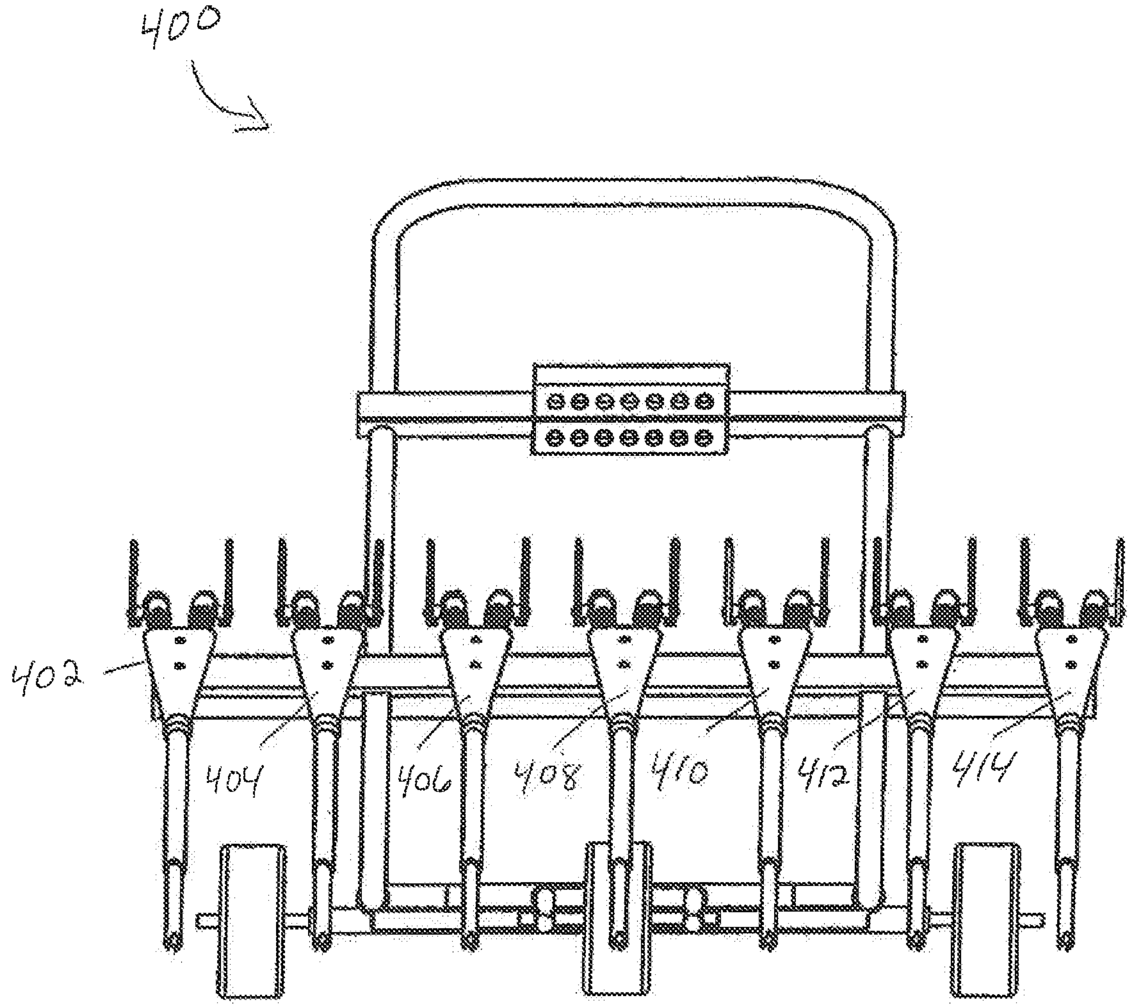
FIG. 27 is a front perspective view of a fluid dispensing system in accordance with another embodiment of the present invention.
Figure 28:
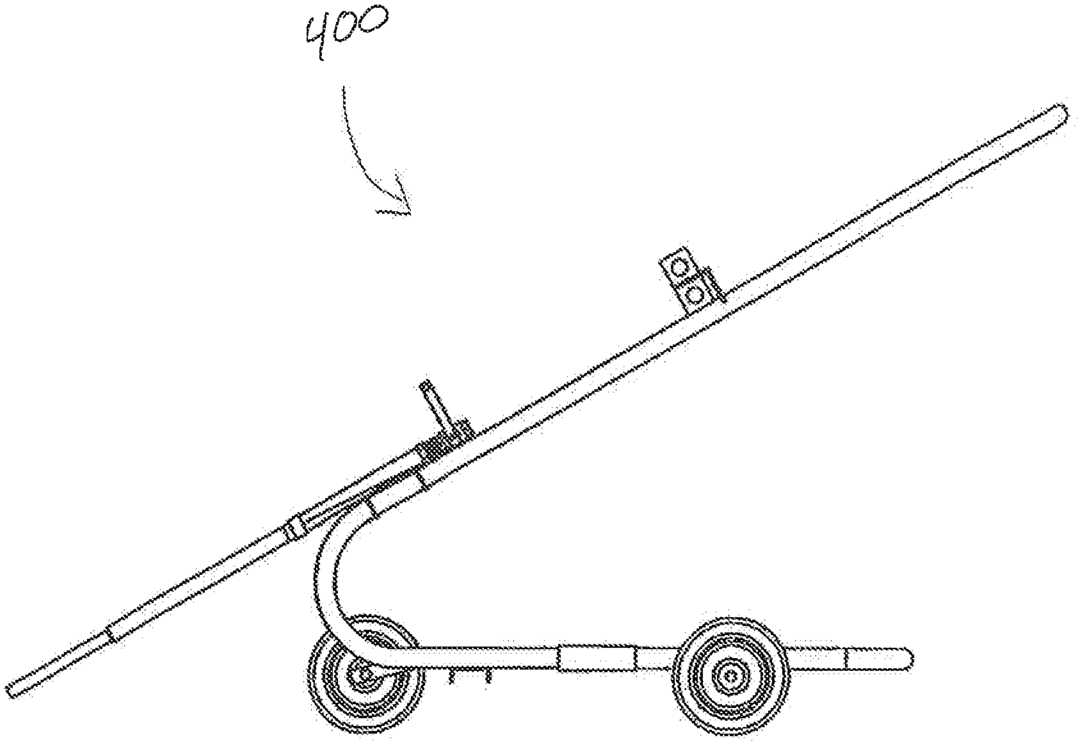
FIG. 28 is a side perspective view of a fluid dispensing system in accordance with another embodiment of the present invention.
Figure 29:
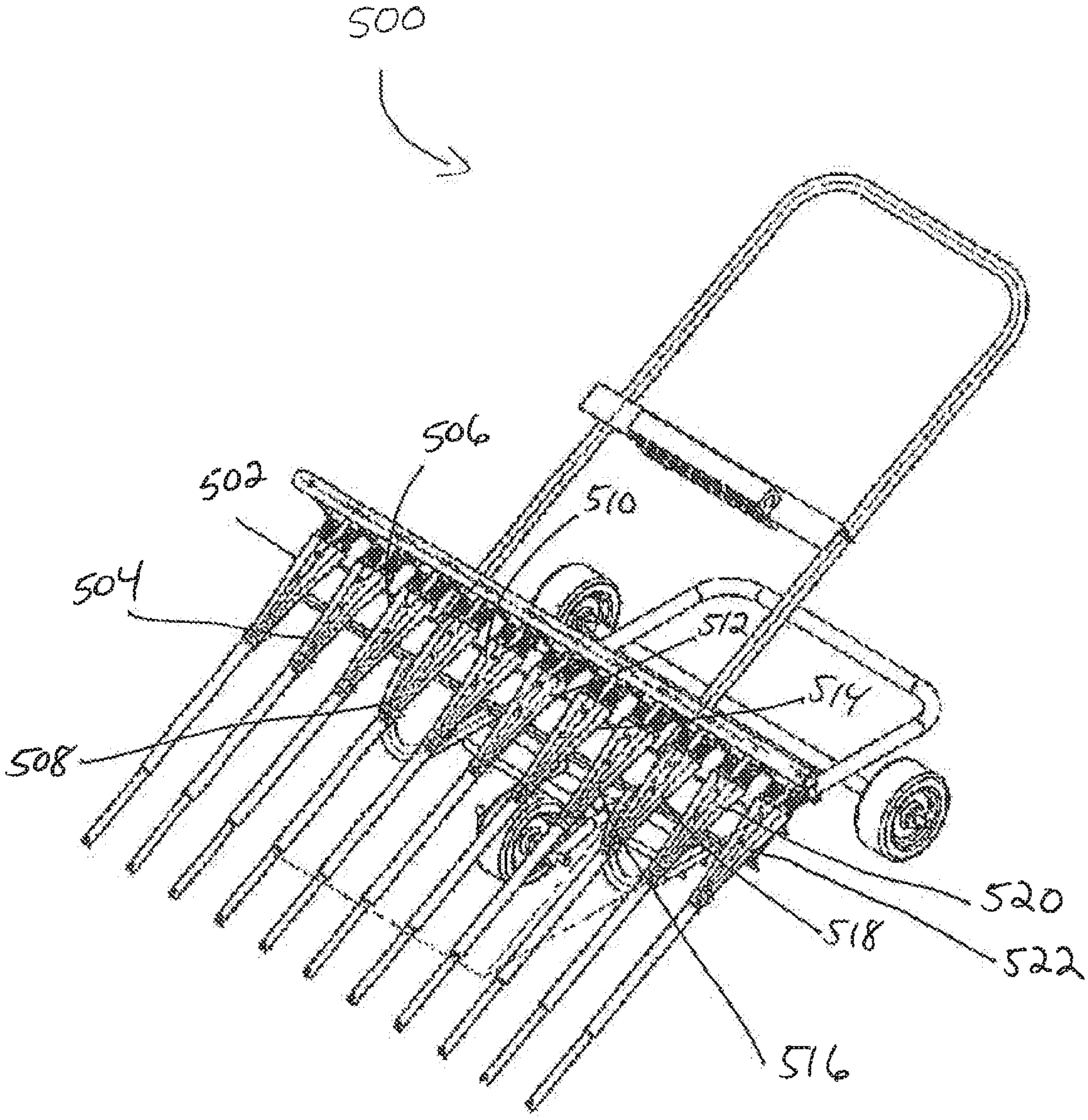
FIG. 29 is a perspective view of a fluid dispensing system in accordance with another embodiment of the present invention.
Figure 30:
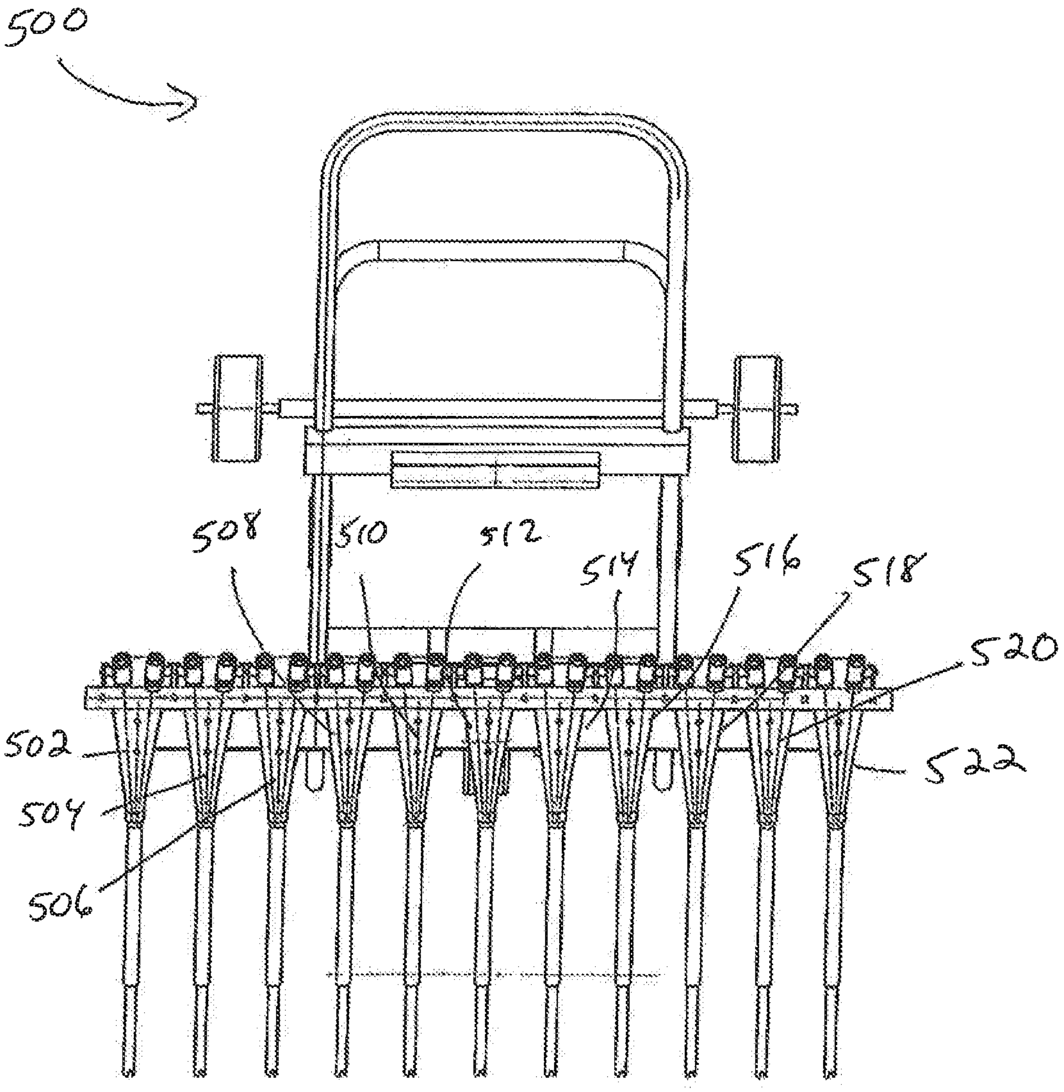
FIG. 30 is atop perspective view of a fluid dispensing system in accordance with another embodiment of the present invention.
Figure 31:
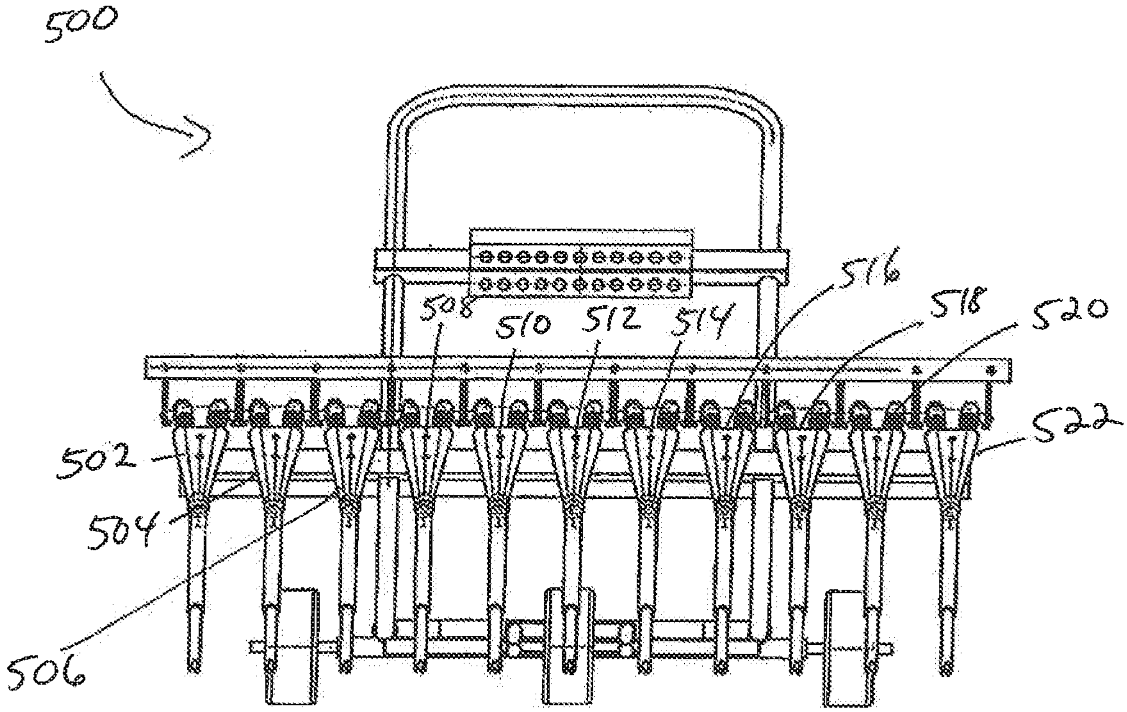
FIG. 31 is a front perspective view of a fluid dispensing system in accordance with another embodiment of the present invention.
Figure 32:
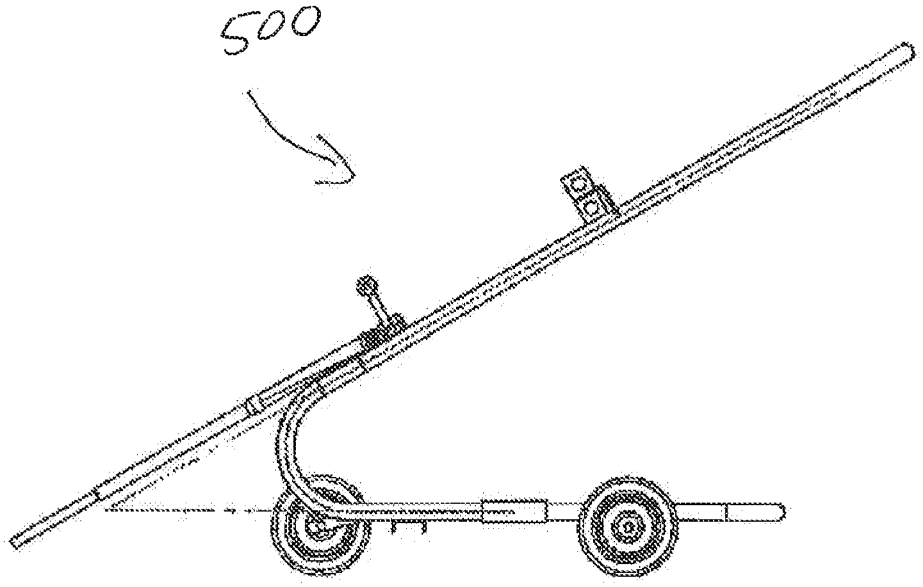
FIG. 32 is a side perspective view of a fluid dispensing system in accordance with another embodiment of the present invention.
Figure 33:
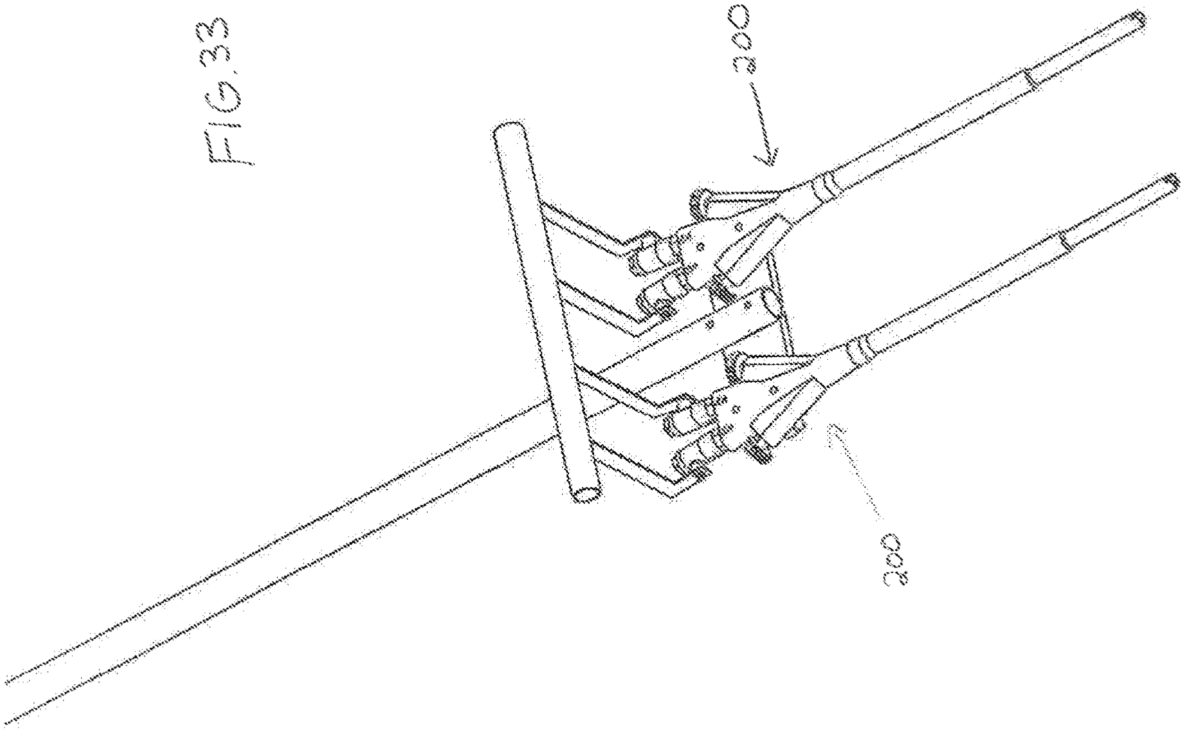
FIG. 33 is a perspective view of a fluid dispensing system in accordance with another embodiment of the present invention.
Figure 34:
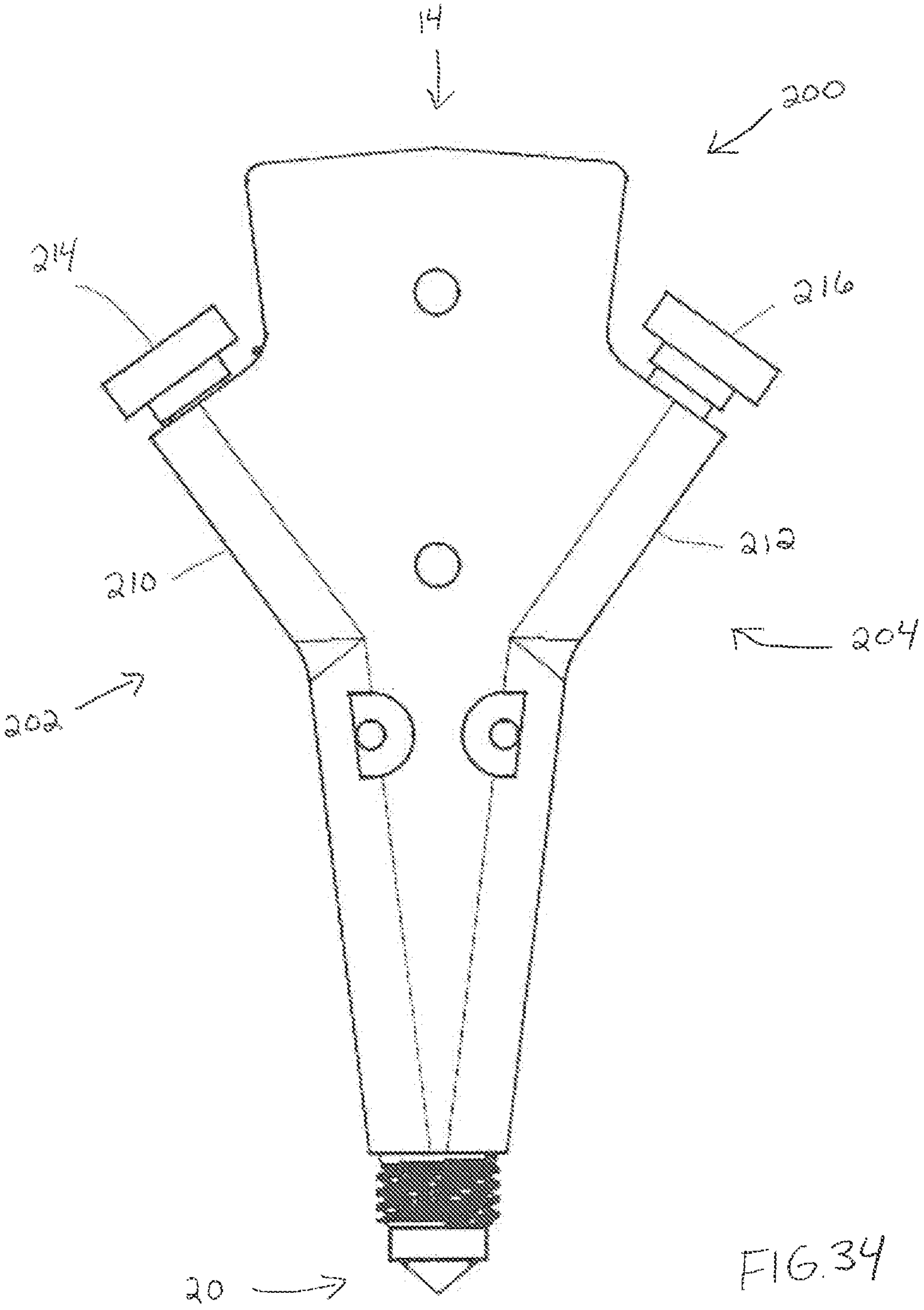
FIG. 34 is a first side perspective view of a manifold in accordance with another embodiment of the present invention.
Figure 35:
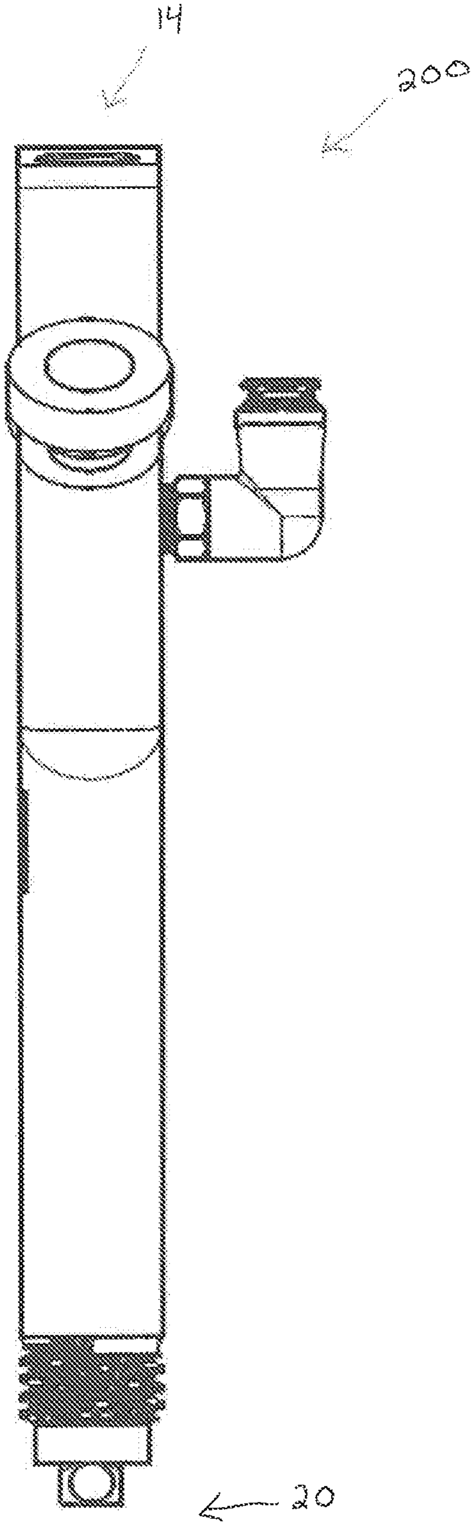
FIG. 35 is a side perspective view of a manifold in accordance with another embodiment of the present invention.
Figure 49:
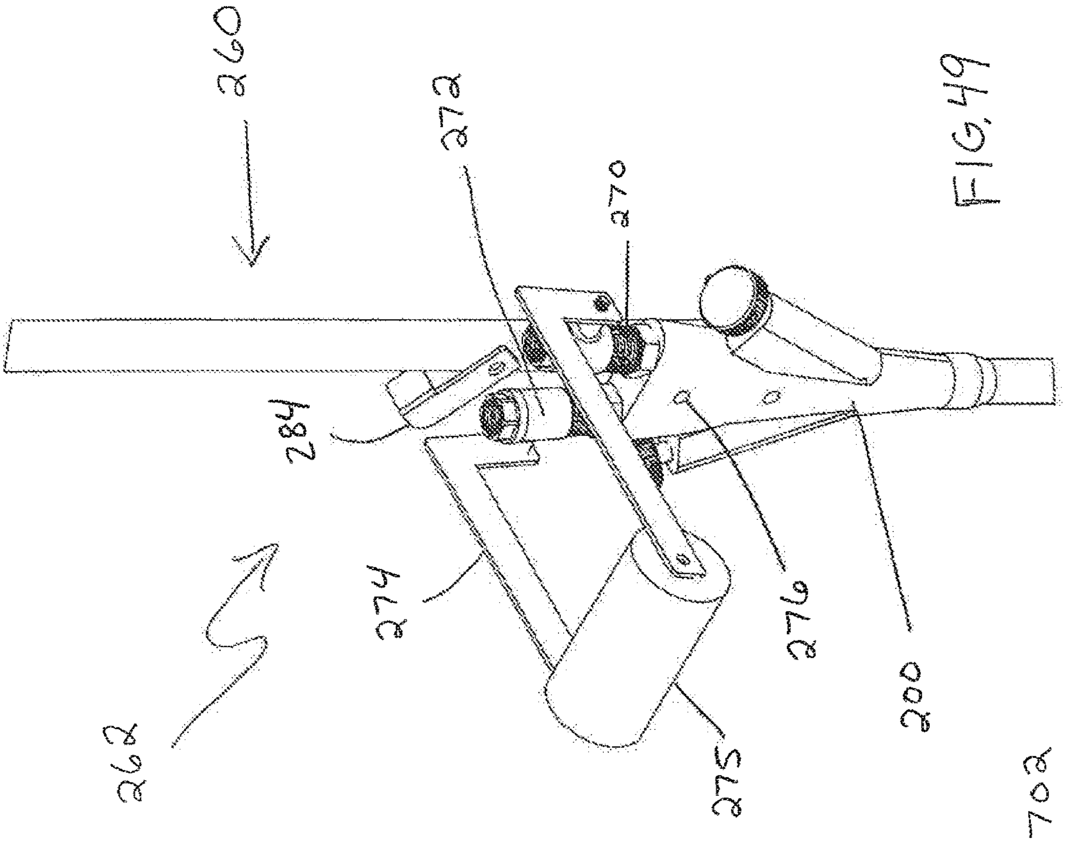
FIG. 49 is a detailed perspective view of a manifold and carrier in accordance with another embodiment of the present invention.
Figure 48:
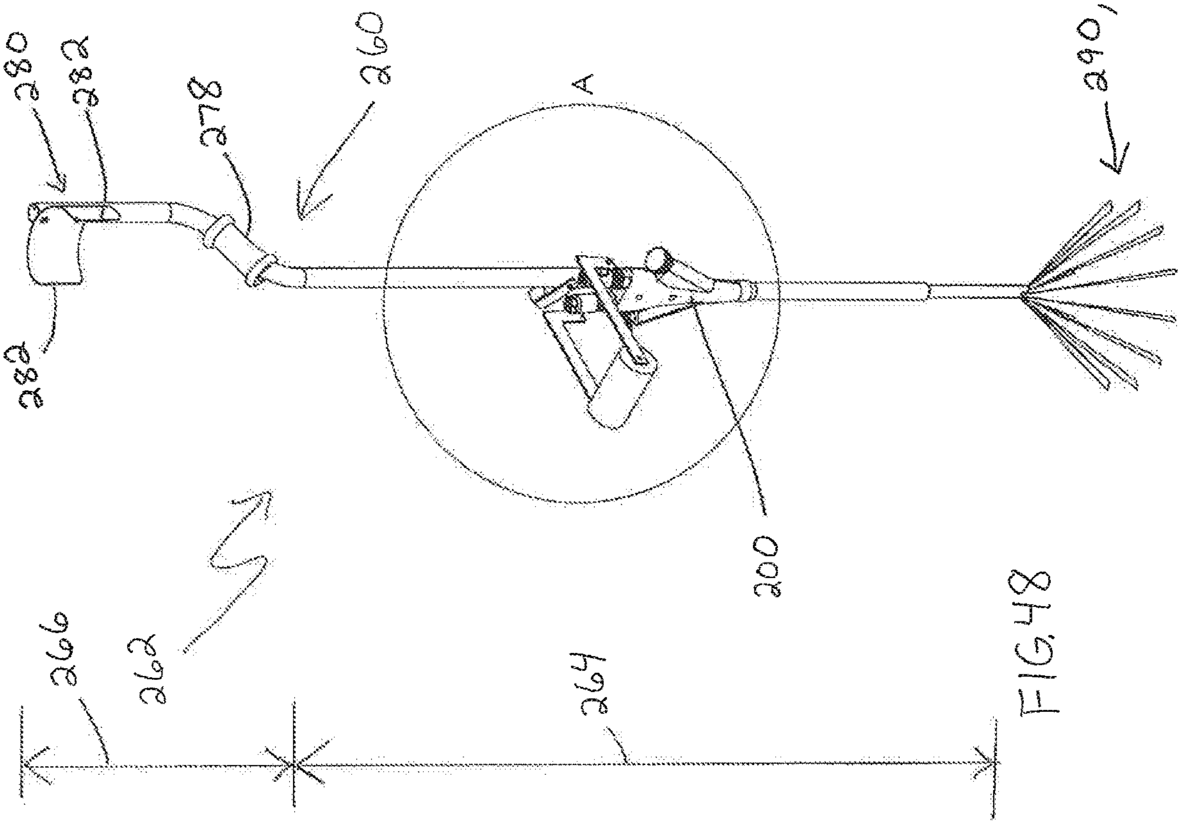
FIG. 48 is a perspective view of a manifold and carrier in accordance with another embodiment of the present invention.
Figure 50:
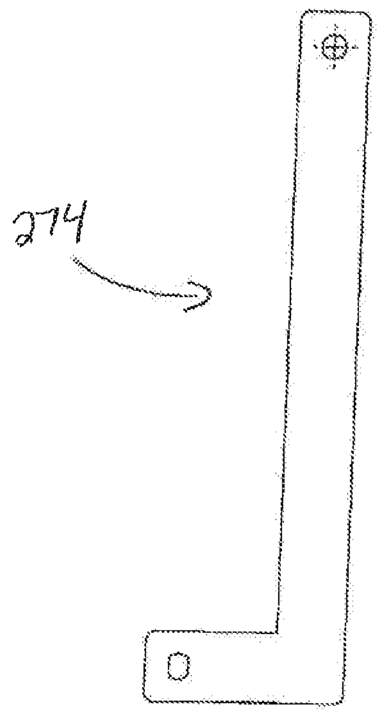
FIG. 50 is an elevation view of a connecting portion of a carrier in accordance with another embodiment of the present invention.
Figure 51:
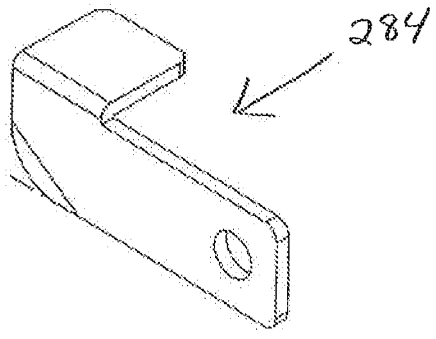
FIG. 51 is a perspective view of a locking cam of a carrier in accordance with another embodiment of the present invention.
Figure 52:
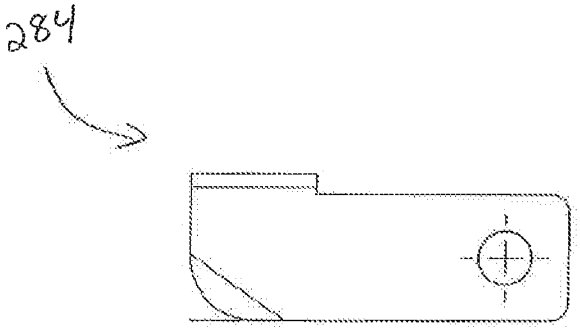
FIG. 52 is an elevation view of a locking cam of a carrier in accordance with another embodiment of the present invention.
Figure 53:
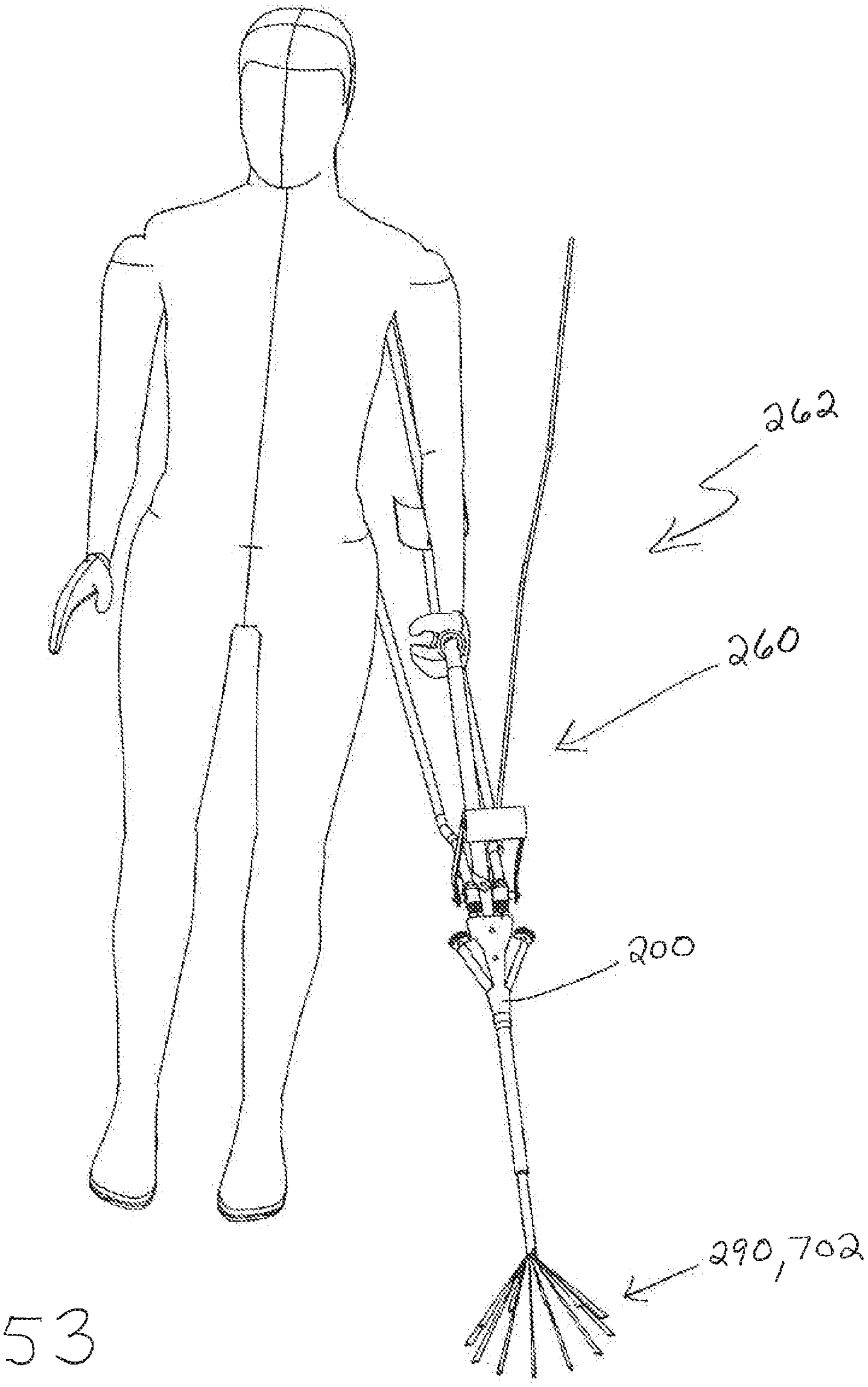
FIG. 53 is a perspective view of an operator using a dispensing system having a manifold and a carrier in accordance with another embodiment of the present invention.
Figure 54:
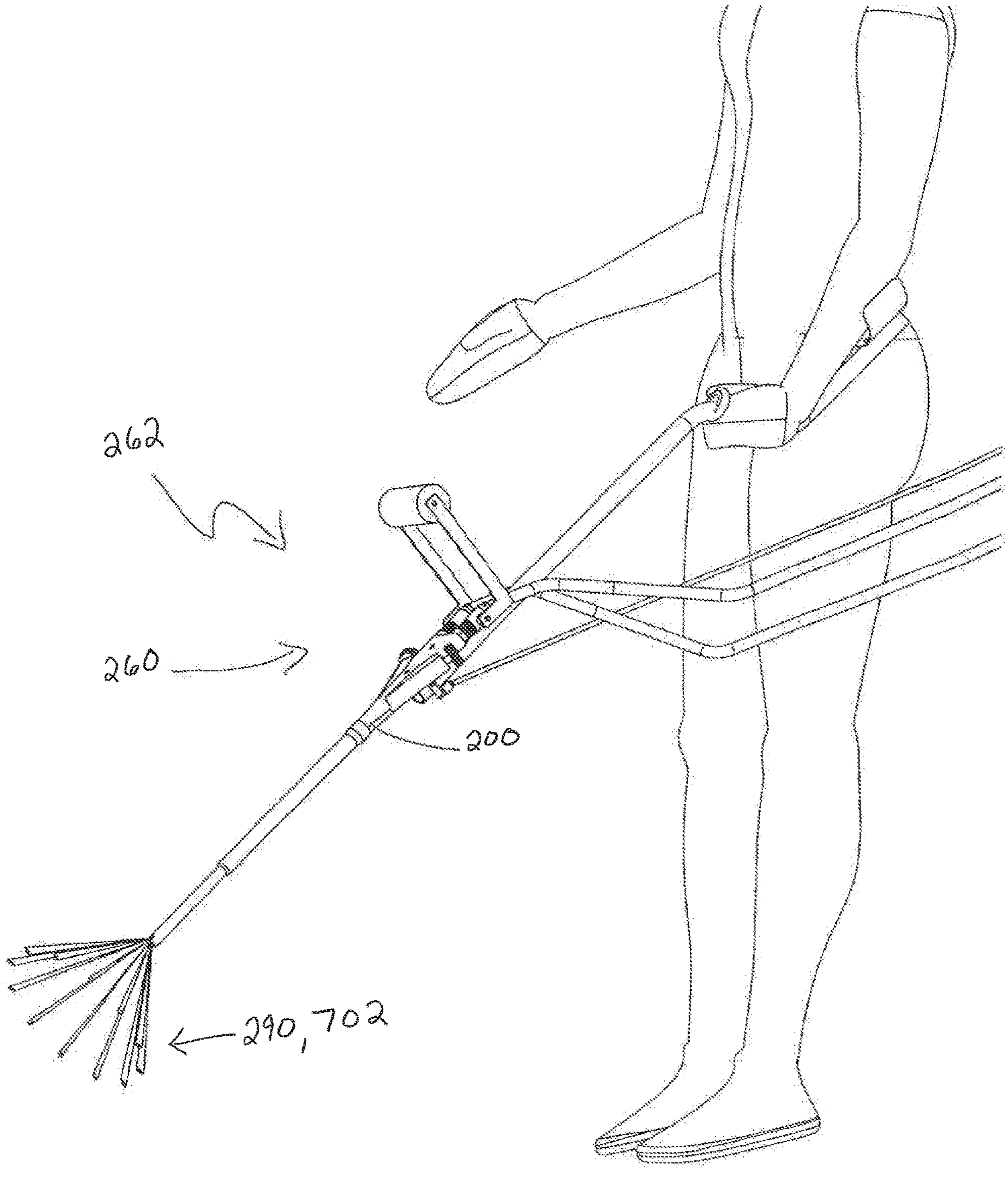
FIG. 54 is a perspective view of an operator using a dispensing system having a manifold and a carrier in accordance with another embodiment of the present invention.
Figure 55:
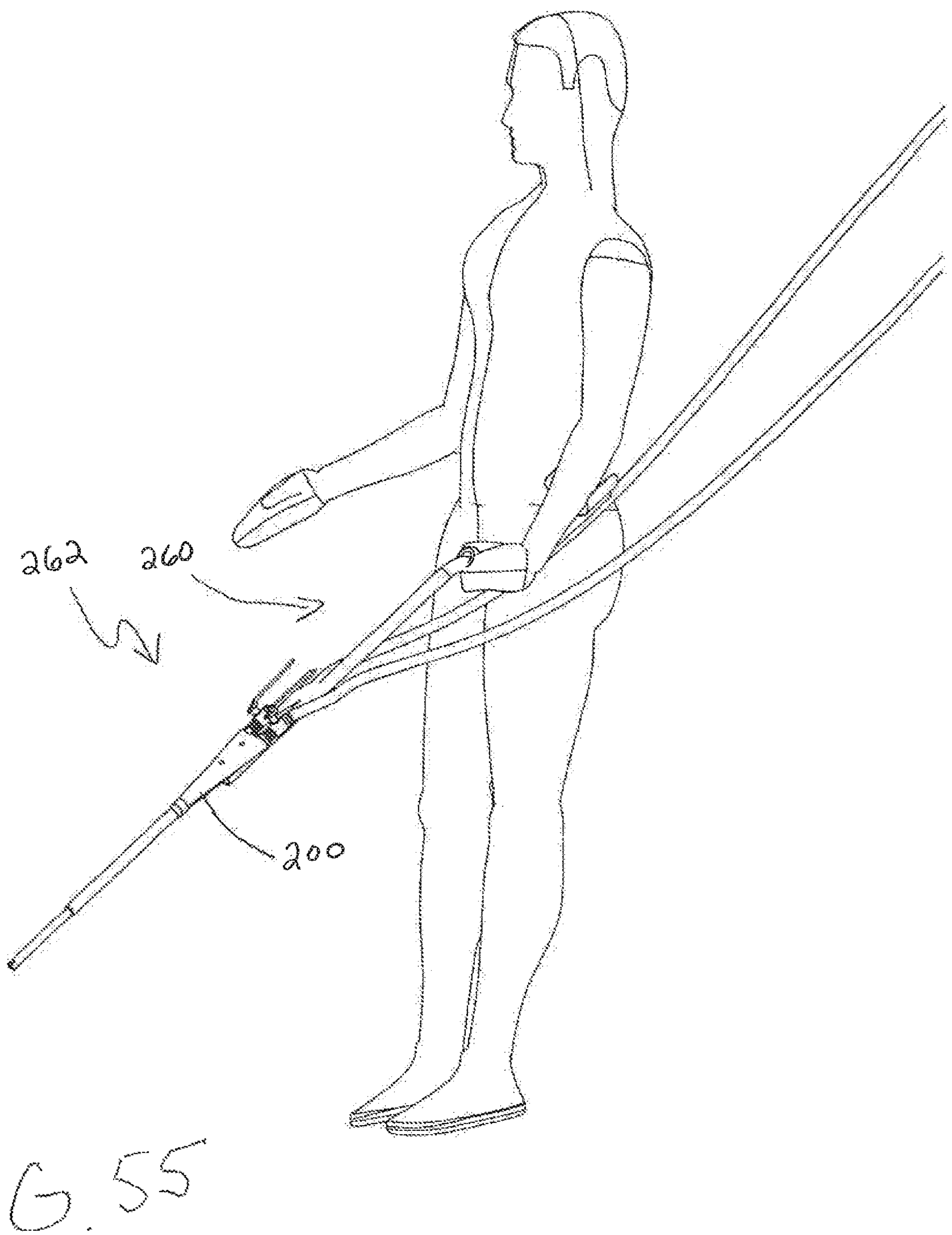
FIG. 55 is a perspective view of an operator using a dispensing system having a manifold and a carrier in accordance with another embodiment of the present invention.
Figure 56:
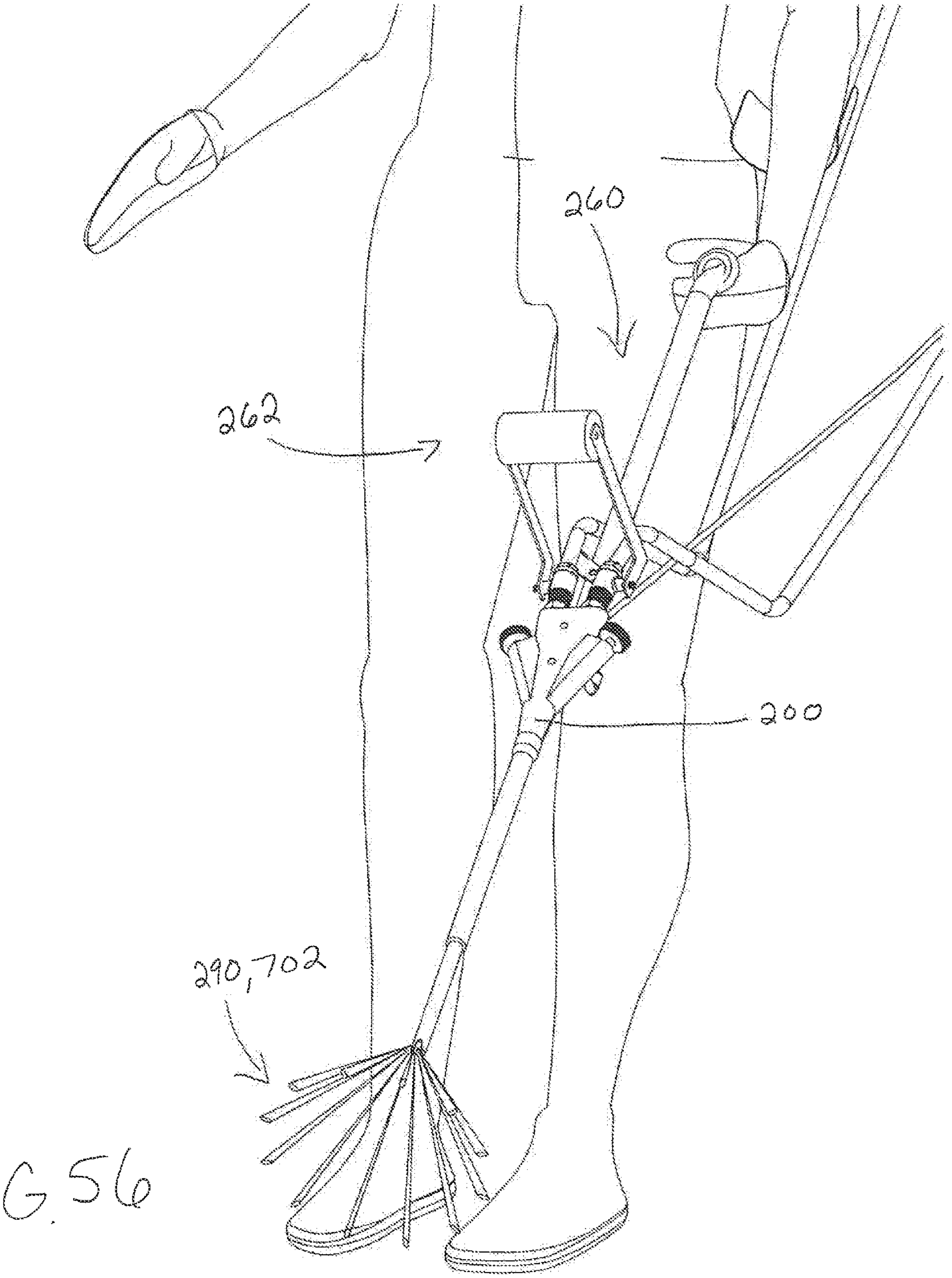
FIG. 56 is a perspective view of an operator using a dispensing system having a manifold and a carrier in accordance with another embodiment of the present invention.

Referring to FIGS. 48-57, in an exemplary embodiment, a linear axis of the manifold 200 is fitted with a mechanical attachment means. For example, in an exemplary embodiment, the mechanical attachment means may comprise a threaded portion 270. The fittings or threaded portion 270 can be used for attachment to a first end of a valve 272. In one embodiment, the valve 272 may include a ball valve 272. As shown in FIG. 49, the system 262 may include two valves 272. A second end of the valve 272 is mechanically attached to a hose as shown in FIGS. 20 and 21. As described throughout, a substance or fluid flows through the hoses and through the hose fittings and then through the valves 272 and then through the manifold fittings and then through the linear channels of the manifold 200. In one embodiment, the valves 272 can be moved to a closed position to stop flow of the substance or fluid or variably opened to control flow of the substance or fluid through the fittings and manifold channels.

The handles on the valves 272 can be mechanically connected to allow for simultaneous control of multiple ball valves. A body portion of the manifold 200 advantageously can include a mounting portion 276 to accommodate fasteners for securing the manifold 200 to a portion of the carrier 260. Referring to FIG. 49, a portion of the manifold 200 between the linear channels 60, 70 is a convenient location for these mounting portions 276. Fasteners can be used to secure the manifold 200 to the carrier 260. For example, fasteners extending through these mounting portions 276 can extend through holes in a respective portion in the carrier 260. The carrier 260 and the manifold 200 are thereby mechanically attached. In other embodiments, various fasteners and means of fastening can be employed.

Figure 57:
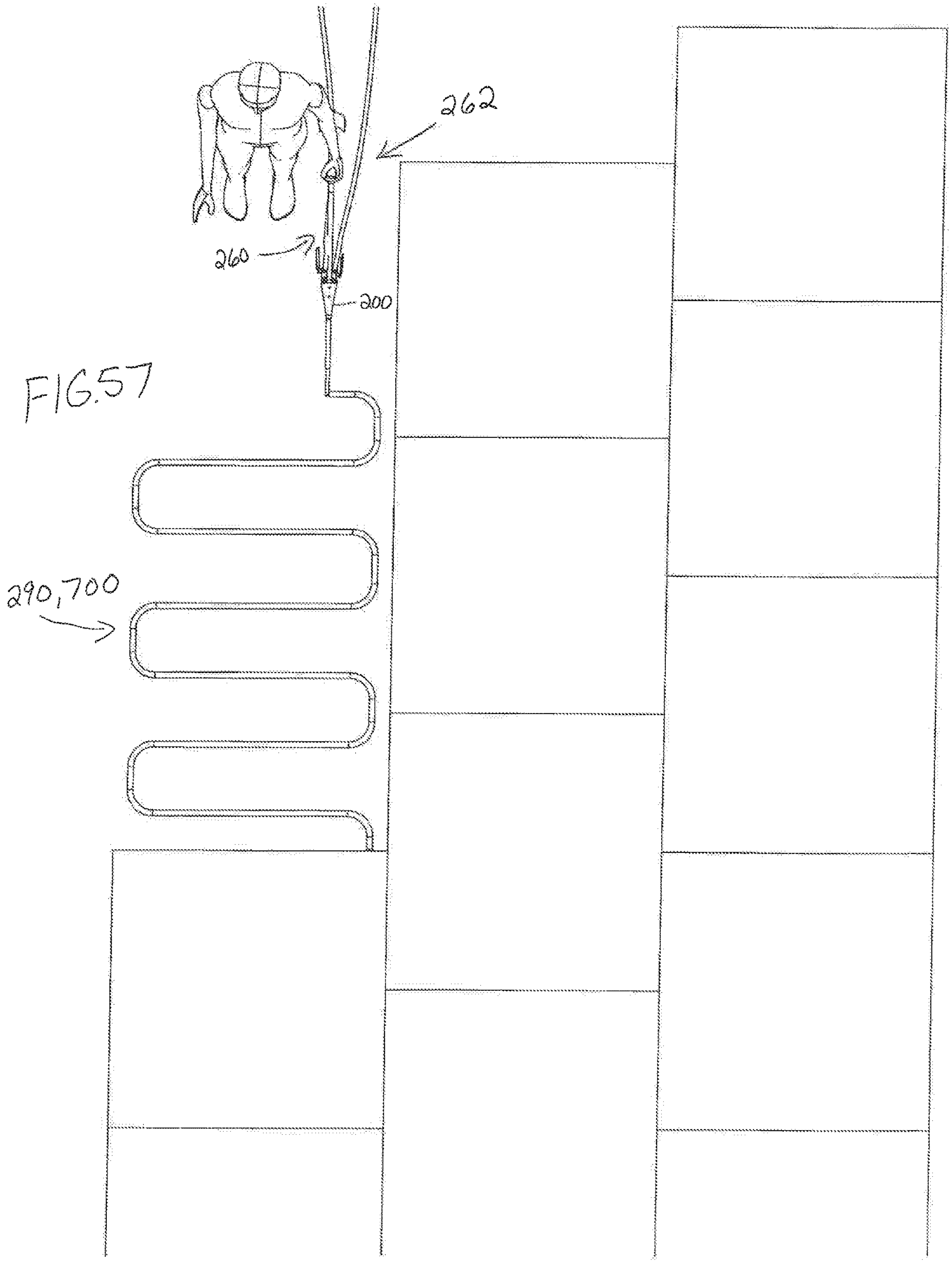
FIG. 57 is a perspective view of an operator using a dispensing system having a manifold and a carrier in accordance with another embodiment of the present invention.

The angle portion 266 of the carrier 260 provides a portion for a user to hold and maneuver the carrier 260 and dispensing system 262. For example, referring to FIGS. 48-57, the grip portion 278 of the angle portion 266 can be grasped with a human hand. A forearm of an operator can fit into the cuff portion 278 of the carrier 260. In one embodiment, the shape of the carrier 260, e.g., the linear portion 264 and the angle portion 266, is situated so that the angled grip portion 278 of the carrier 260 acts as a pivot point. In one embodiment, the weight of the manifold 200 and the substance or fluid inside the manifold 200 offset the weight of the cuff portion 280 of the dispensing system 262. Referring to FIGS. 53-57, for example, the cuff portion 280 is lifted up to the forearm by the weight of the manifold 200 pushing down and the hand acts as a pivot point. The sides of the cuff wall 282 are extended high enough to allow the operator to controllably swing the dispensing system 262, e.g., the carrier 260 and the attached manifold 200, and the mixing tip 220 from side to side, left to right to left. Referring to FIG. 57, as the operator walks backward the flow of the substance or fluid from the dispensing system 262 creates a serpentine pattern 290. The cuff portion 280 holds a first end of the carrier 260 on to the forearm while the grip portion 278 allows the operators hand to move back and forth as desired. Manufacturers provide specified patterns for the attachment of insulation boards. The carrier 260 of the present disclosure allows the operator to manipulate the manifold 200 over a substrate in a specified pattern. Advantageously, the systems of the present disclosure allow an operator to manipulate the manifold 200 of the present disclosure over a substrate in any desired pattern for any particular application. For example, referring to FIG. 57, in an exemplary embodiment, a system of the present disclosure can be used to expel a bead pattern 700 over a substrate. Also, referring to FIGS. 48, 53, 54, and 56, in another exemplary embodiment, a system of the present disclosure can be used to expel a splatter pattern 702 over a substrate.

FIGS. 16-32 and 40-41 illustrate exemplary embodiments of fluid dispensing systems of the present disclosure. Advantageously, the fluid dispensing systems of the present disclosure allow for the precise, controlled spacing of beads of multiple component adhesives, and other liquids, and allow for multiple beads to be dispensed onto a substrate simultaneously.

Referring to FIGS. 16-19 and 40, a fluid dispensing system 250 of the present disclosure includes two (2) separate receiving portions as described herein. Referring to FIGS. 20-24 and 41, a fluid dispensing system 300 of the present disclosure includes four (4) separate receiving portions as described herein.

Referring to FIGS. 25-28, a fluid dispensing system 400 of the present disclosure includes seven (7) separate receiving portions as described herein. Referring to FIGS. 29-32, a fluid dispensing system 500 of the present disclosure includes eleven (11) separate receiving portions as described herein.

The fluid dispensing system 300 as shown in FIGS. 20-24 and 41 will now be described in detail. Referring to FIGS. 20-24 and 41, a fluid dispensing system 300 is able to apply a fluid 290 having a first part 292 and a second part 294. Advantageously, the fluid dispensing system 300 of the present disclosure allows for the precise, controlled spacing of beads of multiple component adhesives, and other liquids, and allow for multiple beads to be dispensed onto a substrate simultaneously.

Referring to FIGS. 20-24 and 41, a fluid dispensing system 300 includes a carrier 302, a first receiving portion 304 removably attachable to the carrier 302, a second receiving portion 306 removably attachable to the carrier 302, a third receiving portion 308 removably attachable to the carrier 302, and a fourth receiving portion 310 removably attachable to the carrier 302. In an exemplary embodiment, the receiving portions 304, 306, 308, 310 are connected to the carrier 302 such that the spacing between the receiving portions 304, 306, 308, 310 is arranged to accommodate a particular application, e.g., a desired location of a stream or spatter pattern on to a substrate.

The carrier 302 of the present disclosure conveniently holds the components of a fluid dispensing system of the present disclosure so that a user is able to conveniently apply multiple beads of a substance simultaneously to a substrate. The carrier 302 of the present disclosure includes motive supports, e.g., wheels, and allows a user to be able to conveniently and easily maneuver a fluid dispensing system of the present disclosure to apply multiple beads of a substance simultaneously to a substrate.

In an exemplary embodiment, a handle portion 303 of a carrier 302 is of a sufficient height to make the use of the receiving portions, e.g., a vee manifold, ergonomic. In one embodiment, a frame portion 305 of a carrier 302 is created with a connecting bar for attaching as many receiving portions, e.g., a vee manifold, as is appropriate for a particular application.

Referring to FIGS. 20-24 and 41, the fluid dispensing system 300 of the present disclosure includes a first holder 312 removably attachable to the carrier 302 and a second holder 314 removably attachable to the carrier 302. The first holder 312 contains the first part 292 of the fluid 290 and the second holder 314 contains the second part 294 of the fluid 290.

Figure 41:
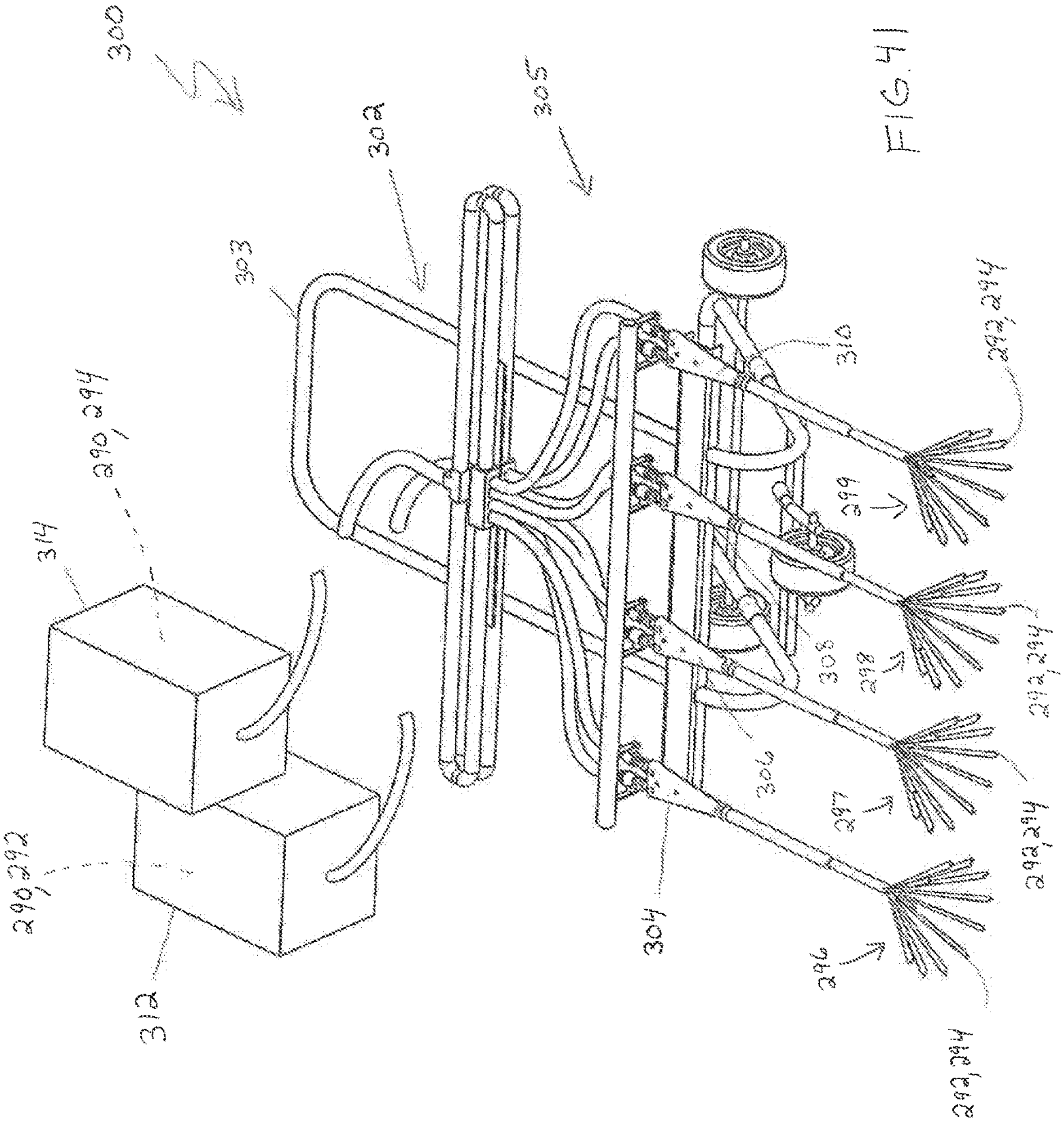
FIG. 41 is a perspective view of a fluid dispensing system in accordance with another embodiment of the present invention.
Figure 44:
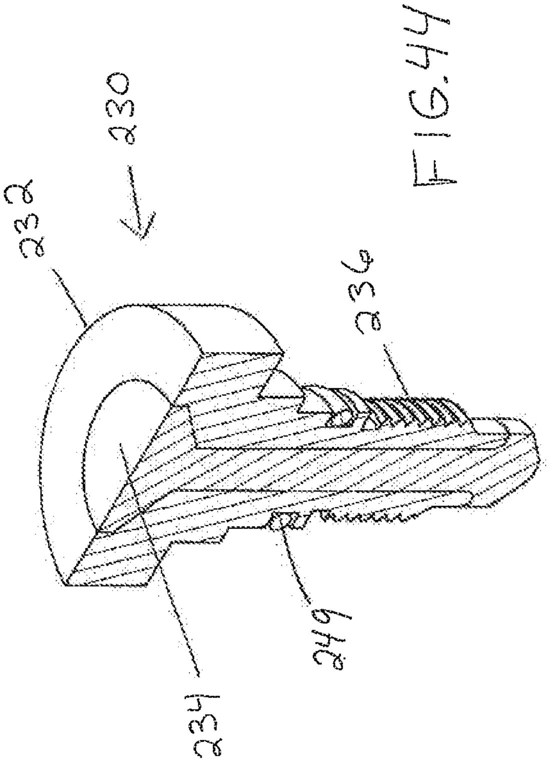
FIG. 44 is a cross-sectional perspective view of a control portion in accordance with an embodiment of the present invention.
Figure 42:
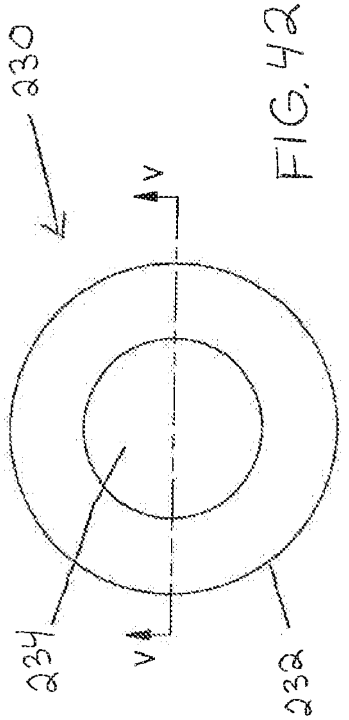
FIG. 42 is a top view of a control portion in accordance with an embodiment of the present invention.
Figure 43:
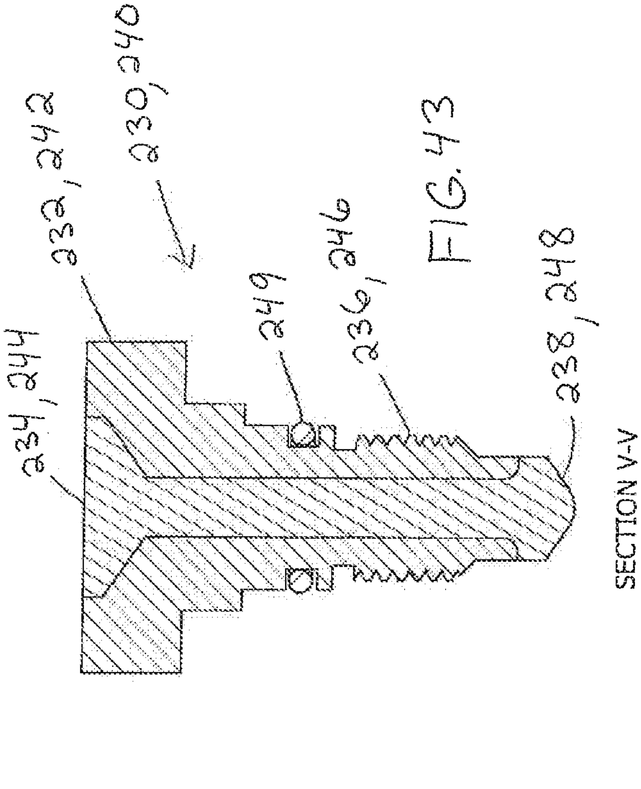
FIG. 43 is a cross-sectional view of a control portion in accordance with an embodiment of the present invention.

In one embodiment, the first receiving portion 304 receives the first part 292 of the fluid 290 and the second part 294 of the fluid 290 separately. For example, a first line 320 connects the first holder 312 to the first receiving portion 304 and a second line 322 connects the second holder 314 to the first receiving portion 304. In this manner, the first receiving portion 304 receives the first part 292 of the fluid 290 via the first line 320 and the first receiving portion 304 receives the second part 294 of the fluid 290 via the second line 322. In an exemplary embodiment, the first part 292 of the fluid 290 flows through the first channel 60 (FIGS. 3 and 36) and the second part 294 of the fluid 290 flows through the second channel 70 (FIGS. 3 and 36) of the first receiving portion 304 and are mixed within a static mixing tip 220, that is attachable at the outlet or bottom side 20 of the first receiving portion 304, to create a first mixed fluid 296 (FIG. 41).

In one embodiment, the first receiving portion 304 is a vee manifold 340 having a first channel 60 (FIG. 3) and a second channel 70 (FIG. 3). In such embodiments, the first line 320 is in fluid communication with the first channel 60 and the second line 322 is in fluid communication with the second channel 70 of the vee manifold 340. In one embodiment, the first part 292 of the fluid 290 flows through the first channel 60 (FIG. 3) and the second part 294 of the fluid 290 flows through the second channel 70 (FIG. 3) of the vee manifold 340 and are mixed within a static mixing tip 220, that is attachable at the outlet or bottom side 20 of the first receiving portion 304, to create a first mixed fluid 296 (FIG. 41). As described above, referring to FIGS. 3 and 36, the first channel longitudinal axis 62 is linear and the second channel longitudinal axis 72 is linear of the first vee manifold 340. In other embodiments, the first receiving portion 304 can be other receiving portions, mixing devices, and/or manifolds.

In one embodiment, the second receiving portion 306 receives the first part 292 of the fluid 290 and the second part 294 of the fluid 290 separately. For example, a third line 324 connects the first holder 312 to the second receiving portion 306 and a fourth line 326 connects the second holder 314 to the second receiving portion 306. In this manner, the second receiving portion 306 receives the first part 292 of the fluid 290 via the third line 324 and the second receiving portion 306 receives the second part 294 of the fluid 290 via the fourth line 326. In an exemplary embodiment, the first part 292 of the fluid 290 flows through the first channel 60 (FIG. 3) and the second part 294 of the fluid 290 flows through the second channel 70 (FIG. 3) of the second receiving portion 306 and are mixed within a static mixing tip 220, that is attachable at the outlet or bottom side 20 of the second receiving portion 304, to create a second mixed fluid 297 (FIG. 41).

In one embodiment, the second receiving portion 306 is a vee manifold 342 having a first channel 60 (FIG. 3) and a second channel 70 (FIG. 3). In such embodiments, the third line 324 is in fluid communication with the first channel 60 and the fourth line 326 is in fluid communication with the second channel 70 of the vee manifold 342. In one embodiment, the first part 292 of the fluid 290 flows through the first channel 60 (FIG. 3) and the second part 294 of the fluid 290 flows through the second channel 70 (FIG. 3) of the vee manifold 342 and are mixed within a static mixing tip 220, that is attachable at the outlet or bottom side 20 of the second receiving portion 304, to create a second mixed fluid 297 (FIG. 41). As described above, referring to FIGS. 3 and 36, the first channel longitudinal axis 62 is linear and the second channel longitudinal axis 72 is linear of the second vee manifold 342. In other embodiments, the second receiving portion 306 can be other receiving portions, mixing devices, and/or manifolds.

In one embodiment, the third receiving portion 308 receives the first part 292 of the fluid 290 and the second part 294 of the fluid 290 separately. For example, a fifth line 328 connects the first holder 312 to the third receiving portion 308 and a sixth line 330 connects the second holder 314 to the third receiving portion 308. In this manner, the third receiving portion 308 receives the first part 292 of the fluid 290 via the fifth line 328 and the third receiving portion 308 receives the second part 294 of the fluid 290 via the sixth line 330. In an exemplary embodiment, the first part 292 of the fluid 290 flows through the first channel 60 (FIG. 3) and the second part 294 of the fluid 290 flows through the second channel 70 (FIG. 3) of the third receiving portion 308 and are mixed within a static mixing tip 220, that is attachable at the outlet or bottom side 20 of the third receiving portion 308, to create a third mixed fluid 298 (FIG. 41).

In one embodiment, the third receiving portion 308 is a vee manifold 344 having a first channel 60 (FIG. 3) and a second channel 70 (FIG. 3). In such embodiments, the fifth line 328 is in fluid communication with the first channel 60 and the sixth line 330 is in fluid communication with the second channel 70 of the vee manifold 344. In one embodiment, the first part 292 of the fluid 290 flows through the first channel 60 (FIG. 3) and the second part 294 of the fluid 290 flows through the second channel 70 (FIG. 3) of the vee manifold 344 and are mixed within a static mixing tip 220 that is attachable at the outlet or bottom side 20 of the third receiving portion 308, to create a third mixed fluid 298 (FIG. 41). As described above, referring to FIGS. 3 and 36, the first channel longitudinal axis 62 is linear and the second channel longitudinal axis 72 is linear of the third vee manifold 344. In other embodiments, the third receiving portion 308 can be other receiving portions, mixing devices, and/or manifolds.

In one embodiment, the fourth receiving portion 310 receives the first part 292 of the fluid 290 and the second part 294 of the fluid 290 separately. For example, a seventh line 332 connects the first holder 312 to the fourth receiving portion 310 and an eighth line 334 connects the second holder 314 to the fourth receiving portion 310. In this manner, the fourth receiving portion 310 receives the first part 292 of the fluid 290 via the seventh line 332 and the first receiving portion 304 receives the second part 294 of the fluid 290 via the eighth line 334. In an exemplary embodiment, the first part 292 of the fluid 290 flows through the first channel 60 (FIG. 3) and the second part 294 of the fluid 290 flows through the second channel 70 (FIG. 3) of the fourth receiving portion 310 and are mixed within a static mixing tip 220, that is attachable at the outlet or bottom side 20 of the fourth receiving portion 310, to create a fourth mixed fluid 299 (FIG. 41).

In one embodiment, the fourth receiving portion 310 is a vee manifold 346 having a first channel 60 (FIG. 3) and a second channel 70 (FIG. 3). In such embodiments, the seventh line 332 is in fluid communication with the first channel 60 and the eighth line 334 is in fluid communication with the second channel 70 of the vee manifold 346. In one embodiment, the first part 292 of the fluid 290 flows through the first channel 60 (FIG. 3) and the second part 294 of the fluid 290 flows through the second channel 70 (FIG. 3) of the vee manifold 346 and are mixed within a static mixing tip 220 that is attachable at the outlet or bottom side 20 of the fourth receiving portion 310, to create a fourth mixed fluid 299 (FIG. 41). As described above, referring to FIGS. 3 and 36, the first channel longitudinal axis 62 is linear and the second channel longitudinal axis 72 is linear of the fourth vee manifold 346. In other embodiments, the fourth receiving portion 310 can be other receiving portions, mixing devices, and/or manifolds.

Advantageously, the fluid dispensing system 300 of the present disclosure allows for the precise, controlled spacing of beads of multiple component adhesives, and other liquids, and allow for multiple beads to be dispensed onto a substrate simultaneously.

Advantageously, the fluid dispensing system 300 of the present disclosure allows for the first receiving portion 304 and the second receiving portion 306 to be attached on the carrier 302 a controlled distance, e.g., a first distance d1, apart. In this manner, the spacing between dispensed beads of multiple component substances can be controlled. Also, the third receiving portion 308 can be attached on the carrier 302 a controlled distance, e.g., a second distance d2, apart from the second receiving portion 306, and the fourth receiving portion 310 can be attached on the carrier 302 a controlled distance, e.g., a third distance d3, apart from the third receiving portion 308.

In some embodiments, the first distance d1 and the second distance d2 are equal. In other embodiments, the first distance d1 and the second distance d2 are different.

The present disclosure allows for an output of bead spacing that is specified differently for different applications. For example, in one embodiment, the greater the uplift resistance requirement the closer the bead spacing specification. When attaching construction boards the width of the board is standardly 48" in the United States and 24" in Europe. The beads spacing in the field of a roofing assembly is usually 12" on center. A 48" board would require 4 beads for attachment. The beads would be located 6" in from either side of the board and then 3 equal 12" spaces between the 4 beads. Roof perimeters and corners are more susceptible to higher wind uplifts and so the bead spacing may be calculated to require 7 beads spaced 6" apart. For such an application, a fluid dispensing system 300 of the present disclosure including a first receiving portion 304, a second receiving portion 306, a third receiving portion 308, and a fourth receiving portion 310 is particularly helpful.

FIGS. 16-19 and 40 illustrate another exemplary embodiment of a fluid dispensing system of the present disclosure. The embodiment illustrated in FIGS. 16-19 and 40 includes similar components to the embodiment illustrated in FIGS. 20-24 and 41, and the similar components are denoted by similar reference numbers. For the sake of brevity, these similar components and the similar steps of using fluid dispensing system 250 (FIGS. 16-19 and 40) will not all be discussed in conjunction with the embodiment illustrated in FIGS. 16-19 and 40.

Referring to FIGS. 16-19 and 40, a fluid dispensing system 250 of the present disclosure includes a first receiving portion 252 and a second receiving portion 254. In one embodiment, the first receiving portion 252 is a first vee manifold and the second receiving portion 254 is a second separate vee manifold. In other embodiments, the portions can be other receiving portions, mixing devices, and/or manifolds.

In one embodiment, a fluid dispensing system 250 of the present disclosure is able to apply a fluid 290 having a first part 292 and a second part 294. Advantageously, the fluid dispensing system 250 of the present disclosure allows for the precise, controlled spacing of beads of multiple component adhesives, and other liquids, and allows for multiple beads to be dispensed onto a substrate simultaneously.

Referring to FIGS. 16-19 and 40, in one embodiment, a fluid dispensing system 250 of the present disclosure including a first receiving portion 252 and a second receiving portion 254 is particularly helpful in that the carrier is light enough that a handle does not necessitate wheels. This configuration can be very mobile allowing use on walls, corners and congested areas.

FIGS. 25-28 illustrate another exemplary embodiment of a fluid dispensing system of the present disclosure. The embodiment illustrated in FIGS. 25-28 includes similar components to the embodiment illustrated in FIGS. 20-24, and the similar components are denoted by similar reference numbers. For the sake of brevity, these similar components and the similar steps of using fluid dispensing system 400 (FIGS. 25-28) will not all be discussed in conjunction with the embodiment illustrated in FIGS. 25-28.

Referring to FIGS. 25-28, a fluid dispensing system 400 of the present disclosure includes a first receiving portion 402, a second receiving portion 404, a third receiving portion 406, a fourth receiving portion 408, a fifth receiving portion 410, a sixth receiving portion 412, and a seventh receiving portion 414. In one embodiment, the first receiving portion 402 is a first vee manifold, the second receiving portion 404 is a second vee manifold, the third receiving portion 406 is a third vee manifold, the fourth receiving portion 408 is a fourth vee manifold, the fifth receiving portion 410 is a fifth vee manifold, the sixth receiving portion 412 is a sixth vee manifold, and the seventh receiving portion 414 is a seventh vee manifold. In other embodiments, the mixing portions can be other receiving portions, mixing devices, and/or manifolds.

In one embodiment, a fluid dispensing system 400 of the present disclosure is able to apply a fluid 290 having a first part 292 and a second part 294. Advantageously, the fluid dispensing system 4000 of the present disclosure allows for the precise, controlled spacing of beads of multiple component adhesives, and other liquids, and allows for multiple beads to be dispensed onto a substrate simultaneously.

The present disclosure allows for an output of bead spacing that is specified differently for different applications. For example, in one embodiment, when utilizing 48" wide construction boards the greater the uplift resistance requirement the closer the bead spacing specification. Roof perimeters and corners are more susceptible to higher wind uplifts and so the bead spacing may be calculated to require beads spaced 6" apart. A 48" board may require 7 or 8 beads for attachment. The beads would be located 6" in from either side of the board and then 6 equal 6" spaces between the 7 beads or 3" in from either side of the board and then 7 equal 6" spaces between the 8 beads. For such an application, a fluid dispensing system 400 of the present disclosure including a first receiving portion 402, a second receiving portion 404, a third receiving portion 406, a fourth receiving portion 408, a fifth receiving portion 410, a sixth receiving portion 412, and a seventh receiving portion 414 is particularly helpful.

FIGS. 29-32 illustrate another exemplary embodiment of a fluid dispensing system of the present disclosure. The embodiment illustrated in FIGS. 29-32 includes similar components to the embodiment illustrated in FIGS. 20-24, and the similar components are denoted by similar reference numbers. For the sake of brevity, these similar components and the similar steps of using fluid dispensing system 500 (FIGS. 29-32) will not all be discussed in conjunction with the embodiment illustrated in FIGS. 29-32.

Referring to FIGS. 29-32, a fluid dispensing system 500 of the present disclosure includes a first receiving portion 502, a second receiving portion 504, a third receiving portion 506, a fourth receiving portion 508, a fifth receiving portion 510, a sixth receiving portion 512, a seventh receiving portion 514, an eighth receiving portion 516, a ninth receiving portion 518, a tenth receiving portion 520, and an eleventh receiving portion 522. In one embodiment, the first receiving portion 502 is a first vee manifold, the second receiving portion 504 is a second vee manifold, the third receiving portion 506 is a third vee manifold, the fourth receiving portion 508 is a fourth vee manifold, the fifth receiving portion 510 is a fifth vee manifold, the sixth receiving portion 512 is a sixth vee manifold, the seventh receiving portion 514 is a seventh vee manifold, the eighth receiving portion 516 is an eighth vee manifold, the ninth receiving portion 518 is a ninth vee manifold, the tenth receiving portion 520 is a tenth vee manifold, and the eleventh receiving portion 522 is an eleventh vee manifold. In other embodiments, the mixing portions can be other receiving portions, mixing devices, and/or manifolds.

In one embodiment, a fluid dispensing system 500 of the present disclosure is able to apply a fluid 290 having a first part 292 and a second part 294. Advantageously, the fluid dispensing system 500 of the present disclosure allows for the precise, controlled spacing of beads of multiple component adhesives, and other liquids, and allows for multiple beads to be dispensed onto a substrate simultaneously.

The present disclosure allows for an output of bead spacing that is specified differently for different applications. For example, in one embodiment, when utilizing 48" wide construction boards the greater the uplift resistance requirement the closer the bead spacing specification. Roof perimeters and corners are more susceptible to higher wind uplifts and so the bead spacing may be calculated to require beads spaced 4" apart A 48" board may require 11 or 12 beads for attachment. The beads would be located 4" in from either side of the board and then 10 equal 4" spaces between the 11 beads or 2" in from either side of the board and then 11 equal 4" spaces between the 12 beads. For such an application, a fluid dispensing system 500 of the present disclosure including eleven receiving portions is particularly helpful.

When using a system which provides multiple mixing tips simultaneously the cost of replacing tips and the down time associated with this change out increases inefficiencies to a greater extent. Surprisingly, it has been discovered that additional manifolds with additional mixing tips increases the amount of fluid dispensed. This phenomenon is attributed to the back pressure created by the static mixing tip, therefore more mixing tips do not slow the speed of the application device but rather increase the amount of material dispensed. For instance, it is common to apply a single head of two component adhesive at a rate of about 2 feet per second. Adding a second mixing tip does not slow down the speed of delivery so 2 beads at 2 feet per second will be applying 4 linear feet per second. 7 Beads dispensed at 2 feet per second is 14 linear feet of adhesive. Applying 11 beads yields 22 linear feet of application per second.

Referring to FIG. 11, a conventional manifold 100 has the added resistance of 90° bends which prevent long term performance. Referring to FIG. 11, a conventional manifold 100 may flow the first couple of uses, but then the bends begin to harden and then the mixtures of the materials become off ratio. For these reasons, multiple conventional manifolds 100 do not perform well.

The straight flow path of the vee manifolds 10, 200 of the present disclosure eliminates the resistance caused by the bends of conventional manifolds 100. The free flow of both part A and part B for each manifold 10, 200 of the present disclosure allows multiple manifolds to be utilized simultaneously without the clogging at the bends. The added benefit of air purging through the manifolds 10, 200 of the present disclosure makes the use of multiple manifolds 10, 200 practical. This innovation is significant to the end user. The linear feet per second increases efficiency.

In the foregoing Detailed Description, various features are grouped together in a single embodiment to streamline the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Further, although elements of the described aspects and/or embodiments may be described or claimed in the singular, the plural is contemplated unless limitation to the singular is explicitly stated. The following claims are hereby incorporated into the Detailed Description, with each claim standing on its own as a separate embodiment.

While this disclosure has been described as having exemplary designs, the present disclosure can be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains and which fall within the limits of the appended claims.

What is claimed is:

1. A manifold for a first substance and a second substance to travel therethrough, the manifold comprising:

a block having an inlet side, an outlet side, a first air channel at a first side, and a second air channel at a second side;

a first control portion transitionable between a first position in which the first air channel is closed and a second position in which the first air channel is open, the first control portion having an outer portion formed of a first material and an inner portion formed of a second material, the outer portion rotatable relative to the inner portion; and a second control portion transitionable between a first position in which the second air channel is closed and a second position in which the second air channel is open, the second control portion having a second control outer portion formed of a second control first material and a second control inner portion formed of a second control second material, the second control outer portion rotatable relative to the second control inner portion.

2. The manifold of claim 1, wherein, with the first control portion in the first position, the inner portion provides a mechanical seal with the first air channel.

3. The manifold of claim 1, wherein, with the first control portion in the first position, only a portion of the inner portion is in contact with the first air channel.

4. The manifold of claim 1, wherein the first material is bronze.

5. The manifold of claim 1, wherein the first material is steel.

6. The manifold of claim 1, wherein the first material is aluminum.

7. The manifold of claim 1, wherein the second material is molded urethane.

8. The manifold of claim 1, wherein, with the second control portion in the first position, the second control inner portion provides a mechanical seal with the second air channel.

9. The manifold of claim 8, wherein, with the second control portion in the first position, only a portion of the second control inner portion is in contact with the second air channel.

10. The manifold of claim 1, further comprising a first substance channel extending from the inlet side to the outlet side, the first substance channel defining a first substance channel longitudinal axis.

11. The manifold of claim 10, further comprising a second substance channel extending from the inlet side to the outlet side, the second substance channel defining a second substance channel longitudinal axis, wherein the first substance channel and the second substance channel together form a vee-shape.

12. The manifold of claim 11, wherein the first substance channel longitudinal axis is linear.

13. The manifold of claim 11, wherein the second substance channel longitudinal axis is linear.

14. The manifold of claim 1, wherein, with the first control portion in the second position, an air source is connectable to the first air channel.

15. The manifold of claim 1, wherein, with the second control portion in the second position, an air source is connectable to the second air channel.

* * * * *